(12) United States Patent
Kuwahara

(10) Patent No.: US 8,761,548 B2
(45) Date of Patent: Jun. 24, 2014

(54) OPTICAL MODULATOR AND OPTICAL MODULATION CONTROL METHOD

(75) Inventor: Hiroshi Kuwahara, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 387 days.

(21) Appl. No.: 13/215,382

(22) Filed: Aug. 23, 2011

(65) Prior Publication Data

US 2012/0128289 A1   May 24, 2012

(30) Foreign Application Priority Data

Nov. 19, 2010   (JP) .................................. 2010-259576
Apr. 7, 2011    (JP) .................................. 2011-085671

(51) Int. Cl.
*G02F 1/025* (2006.01)
*G02F 1/225* (2006.01)

(52) U.S. Cl.
USPC .................................................. 385/2; 385/3

(58) Field of Classification Search
None
See application file for complete search history.

(56) References Cited

U.S. PATENT DOCUMENTS

| | | | | |
|---|---|---|---|---|
| 3,579,145 A | * | 5/1971 | De Lange | ...................... 359/276 |
| 5,170,274 A | | 12/1992 | Kuwata et al. | |
| 5,208,817 A | * | 5/1993 | Kao et al. | ......................... 372/26 |
| 5,359,449 A | * | 10/1994 | Nishimoto et al. | ............ 398/198 |
| 5,646,771 A | * | 7/1997 | Noda | ............................... 359/245 |
| 5,805,321 A | * | 9/1998 | Ooi et al. | ......................... 398/98 |
| 6,317,249 B1 | * | 11/2001 | Nakamoto et al. | .............. 359/279 |
| 2001/0007508 A1 | * | 7/2001 | Ooi et al. | ....................... 359/245 |
| 2002/0003648 A1 | * | 1/2002 | Kobayashi et al. | ............ 359/180 |
| 2005/0254743 A1 | | 11/2005 | Akiyama et al. | |
| 2008/0219678 A1 | * | 9/2008 | Doi | ................................ 398/198 |
| 2012/0155880 A1 | * | 6/2012 | Nishimoto et al. | .............. 398/79 |

FOREIGN PATENT DOCUMENTS

| | | |
|---|---|---|
| JP | 4-140712 | 5/1992 |
| JP | 2005-326548 | 11/2005 |
| JP | 2009-198881 | 9/2009 |

* cited by examiner

*Primary Examiner* — Mike Stahl
(74) *Attorney, Agent, or Firm* — Staas & Halsey LLP

(57) ABSTRACT

An optical modulator includes: a modulator including an optical waveguide provided in a semiconductor substrate having an electro-optical effect and an electrode for applying an electric field depending on a bias voltage and a modulation signal to the optical waveguide; a modulation signal generator to generate the modulation signal of a first frequency; a superimposer to superimpose a signal of a second frequency different from the first frequency on the bias voltage; and a bias controller to control the bias voltage in a modulation direction of the modulator and the bias voltage in an orthogonal direction which is orthogonal to the modulation direction based on a phase of the second frequency component extracted from a modulated optical signal generated by the modulator.

15 Claims, 87 Drawing Sheets

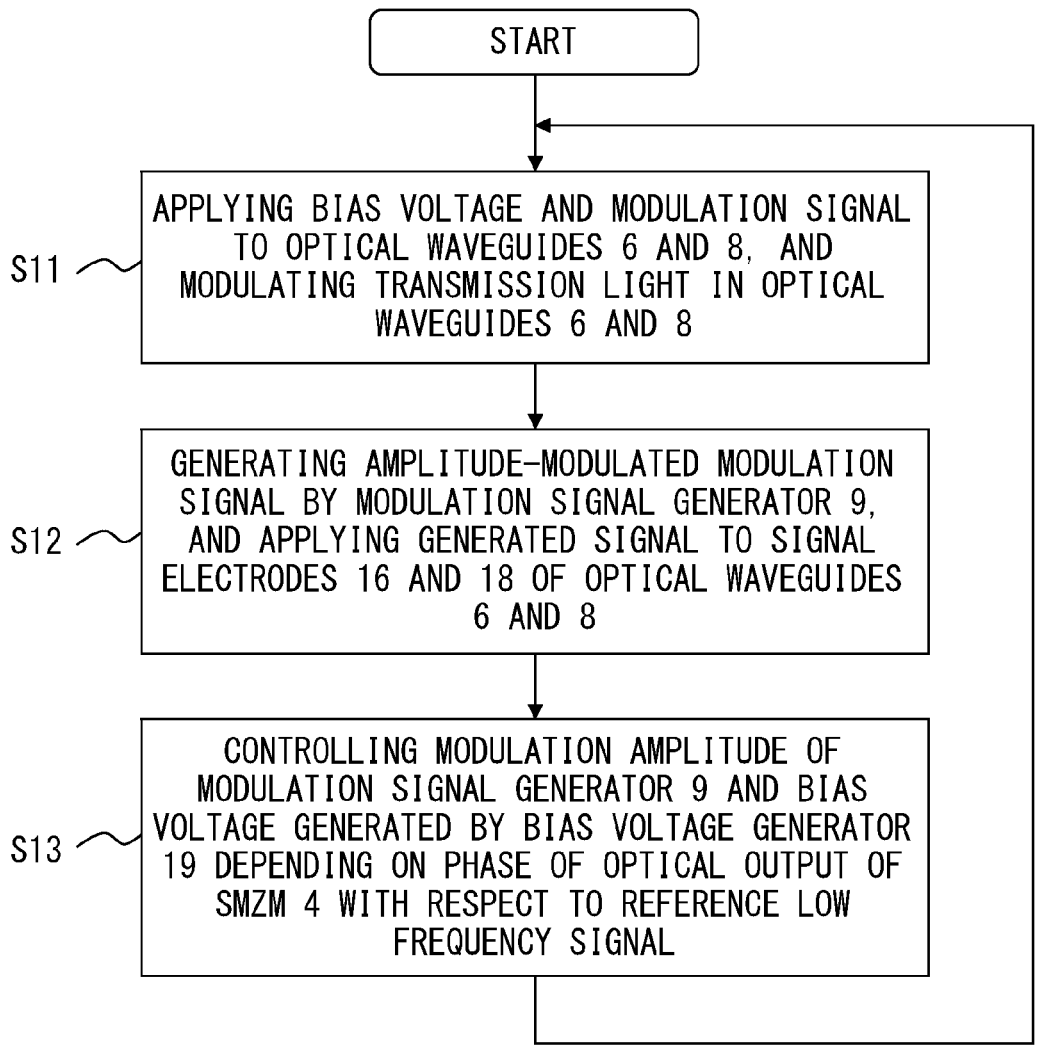
F I G. 2

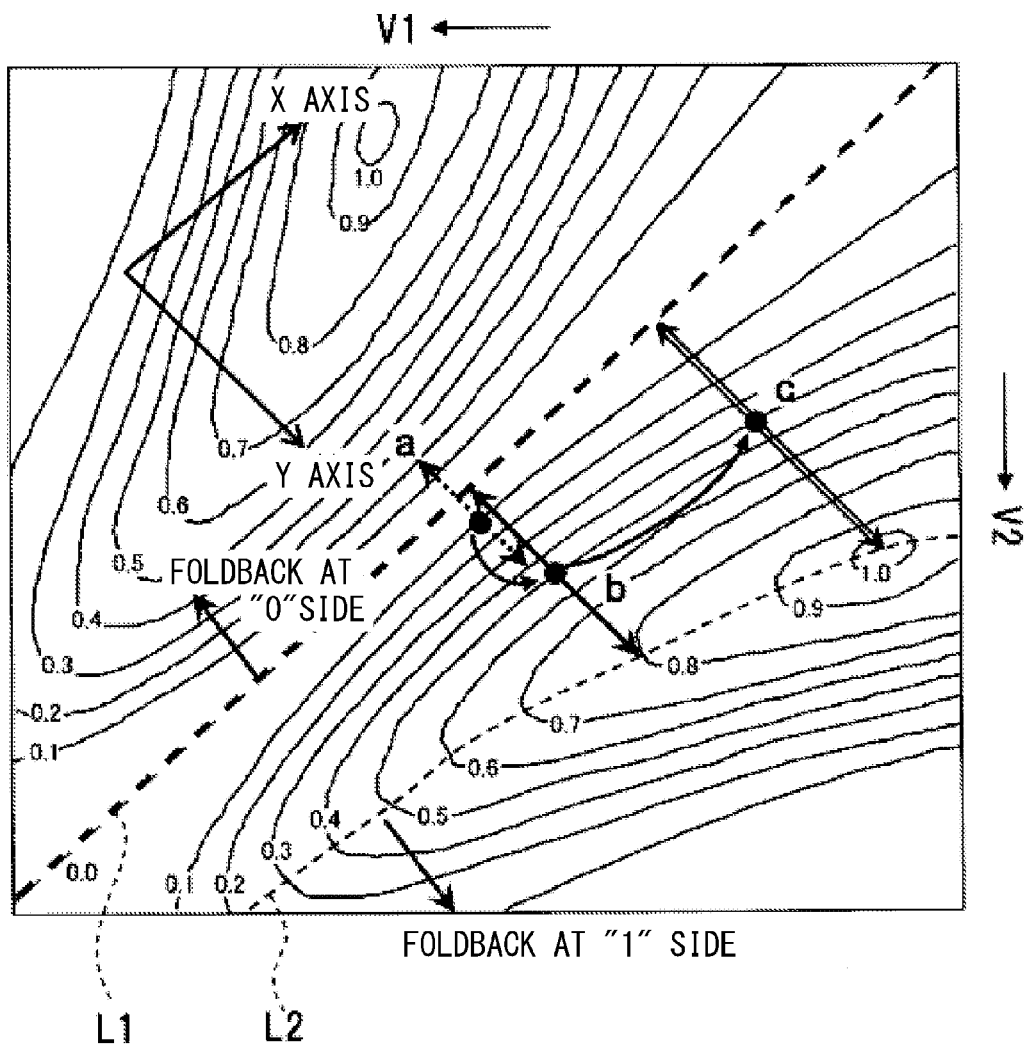
F I G. 10

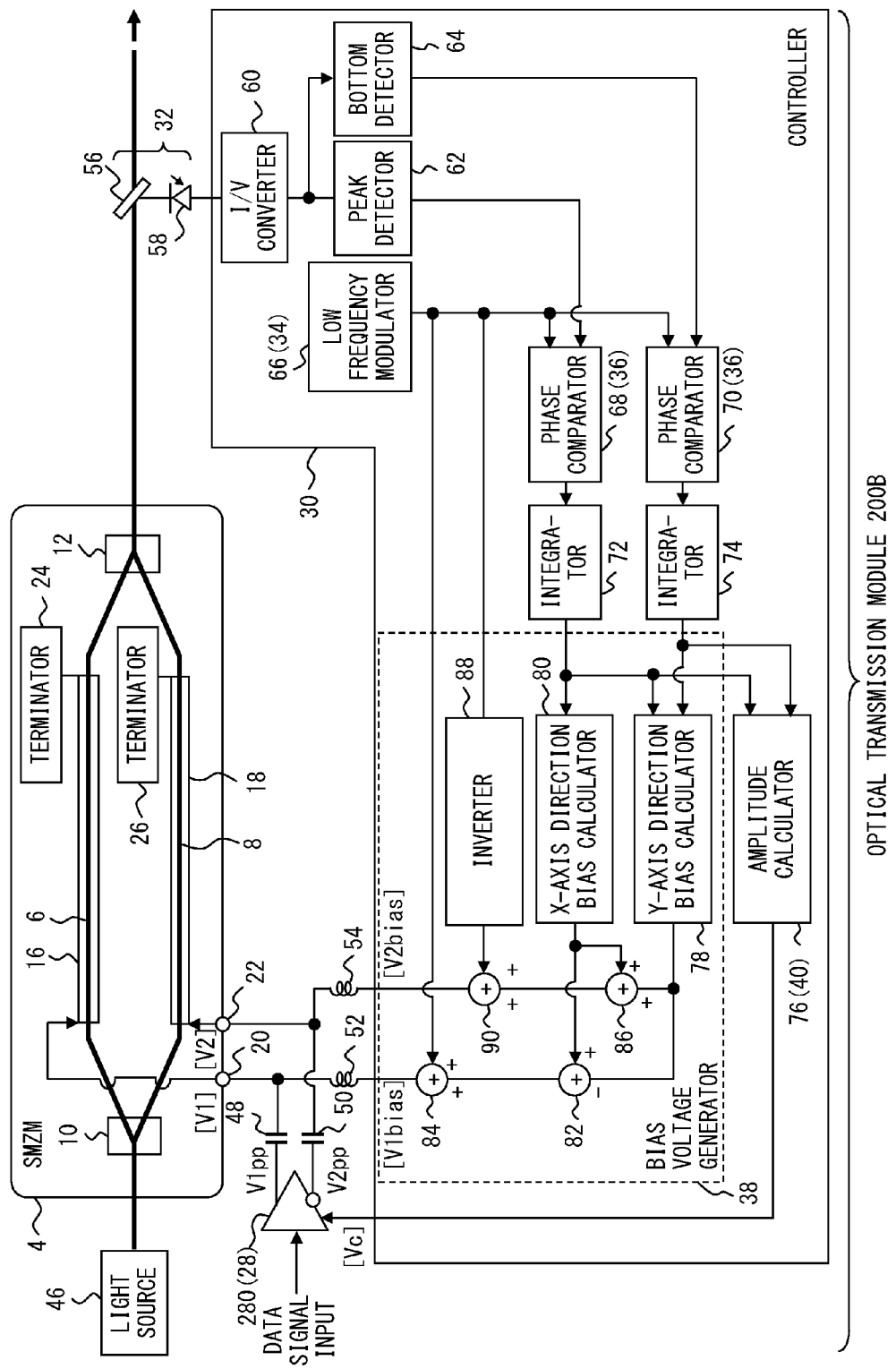
F I G. 15

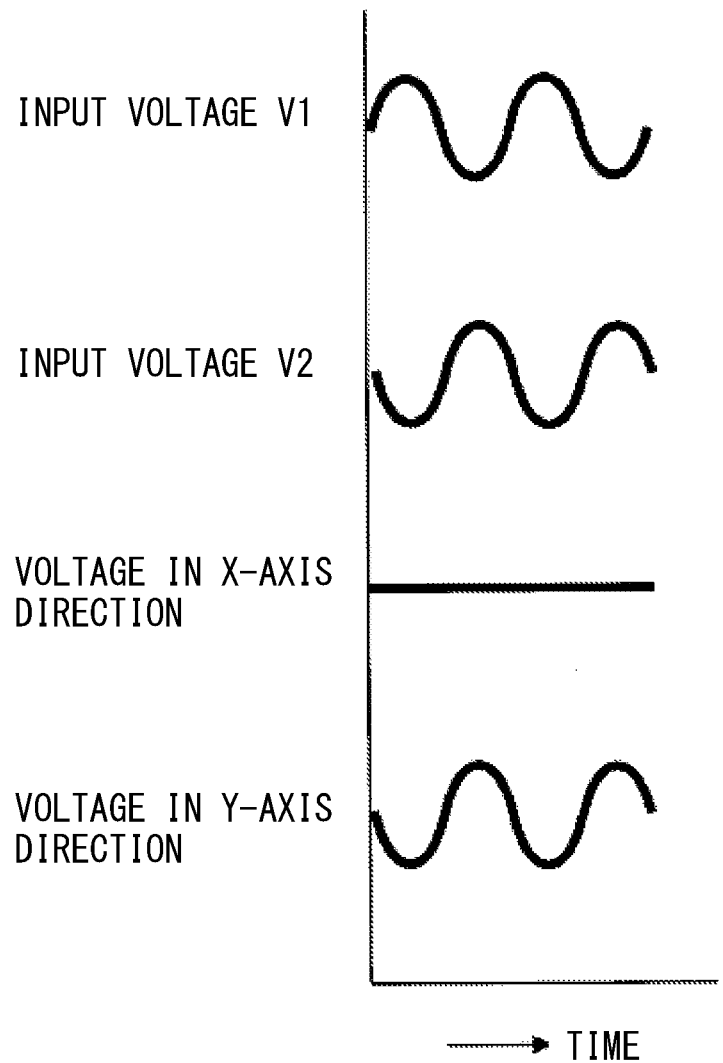
F I G. 1 7

A [VOLTAGE IN Y-AXIS DIRECTION]

B [DATA MODULATION SIGNAL]

C [OUTPUT OPTICAL SIGNAL]

D [PEAK SIDE WAVEFORM]

E [BOTTOM SIDE WAVEFORM]

F [PHASE SIGNAL FOR PEAK SIDE]

G [PHASE SIGNAL FOR BOTTOM SIDE]

→ TIME

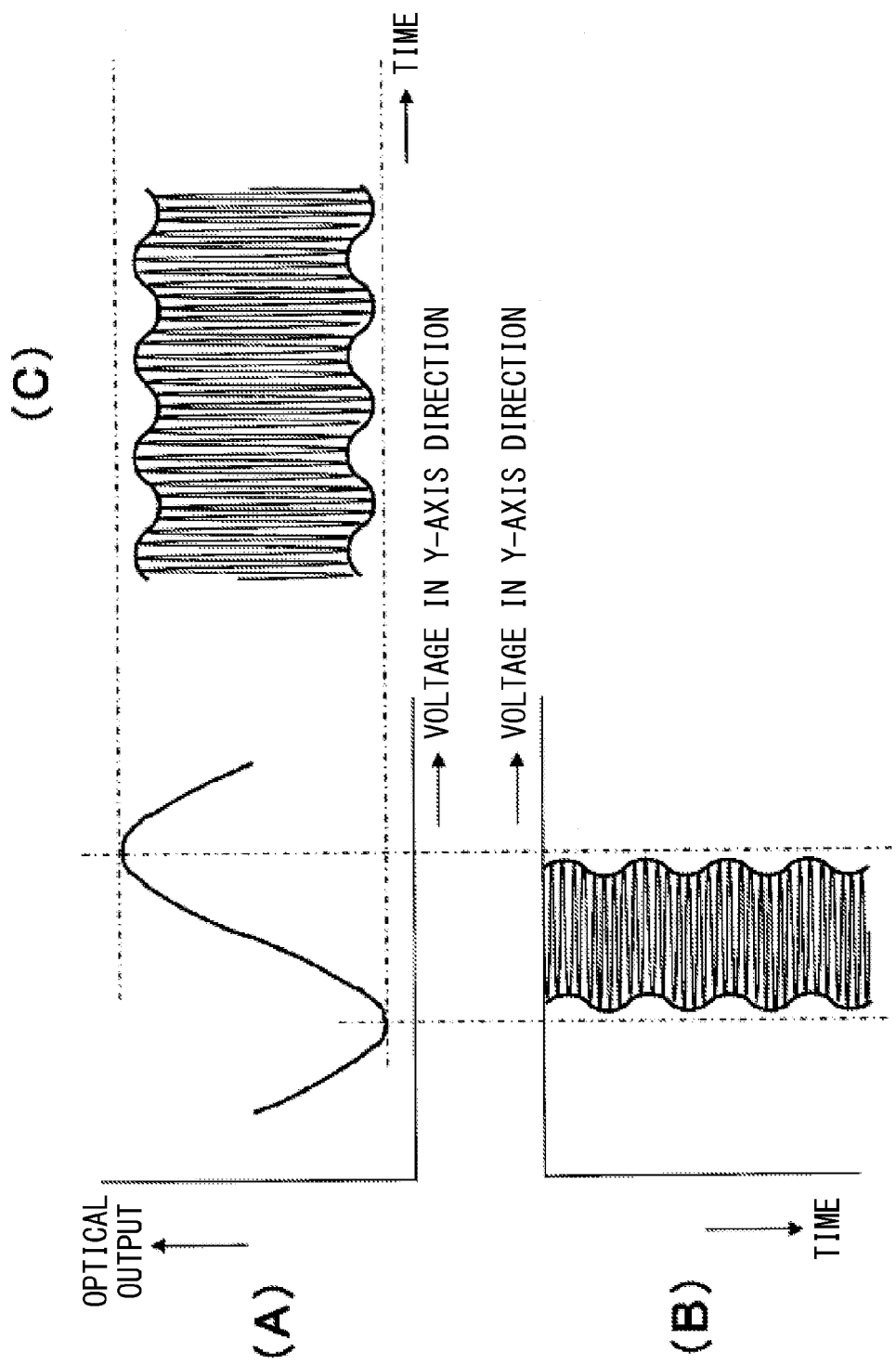
F I G. 2 4

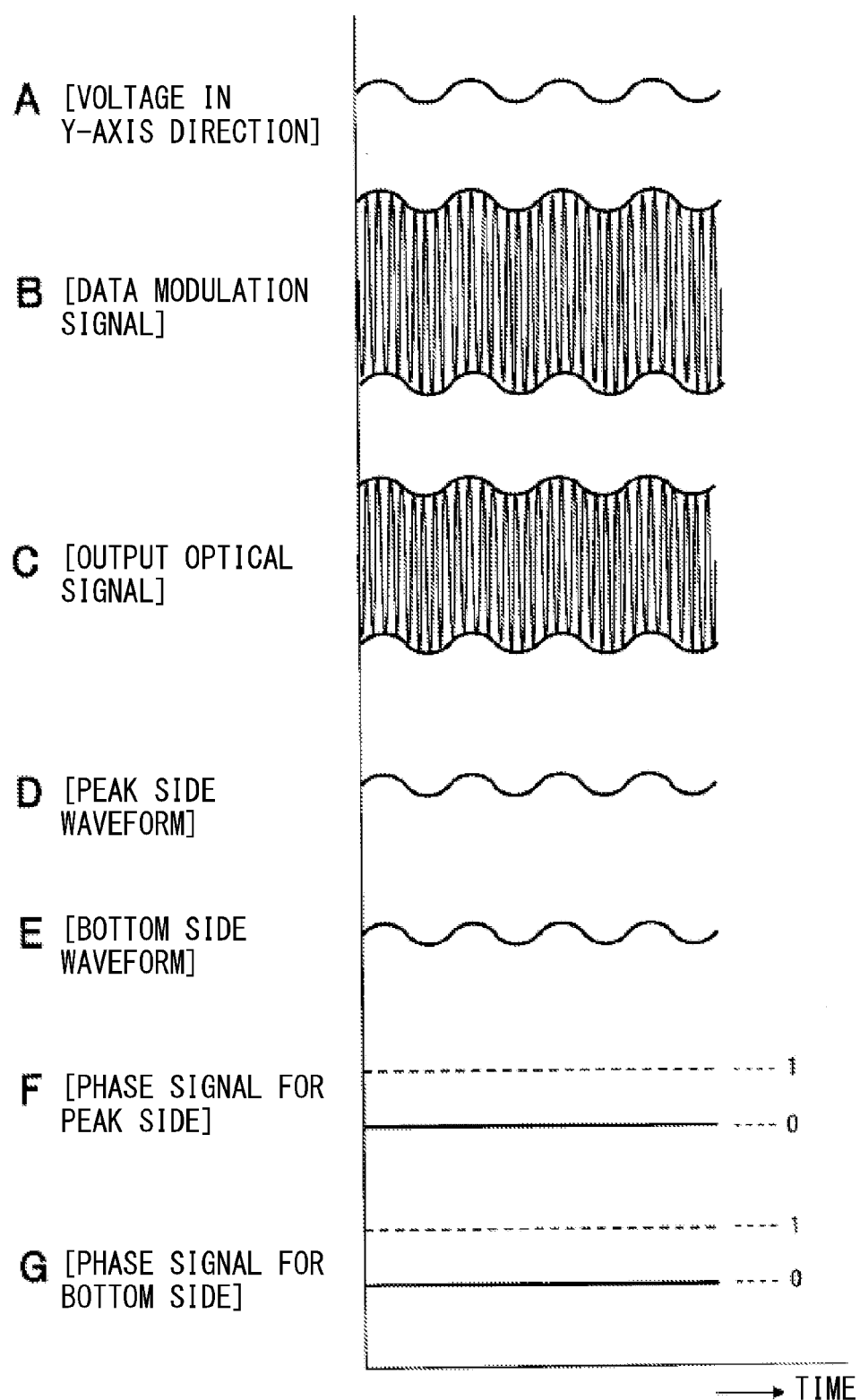
F I G. 2 5

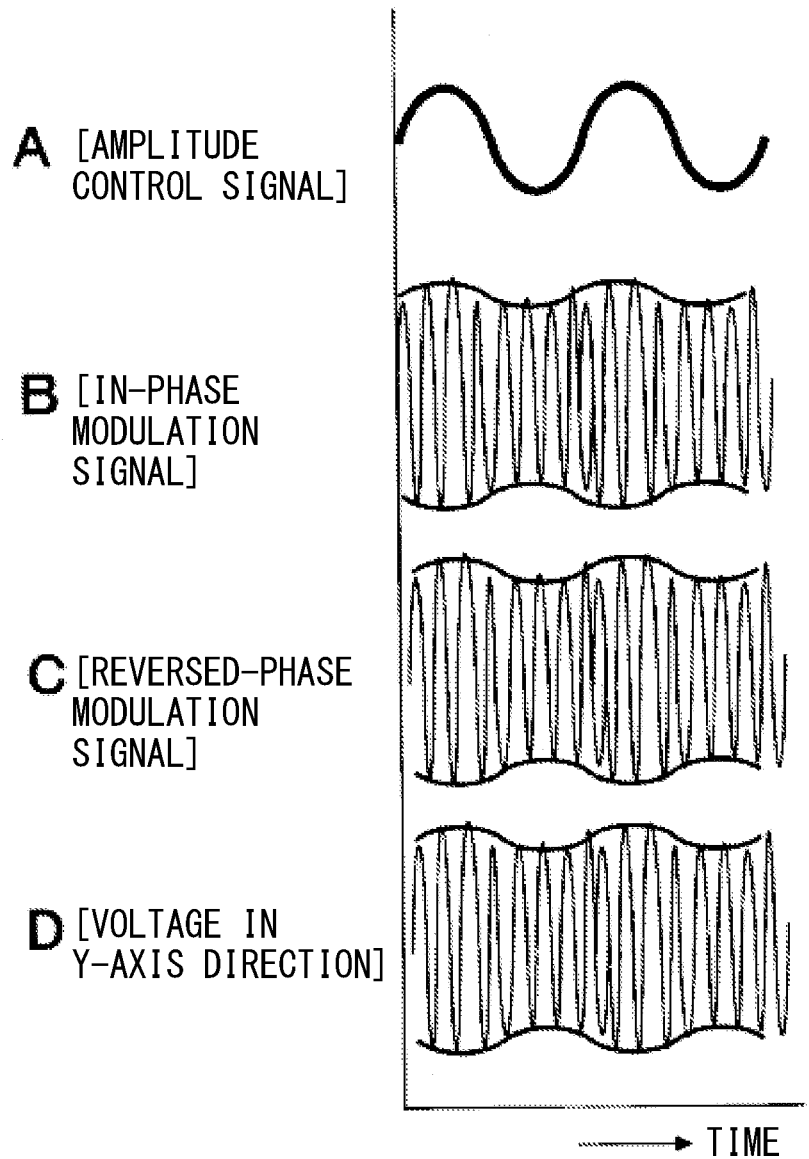
F I G. 3 5

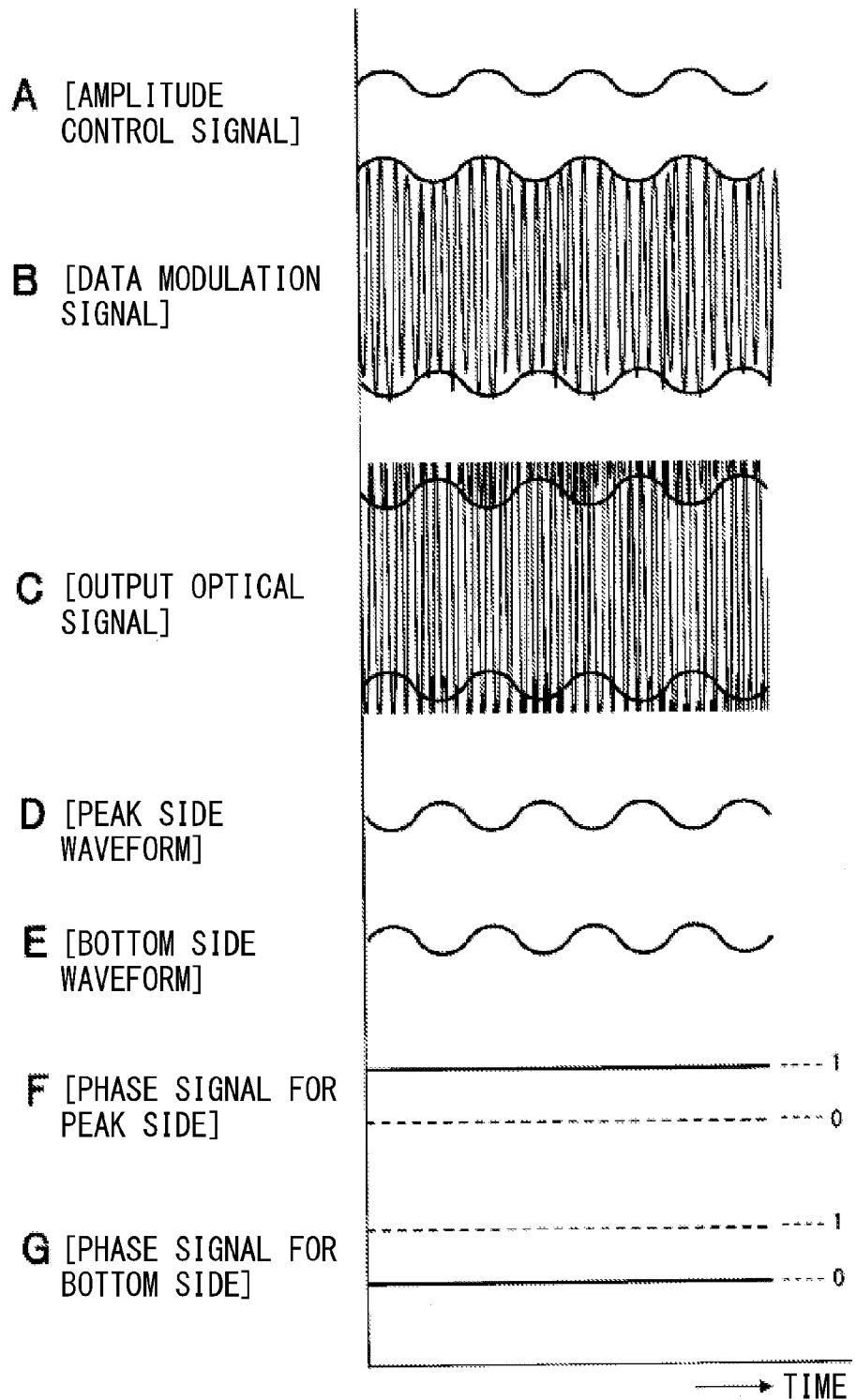
F I G. 4 0

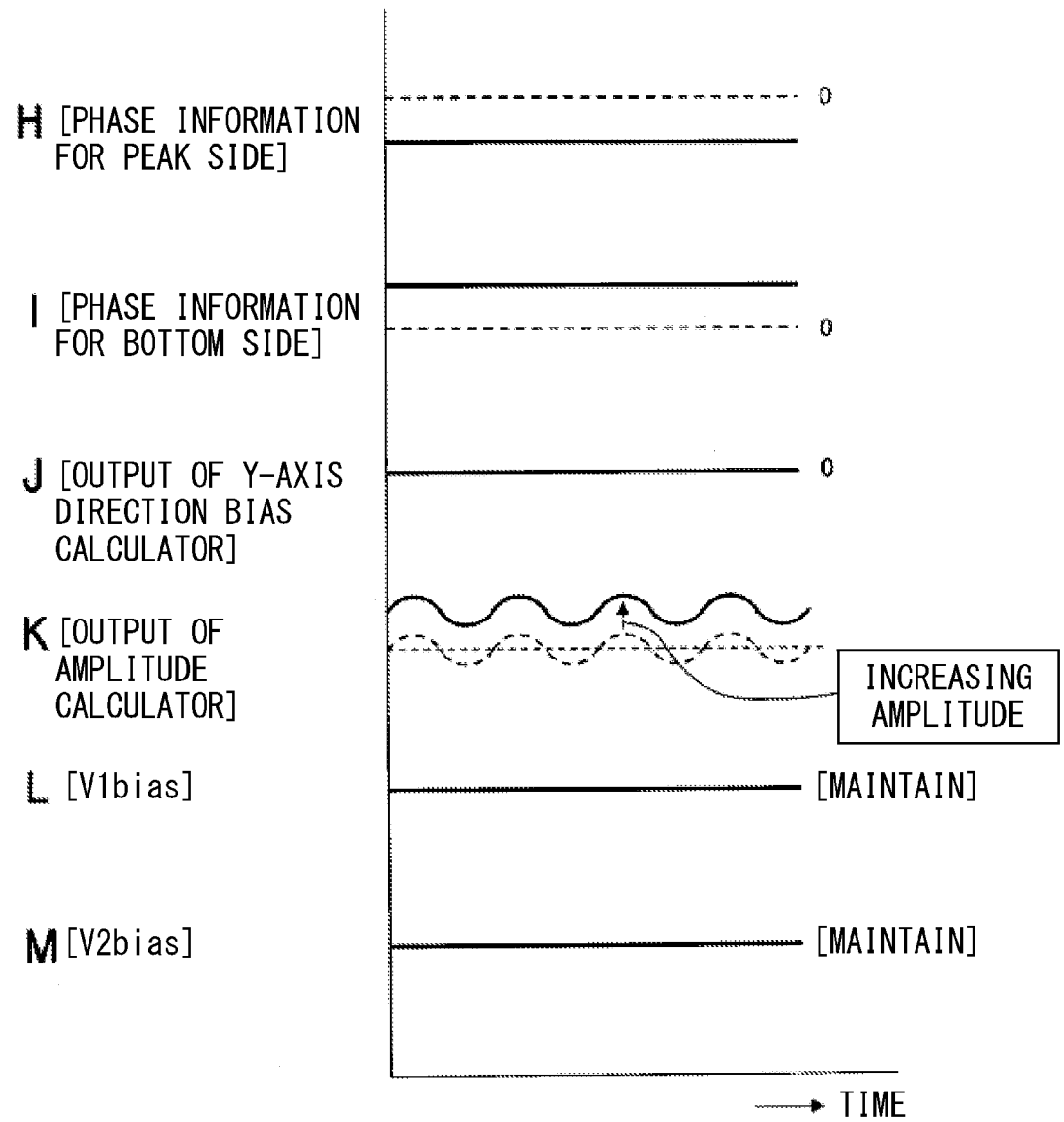
F I G. 4 4

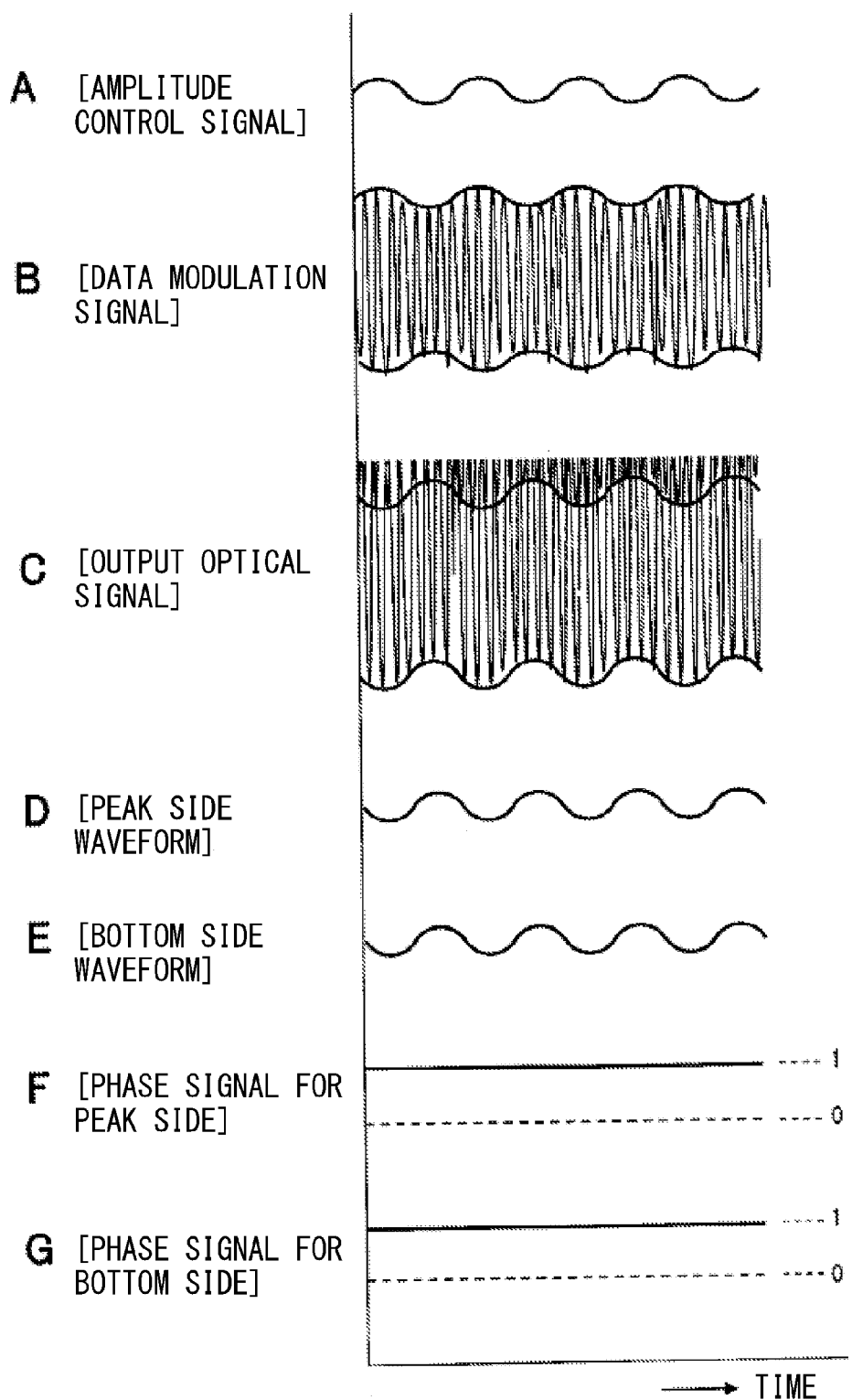
F I G. 4 9

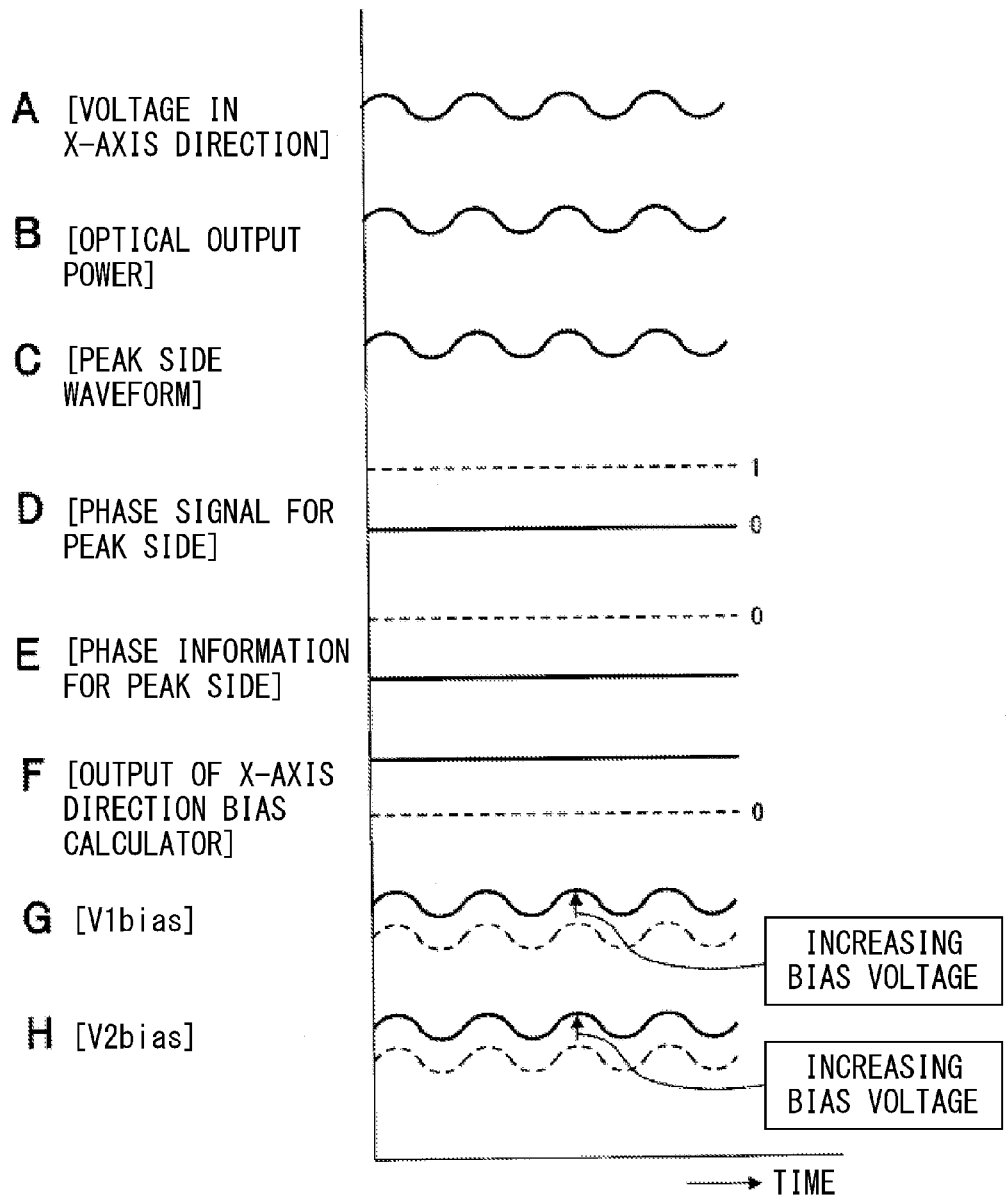
F I G. 5 7

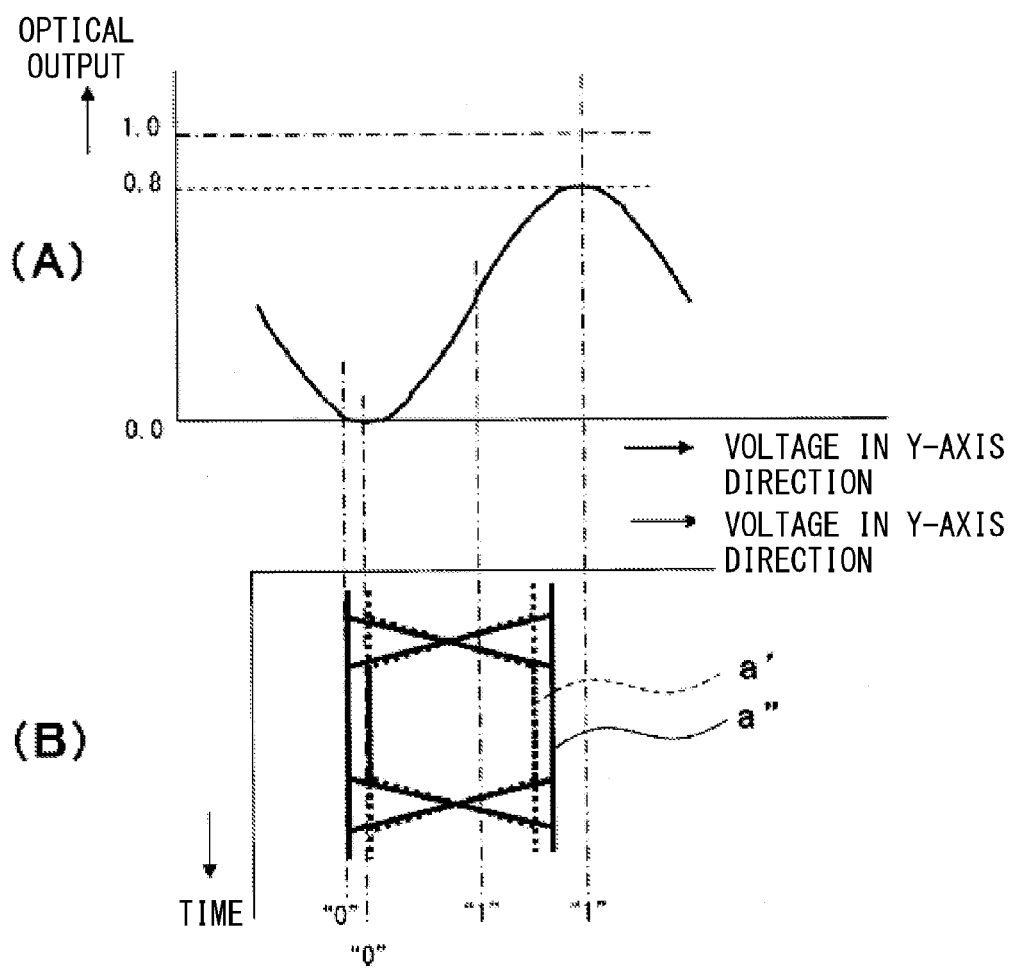
F I G. 6 3

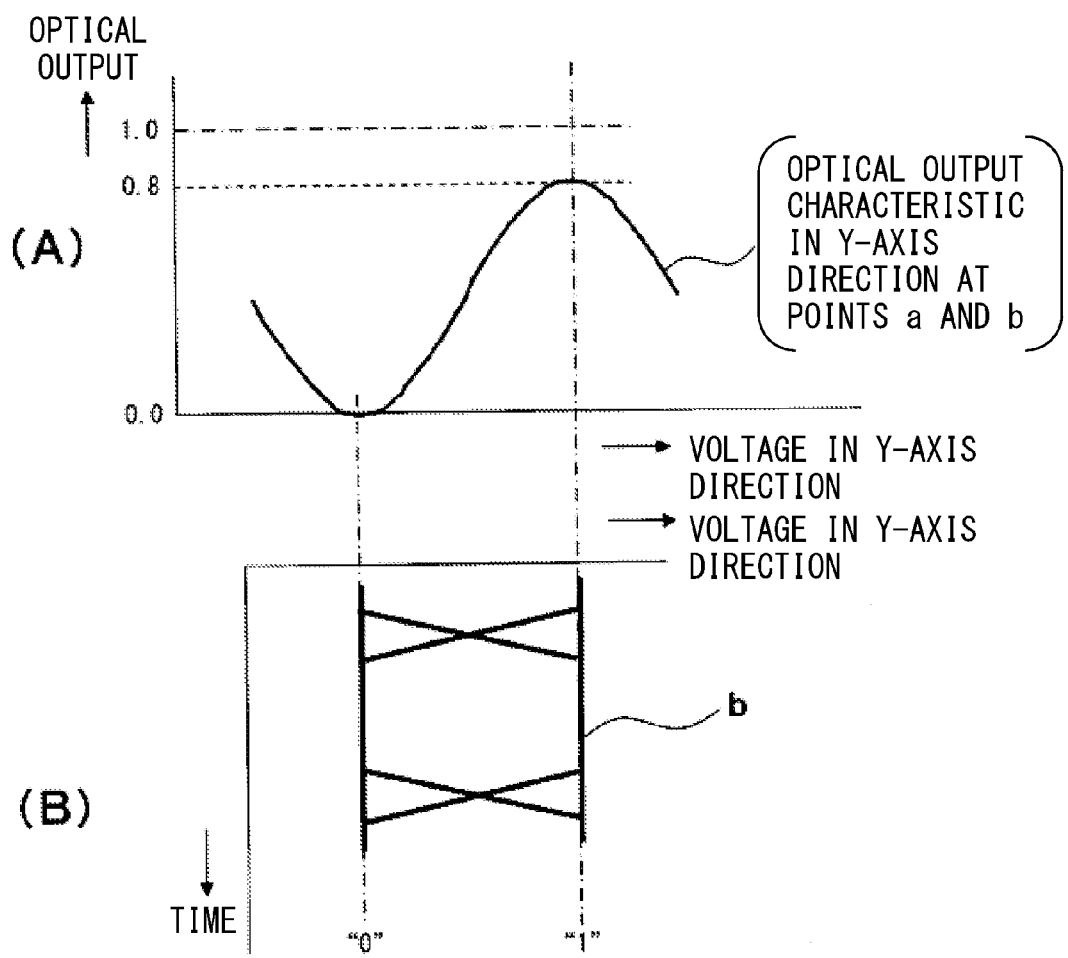
F I G. 6 4

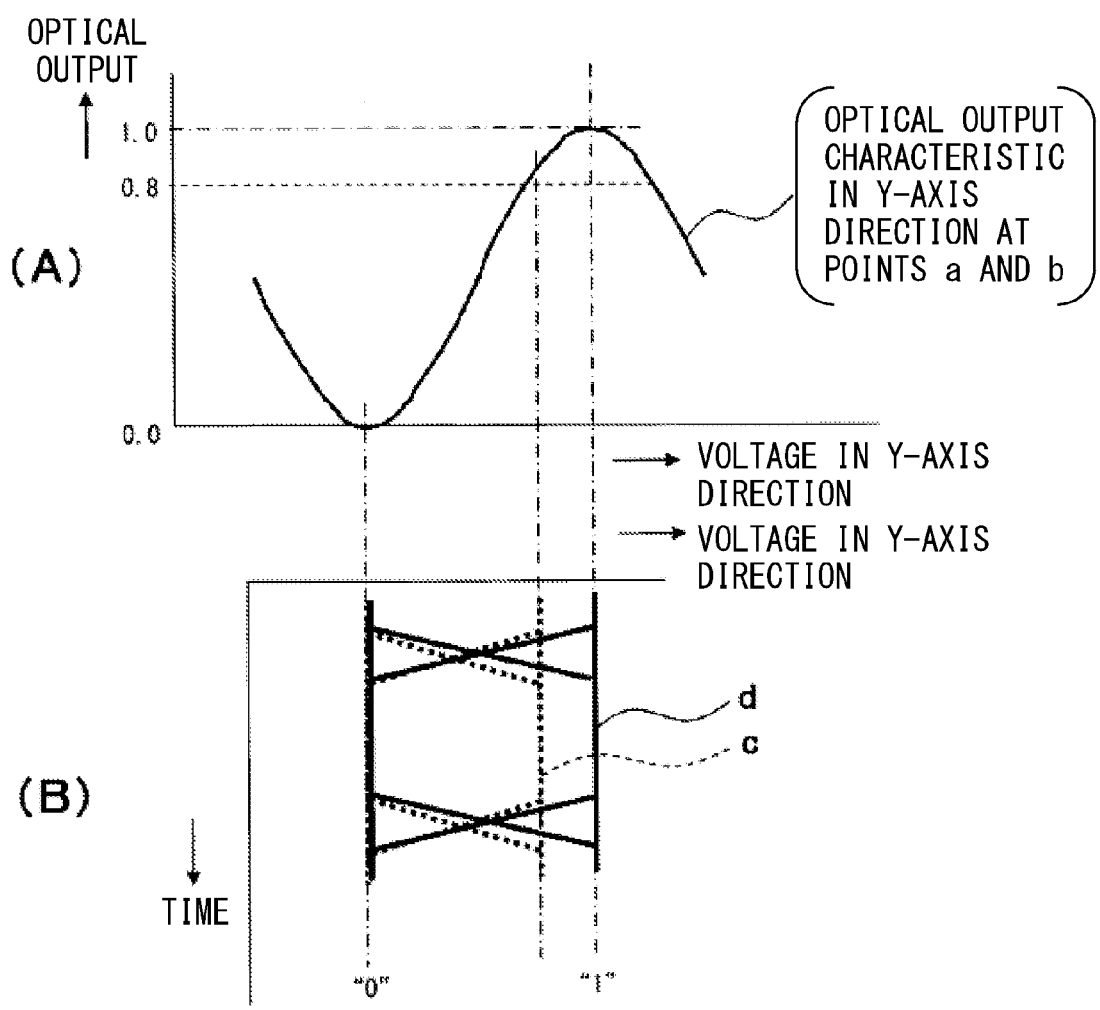
F I G. 6 6

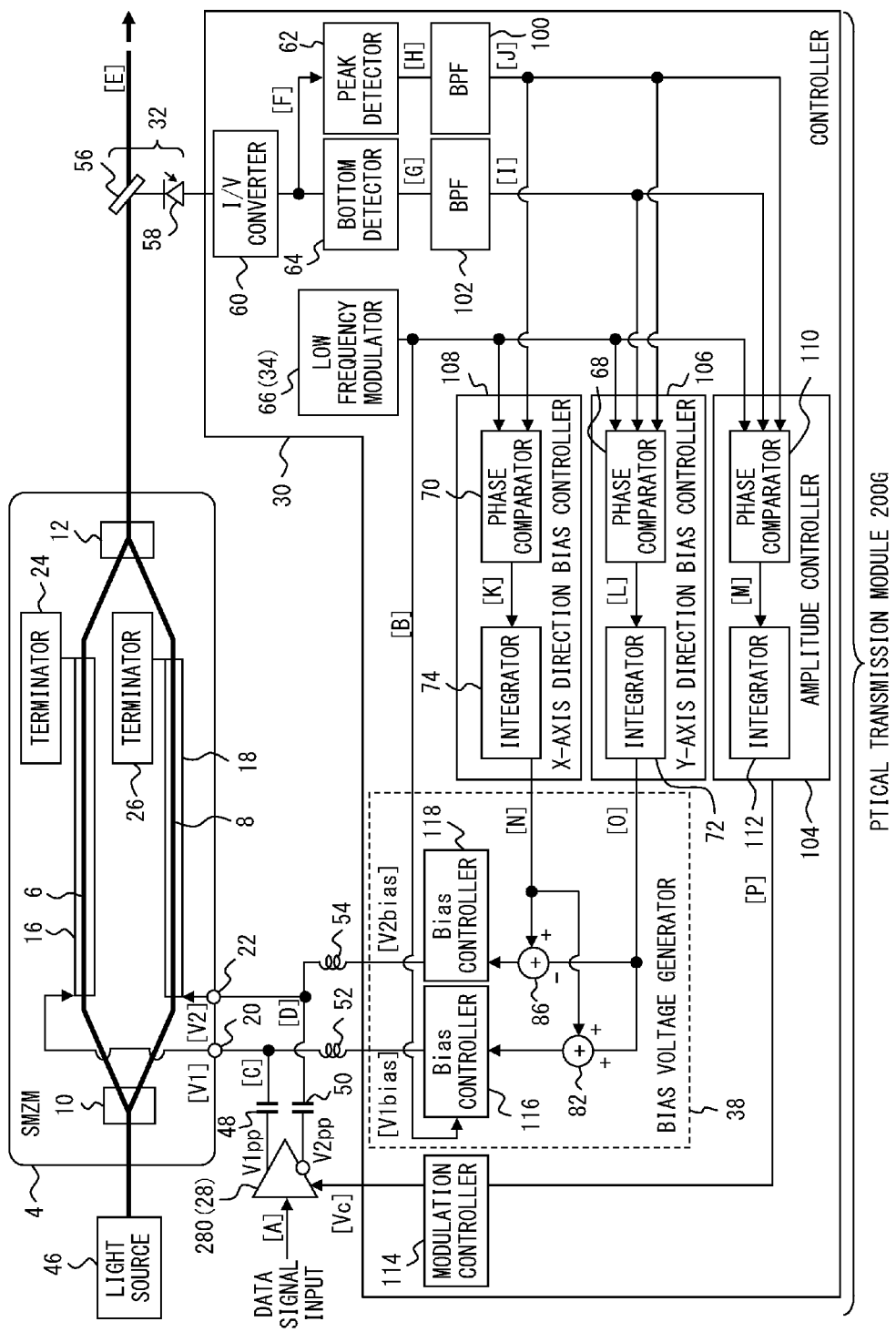
F I G. 6 8

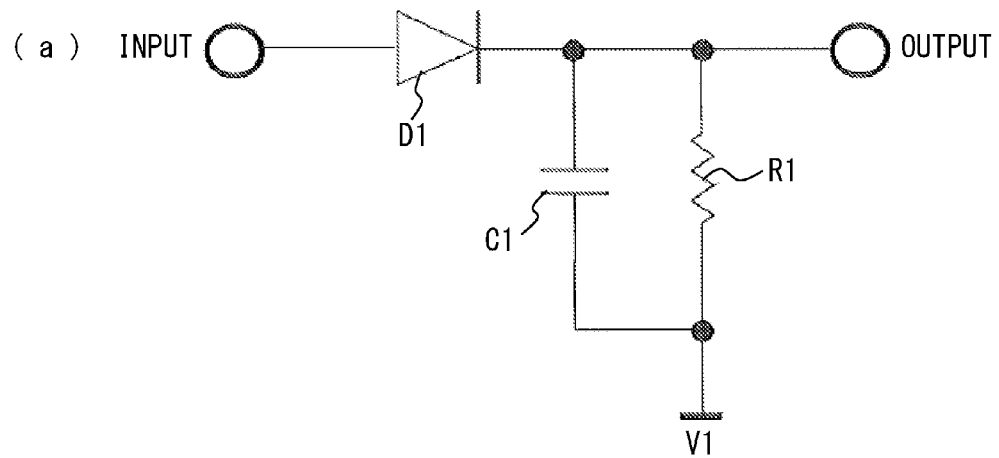
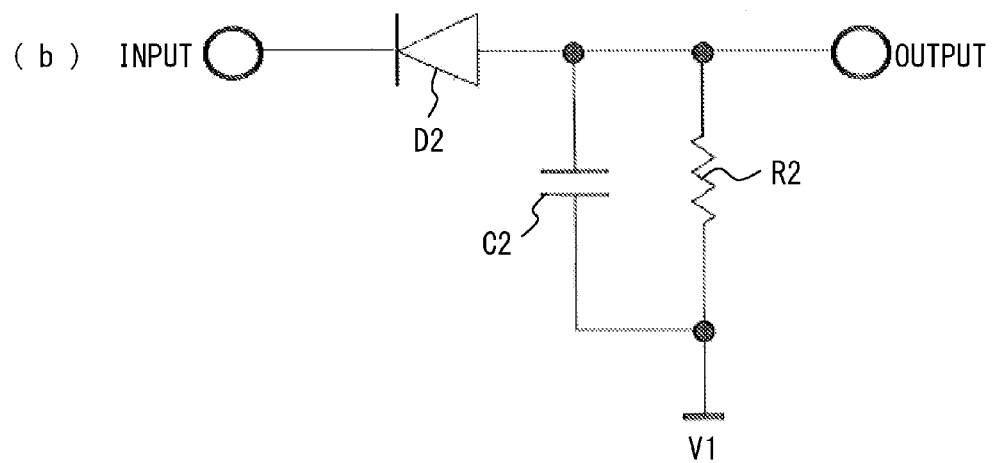
FIG. 82

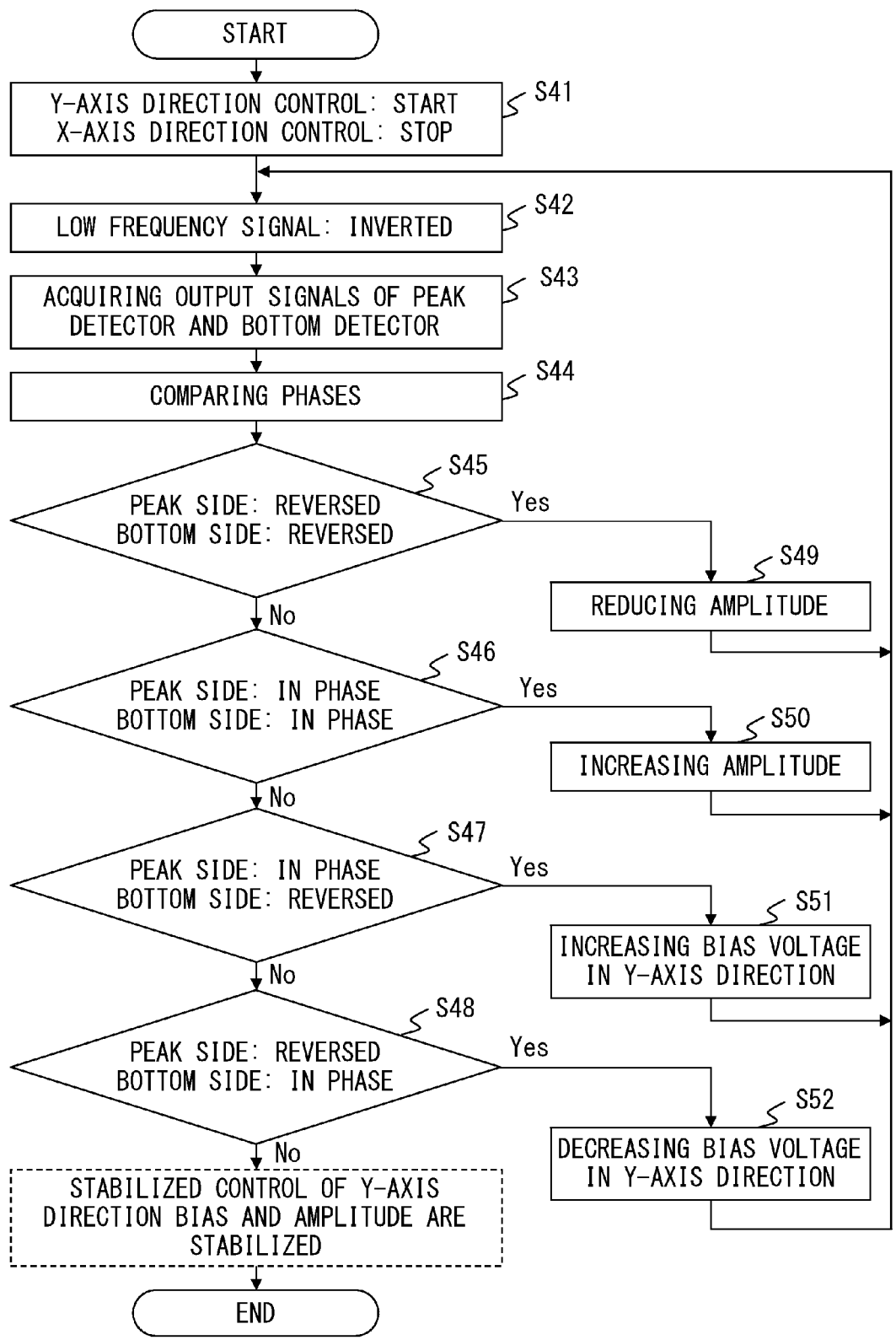
F I G. 86

OPTICAL MODULATOR AND OPTICAL MODULATION CONTROL METHOD

CROSS-REFERENCE TO RELATED APPLICATIONS

This application is based upon and claims the benefit of priority of the prior Japanese Patent Application No. 2010-259576, filed on Nov. 19, 2010, and the prior Japanese Patent Application No. 2011-085671, filed on Apr. 7, 2011, the entire contents of which are incorporated herein by reference.

FIELD

The embodiments described in the present application is related to an optical modulator and an optical modulation control method, and is applicable to the optical modulation using, for example, a semiconductor Mach-Zehnder modulator (SMZM).

BACKGROUND

Recently, a semiconductor Mach-Zehnder modulator (SMZM) has been commercialized as an optical modulator. The SMZM is more easily realized as a small device than an LN modulator etc., and has a broader wavelength band characteristic than an electro-absorption modulator (EA modulator).

As a related technique, an optical semiconductor device in which a semiconductor laser and a Mach-Zehnder modulator are integrated in the direction of optical waves guided on the same semiconductor substrate has been proposed (for example, Japanese Laid-open Patent Publication No. 2009-198881).

As another related technique, the following optical modulator has been proposed. That is, the optical modulator includes: optical interference means for branching input light into two optical waveguides, combining light beams which propagate the respective optical waveguides, and outputting the combined light; phase adjusting voltage supplying means for supplying a voltage for adjusting of the phase of propagated light to at least one optical waveguide in the two optical waveguides; direct current voltage supplying means for supplying a direct current voltage to at least one optical waveguide in the two optical waveguides; and direct current control means for controlling the value of the direct current voltage supplied by the direct current voltage supplying means depending on the wavelength of the input light (for example, Japanese Laid-open Patent Publication No. 2005-326548).

As a further related technique, the following optical transmitter has been proposed. That is, the optical transmitter includes: a light source, a drive circuit for generating a drive voltage depending on an input signal; an optical modulator for modulating the emitted light from the light source depending on the drive voltage, and converting the input signal into an optical signal; and an operation point stabilization circuit for detecting the drift of the operation characteristic curve of the optical modulator, and controlling the optical modulator so that the operation point is placed in a specified position with respect to the operation characteristic curve. The optical transmitter further includes an operation point shift circuit for shifting the operation point by half cycle on the operation characteristic curve according to an operation point switch signal (for example, Japanese Laid-open Patent Publication No. 04-140712).

The SMZM includes a pair of optical waveguides. The input light from the light source is branched and directed to the pair of optical waveguides. In addition, the SMZM also includes an electrode for supplying an electric field to each optical waveguide. A drive signal generated from a data signal and a bias voltage are applied to each electrode. Then the SMZM generates a modulated optical signal by modulating the input light with the drive signal. In this case, a high quality modulated optical signal is generated by appropriately adjusting the drive amplitude (that is, the amplitude of the drive signal) and the bias voltage.

However, the static characteristic of the SMZM indicates variance for each device, and depends of the wavelength of input light. Therefore, to determine in advance the optimum combination of a drive amplitude and a bias voltage for each SMZM while considering the wavelength of input light, an enormously long time is taken. In addition, although the optimum combination of a drive amplitude and a bias voltage is determined in advance for the SMZM, the static characteristic of the SMZM may be changed depending on the ambient temperature, aging, etc. If the static characteristic of the SMZM changes, the quality of a modulated optical signal is degraded. For example, there occur the fold-back of an optical waveform, the degradation of an extinction ratio, the fluctuation of a cross point, the reduction of the aperture of an optical waveform, etc.

The static characteristic of the SMZM is different from that of a common LN modulator. Therefore, although a method of adjusting the operating state of an LN modulator is introduced to the SMZM, it is hard to optimize the operating state of the SMZM.

SUMMARY

According to an aspect of an invention, an optical modulator includes: a modulator including an optical waveguide provided in a semiconductor substrate having an electro-optical effect and an electrode for applying an electric field depending on a bias voltage and a modulation signal to the optical waveguide; a modulation signal generator to generate the modulation signal of a first frequency; a superimposer to superimpose a signal of a second frequency different from the first frequency on the bias voltage; and a bias controller to control the bias voltage in a modulation direction of the modulator and the bias voltage in an orthogonal direction which is orthogonal to the modulation direction based on a phase of the second frequency component extracted from a modulated optical signal generated by the modulator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example of a controlling operation method;

FIG. 10 illustrates the static characteristic of the SMZM;

FIG. 15 illustrates an example of an optical transmission module according to the fourth embodiment;

FIG. 17 illustrates the waveforms of respective points;

FIGS. 24-26 illustrate the case in which the modulation amplitude is small;

FIG. 35 illustrates the waveforms of respective points;

FIGS. 39-41 illustrate the case in which the modulation amplitude is large;

FIGS. 42-44 illustrate the case in which the modulation amplitude is small;

FIGS. 48-50 illustrate the case in which the bias voltage in the Y-axis direction is high;

FIGS. 56-57 illustrate the case in which the bias voltage in the X-axis direction is lower than the optimum value;

FIGS. 61-66 illustrate the characteristic in operation of the SMZM;

FIG. 68 illustrates an example of an optical transmission module according to the ninth embodiment;

FIG. 82 illustrates examples of a peak detector and a bottom detector;

FIG. 86 is a flowchart of the Y-axis direction control; and

DESCRIPTION OF EMBODIMENTS

First Embodiment

Figure 1:
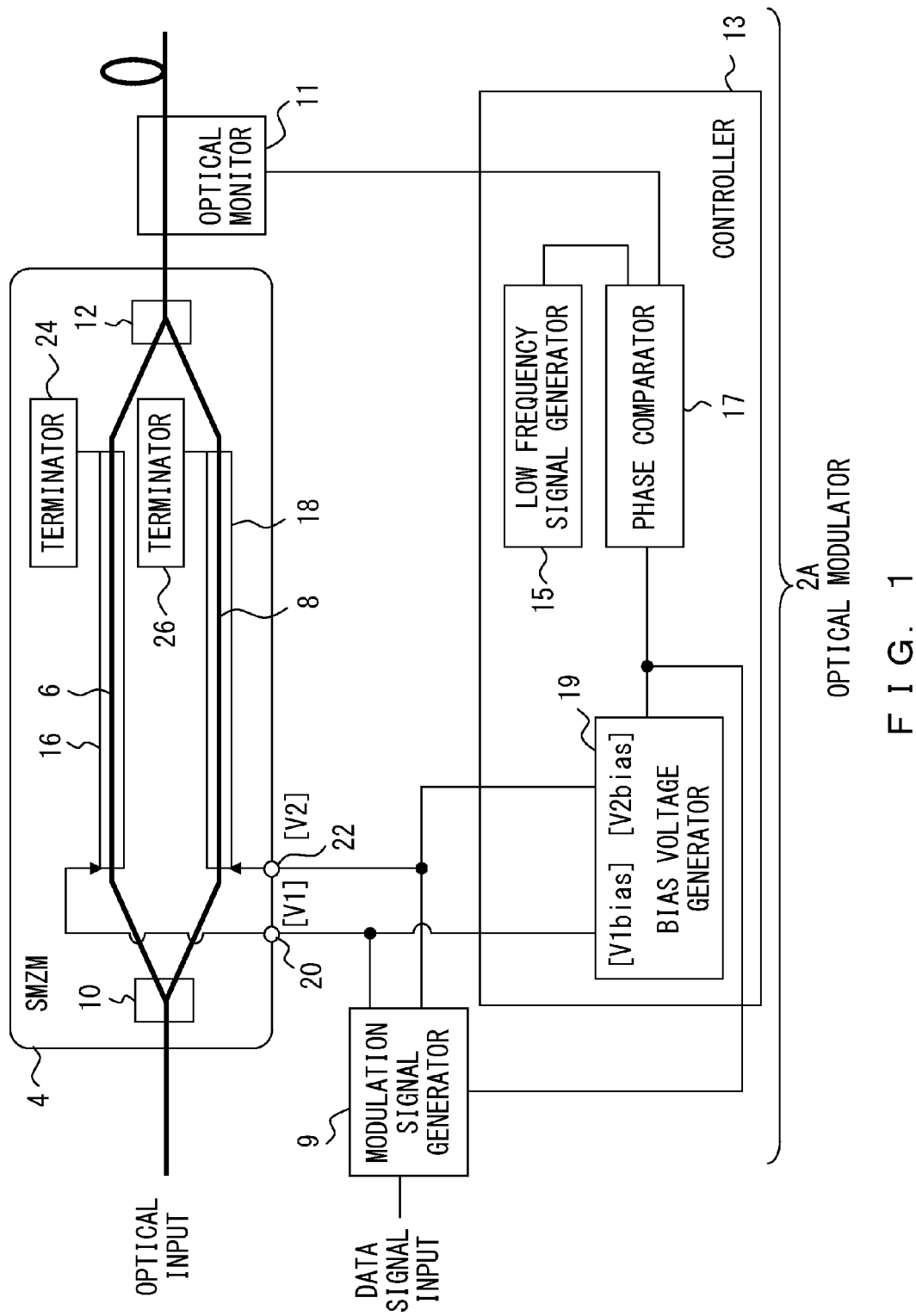
FIG. 1 illustrates an example of an optical modulator according to the first embodiment.

The first embodiment is described below with reference to FIG. 1. FIG. 1 illustrates an example of an optical modulator according to the first embodiment.

An optical modulator 2A according to the first embodiment is an example of the optical modulator of the present application. The optical modulator 2A is provided with a semiconductor Mach-Zehnder modulator (SMZM) 4 as an optical modulation device as illustrated in FIG. 1. The SMZM 4 is realized using a semiconductor substrate having an electro-optical effect.

The SMZM 4 is provided with a first optical waveguide 6 and a second optical waveguide 8. The optical waveguides 6 and 8 are formed in the above-mentioned semiconductor substrate. The optical waveguides 6 and 8 are formed, for example, parallel to each other. Input light is directed to the SMZM 4. The input light is carrier light for transmission of a signal, and may be CW (continuous wave) light generated by, for example, a direct current light source. The light source is, for example, a laser light source. However, an optical signal output from another optical modulator may be input to the SMZM 4. The input light is branched by an optical splitter 10, and directed to the optical waveguides 6 and 8. The lights which have passed the optical waveguides 6 and 8 are combined by a combiner 12. Thus, a modulated optical signal corresponding to a modulation signal such as a data signal etc. is generated.

A first signal electrode 16 is provided for the first optical waveguide 6. Also, a second signal electrode 18 is provided for the second optical waveguide 8. The optical waveguides 6 and 8 and the signal electrodes 16 and 18 are formed to realize a Mach-Zehnder interferometer in the semiconductor substrate having an electro-optical effect. The first signal electrode 16 is electrically coupled to a first input terminal 20, and the second signal electrode 18 is electrically coupled to a second input terminal 22. First input voltage V1 is given to the input terminal 20, and second input voltage V2 is given to the input terminal 20. Terminators 24 and 26 are electrically coupled to the signal electrodes 16 and 18, respectively.

An optical monitor 11 monitors a modulated optical signal output from the SMZM 4. That is, the optical monitor generates an electric signal indicating the modulated optical signal and guides the electric signal to a controller 13.

The controller 13 includes a low frequency signal generator 15, a phase comparator 17, and a bias voltage generator 19. The low frequency signal generator 15 generates a low frequency signal. The frequency of the low frequency signal is different from the frequency of the modulation signal (or different from the symbol rate of the output optical signal). In this example, the frequency of the low frequency signal is much lower than the frequency of the modulation signal. The low frequency signal is, for example, superimposed on a bias voltage generated by the bias voltage generator 19. Otherwise, the low frequency signal may be superimposed on the amplitude control voltage for control of the amplitude of a modulation signal generated by a modulation signal generator 9. In any case, the optical output of the SMZM 4 contains the component of the low frequency signal (which may be hereafter referred to as a "low frequency component") or its harmonic components.

The phase comparator 17 detects the phase of the low frequency component extracted from the modulated optical signal with respect to the low frequency signal generated by the low frequency signal generator 15. The bias voltage generator 19 controls bias voltages V1bias and V2bias to be applied to the signal electrodes 16 and 18 based on the phase detected by the phase comparator 17.

The modulation signal generator 9 generates a modulation signal from an input data signal. In this case, the modulation signal generator 9 generates a pair of an in-phase modulation signal V1pp and a reversed-phase modulation signal V2pp as modulation signals to realize push-pull drive (differential drive). The amplitude of the modulation signals is controlled based on the phase detected by the phase comparator 17.

The input voltage V1 is generated by applying the in-phase modulation signal V1pp to the bias voltage V1bias. The input voltage V2 is generated by applying the reversed-phase modulation signal V2pp to the bias voltage V2bias. The operation of adding the modulation signals V1pp and V2pp to the bias voltages V1bias and V2bias respectively is realized by, for example, a bias T circuit. The bias T circuit includes an inductor and a capacitor. Using the bias T circuit, the high frequency signals (V1pp, V2pp) are not affected by the direct current components (V1bias, V2bias), and the direct current components are not affected by the high frequency signals. The configuration and operation of the bias T circuit are described in, for example, Japanese Laid-open Patent Publication No. 2007-109839.

When the input voltages V1 and V2 are applied to the signal electrodes 16 and 18, the refractive indices of the optical waveguides 6 and 8 are changed depending on the applied voltages by an electro-optical effect. The changes of the refractive indices change the phases of the transmission light of the optical waveguides 6 and 8. That is, the refractive index of the optical waveguide 6 changes depending on the input voltage V1, and the refractive index of the optical waveguide 8 changes depending on the input voltage V2. As a result, in each optical waveguide, a phase shift occurs. In this case, when the phases of a pair of light beams which pass through the optical waveguides 6 and 8 are identical at the combiner 12, the output optical power of the SMZM 4 indicates the highest intensity. On the other hand, when the phases of a pair of light beams which pass through the optical waveguides 6 and 8 are reversed to each other at the combiner 12, the output optical power of the SMZM 4 indicates the lowest intensity. Thus, by controlling the electric fields of the optical waveguides 6 and 8 using the modulation signal, the optical intensity modulation is realized. With the configuration illustrated in FIG. 1, push-pull drive (differential drive) is performed, thereby acquiring a modulated optical signal of low chirp.

FIG. 2 illustrates an optical modulation control method according to the first embodiment. The procedure illustrated in FIG. 2 is an example of the optical modulation control method according to the present application.

In S11, a bias voltage and a modulation signal are provided for the optical waveguides 6 and 8. Thus, the SMZM 4 modulates the transmission light passing through the optical waveguides 6 and 8.

In S12, the modulation signal generator 9 performs amplitude modulation using a low frequency signal. The modulation signal generator 9 generates an amplitude-modulated modulation signal. The amplitude-modulated modulation signal is applied to the signal electrodes 16 and 18 provided for the optical waveguides 6 and 8. As a result, the modulated optical signal output from the SMZM 4 includes low frequency component.

In S13, the controller 13 detects the phase of the low frequency component in the output optical signal of the SMZM 4 with respect to the low frequency signal. Then, based on the detected phase, the controller 13 controls the amplitude of the modulation signal generated by the modulation signal generator and/or the bias voltage generated by the bias voltage generator 19.

By the above-mentioned configuration and method, the low frequency component in the optical output of the SMZM 4 is monitored and the low frequency component is synchronously detected using the low frequency signal, thereby detecting the phase of the low frequency component in the optical output or the double frequency component of the low frequency signal. In this case, since the optical output of the SMZM 4 includes the information indicating the operating state of the SMZM 4, the information for control of the operating state is obtained by detecting the phase and/or the double frequency component.

In addition, in the method of the embodiment, since the amplitude of the modulation signal and the bias voltage are controlled according to the phase information, the modulation amplitude and the bias voltage are automatically optimized or substantially optimized depending on the characteristic of the SMZM 4. That is, when the temperature fluctuates or aging occurs, or even a circuit error exists, the optimum modulation amplitude and bias voltage can be set. Therefore, regardless of various fluctuation factors, the modulating operation is stabilized, and a stable modulated optical signal is obtained.

In the above-mentioned embodiment, the modulation signal and the bias voltage are input to both of the signal electrodes 16 and 18, and both of them are controlled. However, the present invention is not limited to this configuration. That is, the present invention may be configured to control one of the amplitude of a modulation signal and the bias voltage. With the configuration for optimizing one of the amplitude of a modulation signal and the bias voltage, the modulating operation is stabilized to a certain level, and stable optical output is obtained.

Second Embodiment

Figure 3:
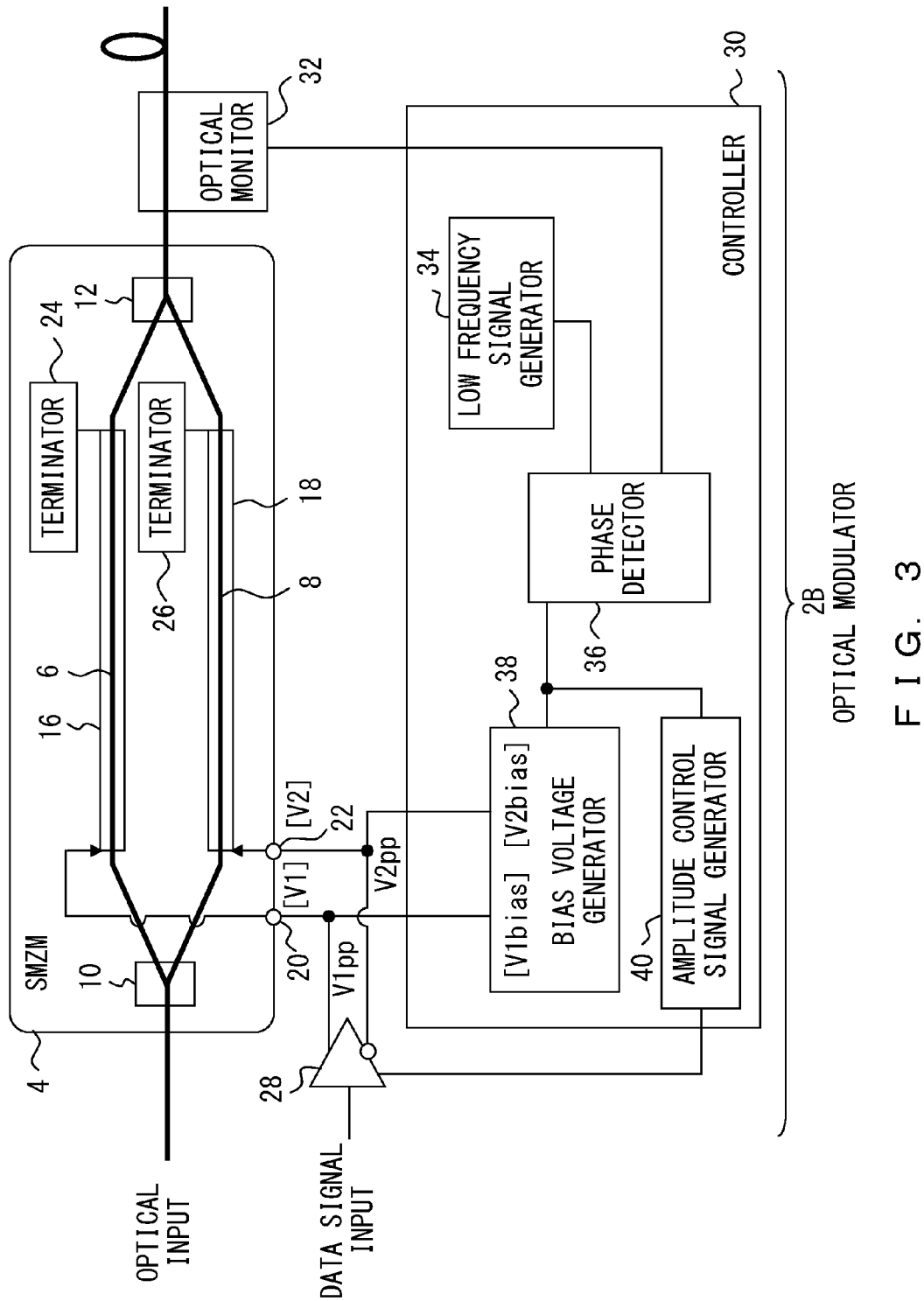
FIG. 3 illustrates an example of an optical modulator according to the second embodiment.

The second embodiment is described below with reference to FIG. 3. FIG. 3 illustrates an example of an optical modulator according to the second embodiment. The configuration illustrated in FIG. 3 is an example, and the present invention is not limited to the configuration illustrated in FIG. 3. In FIG. 3, similar element also illustrated in FIG. 1 is assigned the same reference numeral.

An optical modulator 2B according to the second embodiment is an example of the optical modulator and the optical modulation control method of the present application. The optical modulator 2B is provided with the SMZM (semiconductor Mach-Zehnder modulator) 4 as an optical modulation device as illustrated in FIG. 3.

As with the first embodiment, the SMZM 4 forms a Mach-Zehnder interferometer, and has a similar function. Therefore, as with the first embodiment, the optical waveguides 6 and 8 and the signal electrodes 16 and 18 provide the refractive index modulation generated by the electro-optical effect according to the input voltages V1 and V2 including the modulation signal. That is, by the input voltages V1 and V2, the refractive indices of the optical waveguides 6 and 8 change, and phase shifts occur. In this case, when the phases of a pair of light beams which pass through the optical waveguides 6 and 8 are identical to each other at the combiner 12, the output optical power of the SMZM 4 indicates the highest intensity. On the other hand, when the phases of a pair of light beams which pass through the optical waveguides 6 and 8 are reversed to each other at the combiner 12, the output optical power of the SMZM 4 indicates the lowest intensity. Thus, by controlling the electric fields of the optical waveguides 6 and 8 using the modulation signal, the optical intensity modulation is realized. Since the push-pull drive (differential drive) is performed, a modulated optical signal of low chirp is acquired.

A drive circuit 28 is an example of a modulation signal generator of the SMZM 4. The drive circuit 28 generates data signal modulation signals V1$pp$ and V2$pp$ from an input data signal. The amplitude of data signal modulation signals V1$pp$ and V2$pp$ is controlled by a amplitude control signal Vc from a controller 30.

An optical monitor 32 is provided at the output side of the SMZM 4. The controller 30 includes a low frequency signal generator 34, a phase detector 36, a bias voltage generator 38, and an amplitude control signal generator 40.

The optical monitor 32 monitors the optical output of the SMZM 4, and generates and guides the signal indicating the optical output to the phase detector 36 of the controller 30. The low frequency signal generator 34, which is a reference signal source, generates a low frequency signal (dithering signal) as a reference signal. The phase detector 36 detects the phase of the low frequency component included in the optical output using the low frequency signal generated by the low frequency signal generator 34. In this case, for example, the phase detector 36 detects the phase of the low frequency component at the peak side and bottom side of the optical signal waveform. The frequency of the low frequency signal is, for example, about 1 kHz, and is much lower than the frequency or symbol rate of the data signal.

The bias voltage generator 38 generates a pair of bias voltages V1bias and V2bias depending on the detection result of the phase detector 36. The bias voltages V1bias and V2bias are direct current voltages depending on the detection result of the phase detector 36. However, the bias voltages V1bias and V2bias may be generated by superimposing in-phase or reversed-phase low frequency signal on the direct current voltages as necessary. The amplitude control signal generator 40 generates the amplitude control signal Vc depending on the detection result of the phase detector 36. The low frequency signal may be superimposed as necessary on the amplitude control signal Vc.

Figure 4:
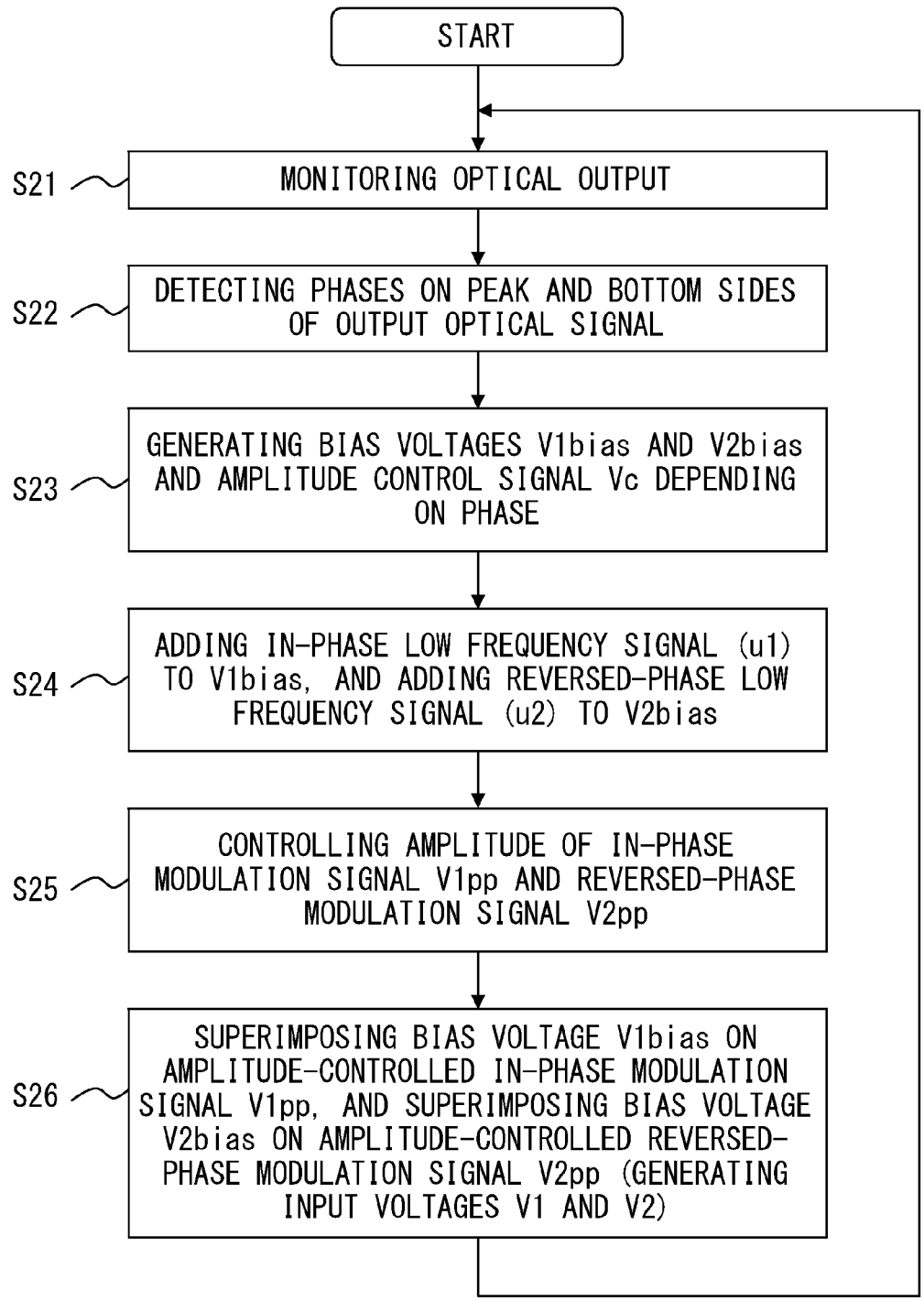
FIG. 4 is a flowchart of the procedure of the controlling operation.

The operation of generating the bias voltages V1bias and V2bias and amplitude control signal Vc is described below with reference to FIG. 4. FIG. 4 is a flowchart of the procedure of the controlling operation.

The controlling operation is an example of the optical modulation control method or the optical transmission control method of the present application. As illustrated in FIG. 4, the optical monitor 32 monitors the optical output of the SMZM 4 (S21). The phase detector 36 detects the phase at the peak side and bottom side of the low frequency component waveform included in the optical output by the synchronous detection using the low frequency signal (S22). The bias voltage generator 38 generates bias voltages V1bias and V2bias depending on the detected phase, and the amplitude control signal generator 40 generates the amplitude control signal Vc depending on the detected phase (S23). The controller 30 adds an in-phase low frequency signal (u1) to the bias voltage V1bias, and adds a reversed-phase low frequency signal (u2) to the bias voltage V2bias (S24). Both of the in-phase low frequency signal (u1) and the reversed-phase low frequency signal (u2) are obtained from the low frequency signal. The amplitude of the signals (u1) and (u2) is enough small not to affect the modulation signal. The drive circuit 28 generates the in-phase modulation signal V1$pp$ and the reversed-phase modulation signal V2$pp$ from the input data signal. At this time the drive circuit 28 controls the amplitude of the in-phase modulation signal V1$pp$ and the reversed-phase modulation signal V2$pp$ corresponding to the input data signal based on the amplitude control signal Vc (S25). The bias voltage V1bias is superimposed on the amplitude-controlled in-phase modulation signal V1$pp$, and bias voltage V2bias is superimposed on the amplitude-control reversed-phase modulation signal V2$pp$. Thus, the input voltages V1 and V2 are generated (S26).

The processes in S21-S26 are repeatedly performed. That is, the operations of controlling the bias voltages V1bias and V2bias and the amplitude control signal Vc are continuously performed. By the automatic controlling operations, the bias voltage and the modulation amplitude are optimized in a macro domain, the influence on the optical modulation output by temperature change, ageing, etc. is suppressed, thereby stabilizing the optical modulation output.

Figure 5:
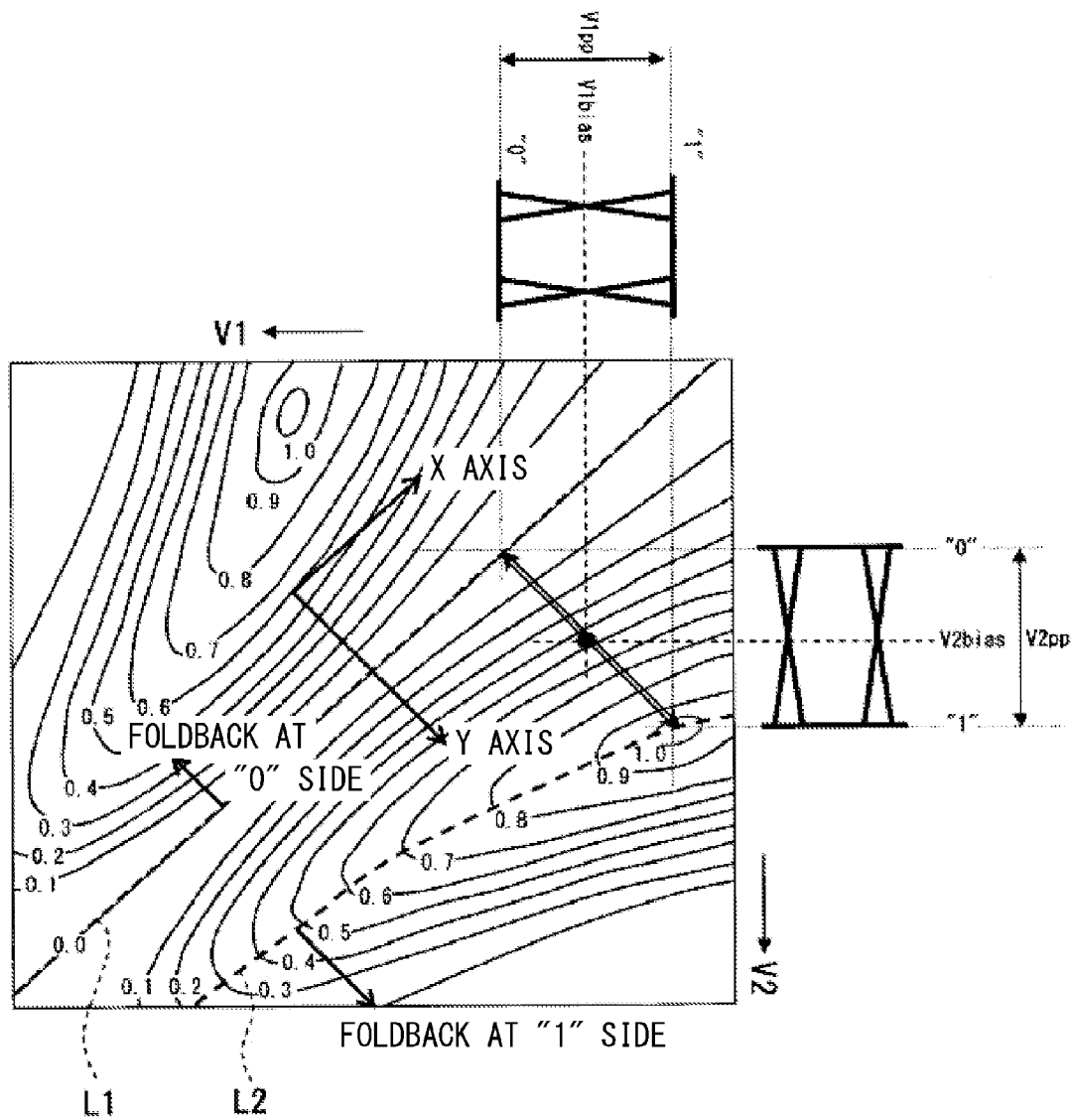
FIG. 5 illustrates an example of the static characteristic of the SMZM, and an example of the optimum driving state for optical intensity modulation.

Next, the static characteristic and the optical intensity modulation of the SMZM 4 are described below with reference to FIG. 5. FIG. 5 illustrates an example of the static characteristic of the SMZM, and an example of the optimum driving state for optical intensity modulation.

FIG. 5 is a three-dimensional graph indicating the characteristic of the SMZM 4. The horizontal axis indicates the input voltage V1 applied to the signal electrode 16 of the optical waveguide 6. The vertical axis indicates the input voltage V2 applied to the signal electrode 18 of the optical waveguide 8. The output optical power of the SMZM 4 is expressed using a level line in the direction perpendicular to the sheet of FIG. 5. The value assigned to the level line indicates the normalized optical output power. That is, the maximum optical power of the SMZM 4 is expressed as "1.0", and the minimum optical power (or extinction state) of the SMZM 4 is expressed as "0.0".

In the optical intensity modulation, to maximize the extinction ratio of the optical signal, the modulation is performed so that the drive state obtained by the input voltages V1 and V2 transits between the peak point (that is, the point where the optical power is "1.0") and the zero point (that is, the point where the operation point is "0.0") as illustrated in FIG. 5. To obtain this modulating operation, the amplitude voltage Vpp of the modulation signal to be applied to the optical waveguides 6 and 8 (that is, the amplitude voltage of the in-phase modulation signal V1pp and the reversed-phase modulation signal V2pp) and the bias voltages V1bias and V2bias are controlled to optimize the operating state. For example, the amplitude of the modulation signals V1pp and V2pp and the bias voltages V1bias and V2bias are controlled so that the data signal "1" is set at the peak point (optical power=1.0), and the data signal "0" is set at the zero point (optical power=0.0).

In this patent application, in the static characteristic graph illustrated in FIG. 5, the direction parallel to the level line whose optical power is zero is referred to as an "X axis" or an "X-axis direction". The level line whose optical power is zero is a straight line or a approximately straight line. The direction orthogonal to the X axis is referred to as a "Y-axis" or a "Y-axis direction".

The operating state of the SMZM 4 is controlled to transit between the peak point and the zero point illustrated in FIG. 5 as described above. That is, the state obtained by the voltage corresponding to an ideal modulation signal is the transit between the peak point and the zero point illustrated in FIG. 5. Therefore, in this patent application, the Y-axis direction is referred to as a "modulation direction". That is, the modulation direction is parallel or approximately parallel to the perpendicular line from the peak point to the level line whose optical power is zero in the static characteristic graph illustrated in FIG. 5. In other words, the modulation direction is orthogonal to the level line whose optical power is zero.

In FIG. 5, broken lines L1 and L2 indicate the level at which the "fold-back" occurs in the waveform of the output optical signal of the SMZM. The broken line L1 indicates the boundary line where the fold-back occurs on the bottom side of the optical waveform (that is, the low optical power side). The broken line L1 matches the level line whose optical power is zero. The broken line L2 indicates the boundary line where the fold-back occurs on the peak side of the optical waveform (that is, the high optical power side).

Figure 6:
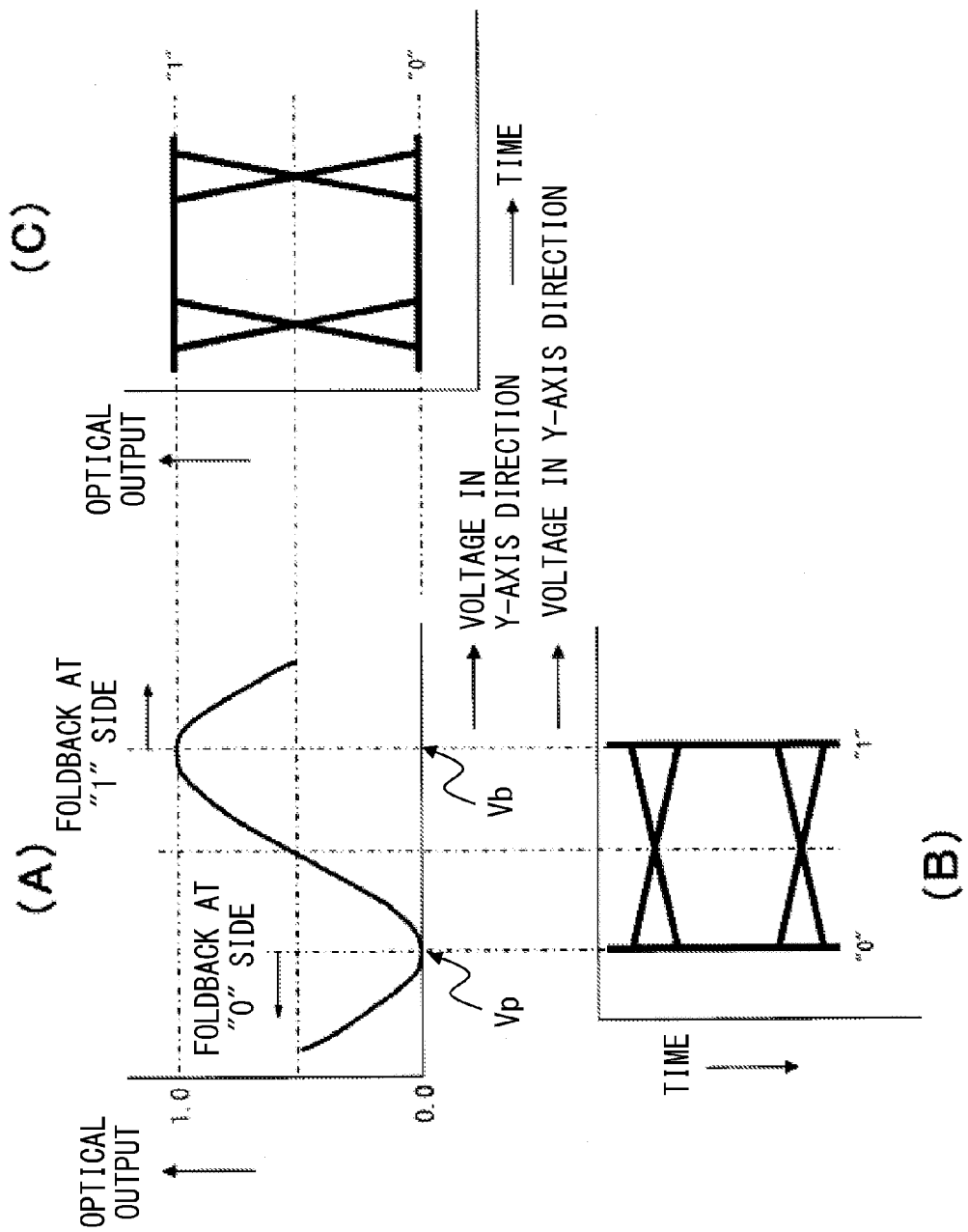
FIG. 6 illustrates the optical output characteristic in the Y-axis direction.

Next, the optical output characteristic in the Y-axis direction is described below with reference to FIG. 6. (A) in FIG. 6 illustrates the input/output characteristics of the optical modulator (that is, the SMZM 4). (B) in FIG. 6 illustrates the change of voltage (modulation signal) in the Y-axis direction. (C) in FIG. 6 illustrates the optical output waveform.

In the optical intensity modulation, as illustrated in FIGS. 6 (A) and (B), Vπ drive is performed. That is, the modulation signal "0" is converted into a voltage for the minimum optical power (bottom voltage Vb) preferably. The modulation signal "1" is converted into a voltage for the maximum optical power (peak voltage Vp) preferably. When the modulation signal is generated like this, an intensity modulated optical signal having a preferable extinction ratio is obtained.

In FIG. 6, when the amplitude of the modulation signal is smaller than Vπ, the extinction ratio of the output optical signal is degraded. When the voltage corresponding to the modulation signal "0" becomes lower than the bottom voltage Vb indicated in (A) of FIG. 6, the fold-back of the waveform occurs at the bottom side of the optical signal waveform. Similarly, when the voltage corresponding to the modulation signal "1" becomes higher than the peak voltage Vp, the fold-back of the waveform occurs at the peak side of the optical signal waveform.

Figure 7:
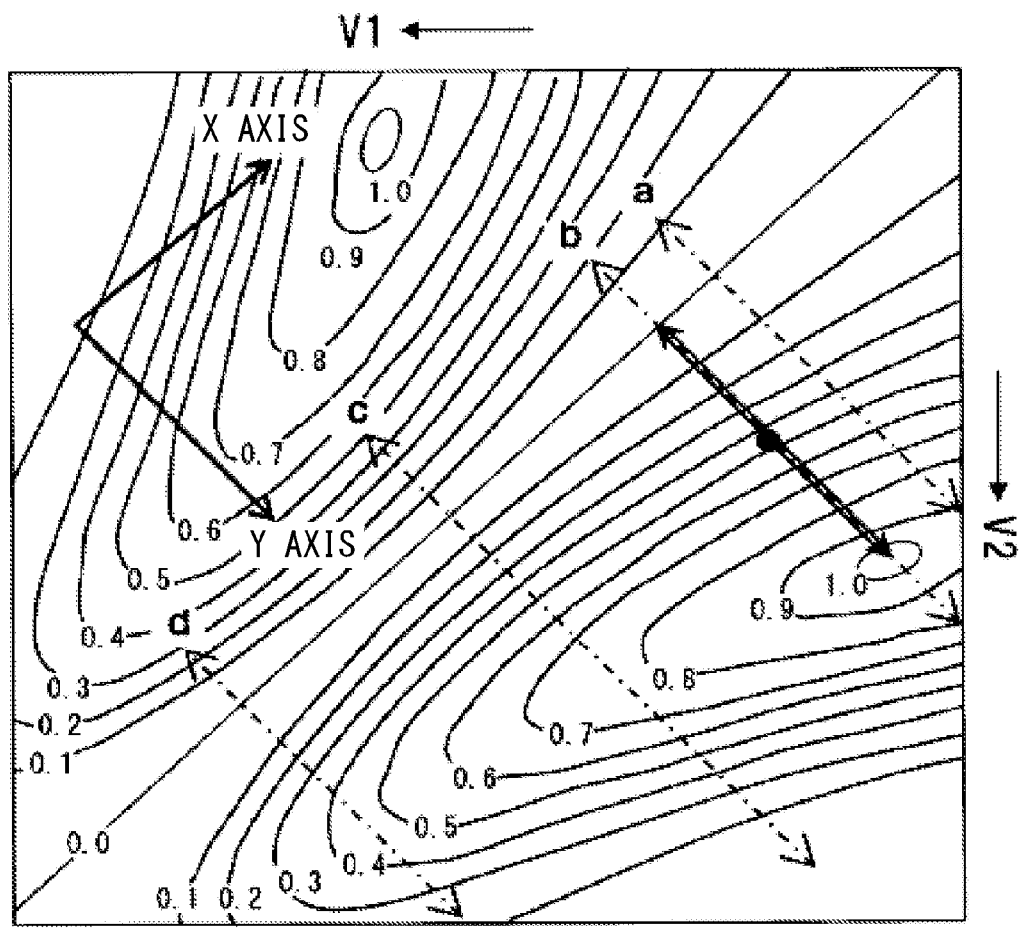
FIG. 7 illustrates the static characteristic of the SMZM.
Figure 8:
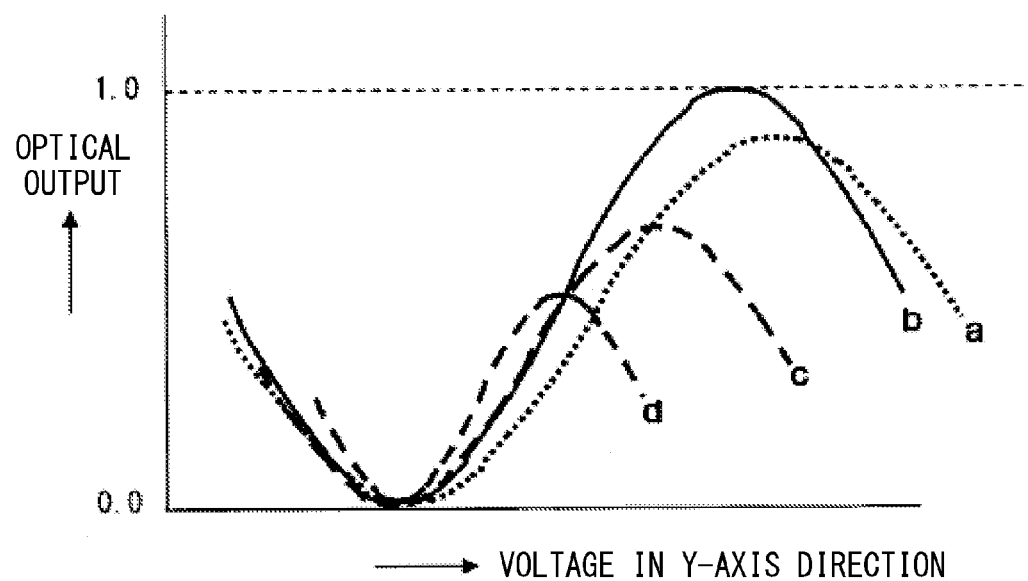
FIG. 8 is a two-dimensional graph of the optical output characteristic in the Y-axis direction.

The optical output characteristic in the Y-axis direction is further described below with reference to FIG. 7 and FIG. 8. FIG. 7 illustrates the static characteristic of the SMZM. FIG. 8 is a two-dimensional graph of the optical output characteristic in the Y-axis direction. The characteristic curves a through d illustrated in FIG. 8 respectively correspond to the four operating states a through d in FIG. 7.

In FIG. 7, the position on the two-dimensional graph indicates the bias voltage applied to the SMZM. That is, by controlling the bias voltage, a desired position on the two-dimensional graph can be acquired. The operating states a through d in FIG. 7 are different in bias voltage from one another in the X-axis direction. In addition, the lengths of the bi-directional arrows corresponding to the operating states a through d respectively indicate the amplitude of the corresponding modulation signals.

In FIG. 7, the state b represents the optimum bias state. When the bias voltage is adjusted to the optimum state b, the output optical power is "1.0". In this case, as illustrated in FIG. 8, high output optical power is obtained, and the extinction ratio is at the maximum.

When the bias voltage is shifted from the optimum value in the X-axis direction, the output optical power of the SMZM 4 decreases. For example, since the state a illustrated in FIG. 7 is located near the optimum state, the output optical power of the SMZM 4 is not much decreased (characteristic a in FIG. 8). On the other hand, since the states c and d illustrated in FIG. 7 are far from the optimum state, the output optical power of the SMZM 4 is much decreased (characteristics c and d in FIG. 8).

Figure 9:
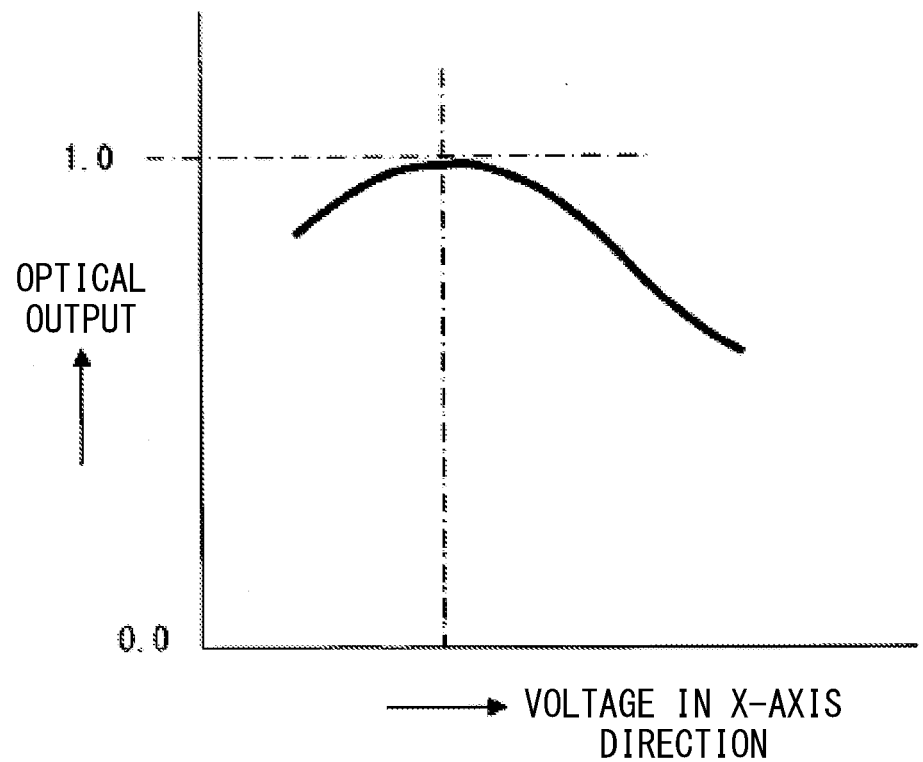
FIG. 9 illustrates the peak value of the optical output characteristic when the bias voltage is changed.

Thus, when the bias voltage is optimized, the output optical power of the SMZM indicates the maximum. When the bias voltage is shifted in the X-axis direction with respect to the optimum value, the peak value of the output optical power of the SMZM becomes smaller as illustrated in FIG. 9. That is, when the bias voltage is optimized, the maximum optical output power is obtained. Therefore, preferable optical intensity modulation is realized by optimizing the amplitude voltage Vpp of the modulation signals V1pp and V2pp and the bias voltages V1bias and V2bias to be applied to the optical waveguides 6 and 8 in the SMZM 4.

As described above, in the optical modulator 2B, when the modulation signal voltage corresponding to "0" is arranged at the zero point (optical power=0.0), and the modulation signal voltage corresponding to "1" is arranged at the peak point (optical power=1.0), then the optical intensity modulation having the optimum extinction ratio, position of the cross point, and aperture are realized. Therefore, the modulation control method according to the present embodiment controls the amplitude of the modulation signals V1pp and V2pp and bias voltages V1bias and V2bias so that the above-mentioned optimum operating state is obtained.

Figure 11:
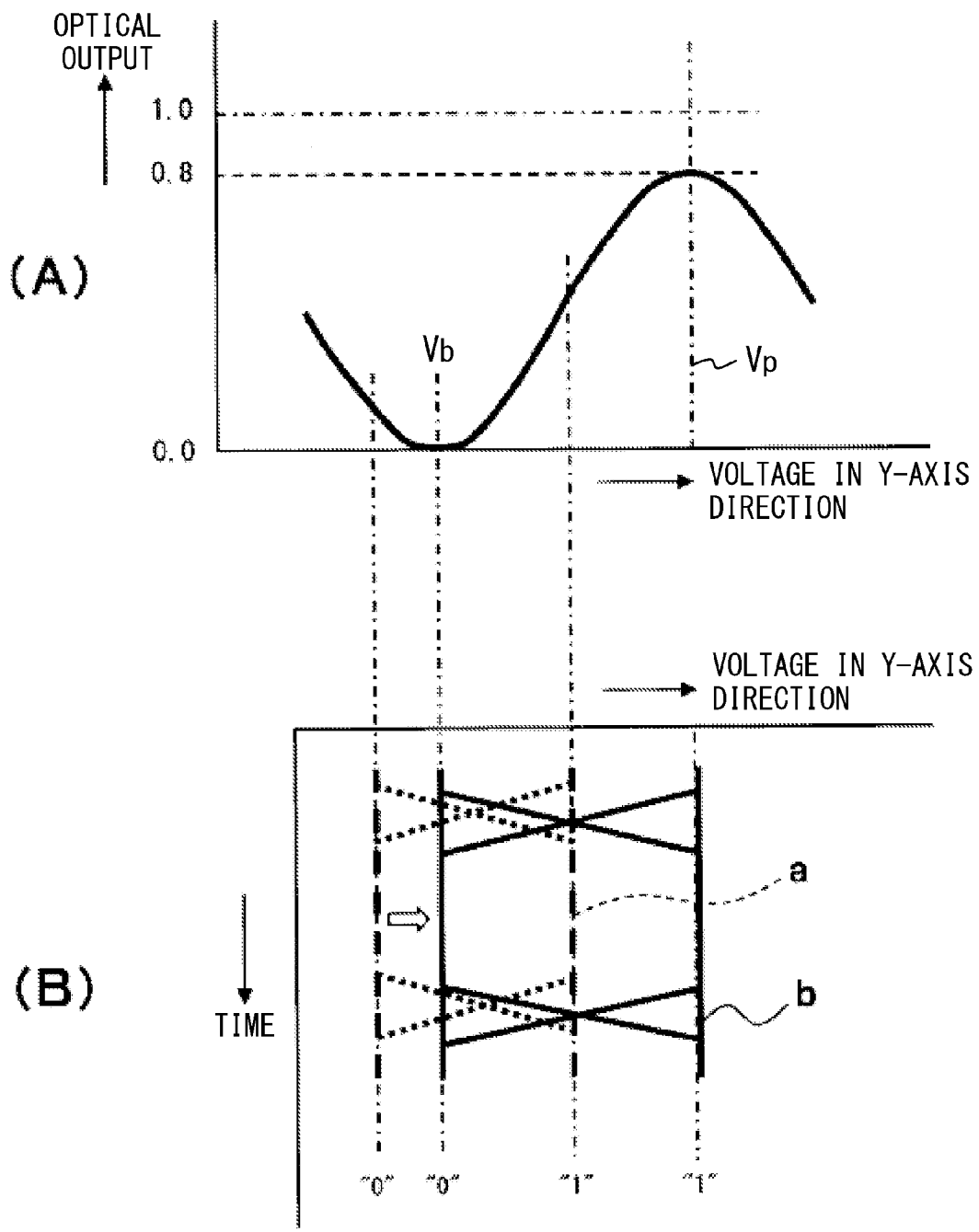
FIG. 11 illustrates the optical output characteristic and voltage change in the Y-axis direction.
Figure 12:
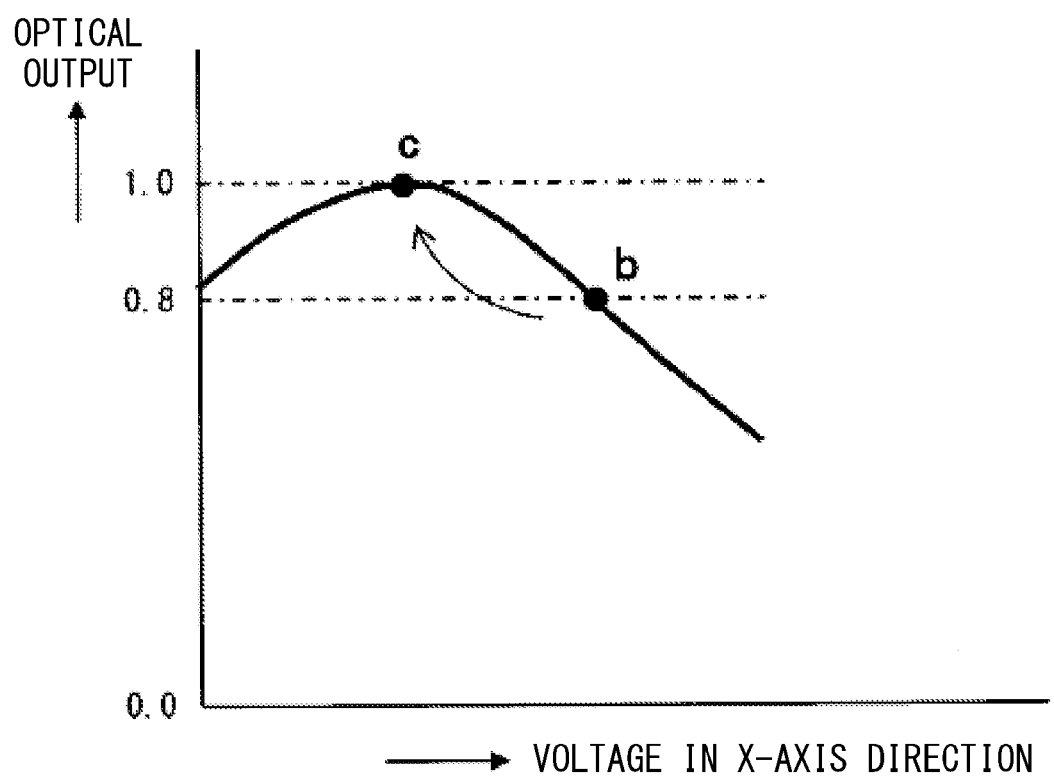
FIG. 12 illustrates the optical output characteristic with respect to the voltage in the X-axis direction.

The optimization of the bias voltages V1bias and V2bias and modulation amplitude is described below with reference to FIG. 10 through FIG. 12. FIG. 10 illustrates the static characteristic of the SMZM. (A) in FIG. 11 illustrates the optical output characteristic in the Y-axis direction. The curve indicates the input/output characteristic before optimized. (B) in FIG. 11 illustrates a change in voltage (modulation signal) in the Y-axis direction. FIG. 12 illustrates the optical output characteristic with respect to the voltage in the X-axis direction.

The procedure of obtaining the optimum state c from the starting state a illustrated in FIG. 10 is described below. In the starting state a, as illustrated in FIG. 11, the modulation signal voltage corresponding to "0" is lower than the preferable bottom voltage Vb, and the modulation signal voltage corresponding to "1" is shifted from the preferable peak voltage Vp. Therefore, the amplitude of the modulation signal and the bias voltage in the Y-axis direction are controlled so that the modulation signal voltage corresponding to "0" is to be the bottom voltage Vb, and the modulation signal voltage corresponding to "1" is to be the peak voltage Vp. By the control above, the state b is obtained.

Since the state b is not optimized in the X-axis direction, the peak value of the optical output power is smaller than the optimal state. Therefore, the bias voltage in the X-axis direction is controlled so that the operating state approaches the optimum state c. However, when the bias voltage is changed in the X-axis direction, the amplitude of the modulation signal and/or the optimum value of the bias voltage in the Y-axis direction also change as clearly illustrated in FIG. 8 and FIG. 10. Therefore, to obtain the optimum state c, it is preferable to repeatedly perform the control of the amplitude of the modulation signal, the control of the bias voltage in the Y-axis direction, and the control of the bias voltage in the X-axis direction.

Listed below are the characteristic items and merits of the second embodiment.

(1) By monitoring the change in low frequency component extracted from an output optical signal, the error in the bias voltages V1bias and V2bias from the optimal voltage, and error in the modulation amplitude from the optimal amplitude can be detected. Therefore, the feedback control is performed so that the error is reduced (or minimized), thereby constantly optimizing the bias voltages V1bias and V2bias and the modulation amplitude.

(2) As a result, it is not necessary to correctly adjust in advance the bias voltages V1bias and V2bias and the modulation amplitude. That is, the non-adjustment of the input voltages V1 and V2 is realized.

(3) Even when there occur a change in characteristic of the SMZM 4 caused by a temperature fluctuation etc. or a circuit error of the peripheral circuit of the SMZM 4 such as the drive circuit 28 (modulator 280), the controller 30, etc., the optical output is optimized.

(4) It is difficult to individually control the bias voltages V1bias and V2bias, and the modulation amplitude. On the other hand, in the optical modulator 2B, the bias voltage is decomposed in the modulation direction (Y-axis direction) and the direction (X-axis direction) orthogonal to the modulation direction, and the control is separately performed in the X- and Y-axis directions. Therefore, the automatic control of the operating state of the SMZM is realized.

(5) In the modulation direction (Y-axis direction in FIG. 5), the bias voltage and the modulation amplitude in the Y-axis direction are controlled so that the waveform fold-back does not occur on the peak side and the bottom side of the optical output.

(6) Since the output optical power is not adjusted to be maximum only by controlling the bias voltage in the modulation direction, the bias control is performed also in the direction orthogonal to the modulation direction (X-axis direction in FIG. 5), thereby obtaining a preferable extinction ratio.

Third Embodiment

Figure 13:
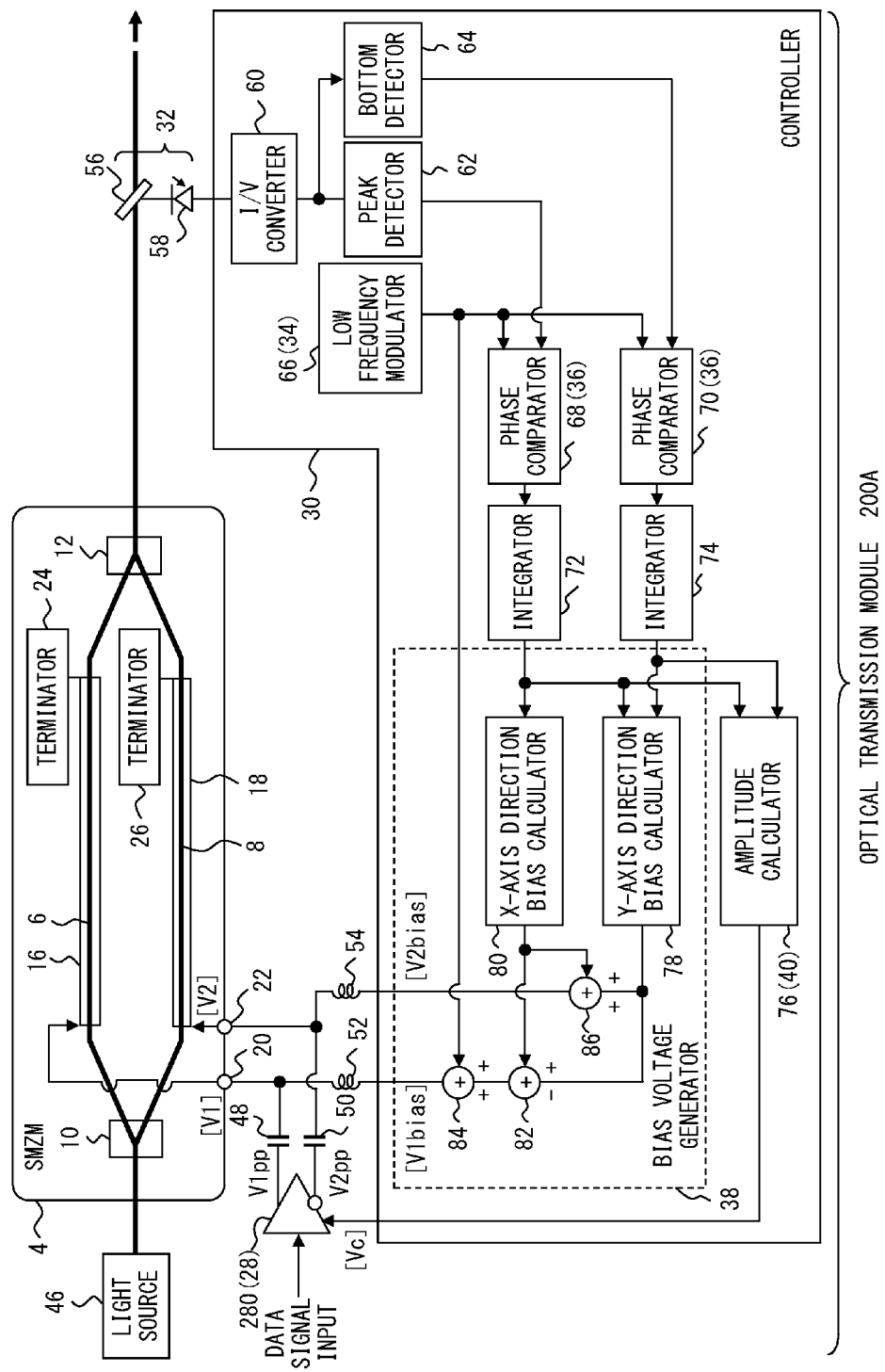
FIG. 13 illustrates an example of an optical transmission module according to the third embodiment.

The third embodiment is described below with reference to FIG. 13. FIG. 13 illustrates an example of an optical transmission module according to the third embodiment. In FIG. 13, similar element as in FIG. 3 is assigned the same reference numeral.

The optical transmission module 200A is an example of the optical modulator, the optical transmitter, and the modulation control method according to the present application. The optical transmission module 200A is provided with the above-mentioned SMZM 4 as an optical modulation device.

Since the configuration and the operation of the SMZM 4 are substantially the same as those according to the second embodiment illustrated in FIG. 3, the explanation is omitted with the same reference numeral assigned to the same element. A light source 46 is provided at the input side of the SMZM 4. The carrier light generated by the light source 46 is provided to the SMZM 4. The carrier light is, for example, CW light.

The modulator 280 is an example of the drive circuit 28 illustrated in FIG. 3. The amplitude control signal Vc generated by the controller 30 is provided for the modulator 280. The amplitude of the output signal of the modulator 280 is controlled by the amplitude control signal Vc. In the description below, the operation of controlling the amplitude of the output signal of the modulator 280 using the amplitude control signal Vc is referred to as "amplitude modulation". That is, the modulator 280 amplitude-modulates the input data signal according to the amplitude control signal Vc, and outputs the in-phase modulation signal V1pp and the reversed-phase modulation signal V2pp. The in-phase modulation signal V1pp is guided to the input terminal 20 through a capacitor 48, and the reversed-phase modulation signal V2pp is guided to the input terminal 22 through a capacitor 50. Each of the capacitors 48 and 50 removes the direct current components from the corresponding modulation signal.

The controller 30 generates the above-mentioned bias voltages V1bias and V2bias. The bias voltage V1bias is fed to the input terminal 20 through an inductor 52, and the bias voltage V2bias is fed to the input terminal 22 through an inductor 54. Each of the inductors 52 and 54 has high impedance for a high frequency component, and removes the high frequency component from the corresponding bias voltage.

Thus, the input voltage V1 for the SMZM 4 is obtained by adding the bias voltage V1bias to the in-phase modulation signal V1pp. Similarly the input voltage V2 for the SMZM 4 is obtained by adding the bias voltage V2bias to the reversed-phase modulation signal V2pp.

An optical splitter 56 is provided at the output side of the SMZM 4. The optical splitter 56 is a part of the optical monitor 32 for monitoring an output optical signal, branches the output optical signal, and guides the branched portion of the output optical signal to a photo detector 58. The photo detector 58 is used for converting an optical signal into a current signal, and converts the optical signal branched by the optical splitter 56 into an electric signal (photo current). The current signal obtained by the photo detector 58 is guided to the controller 30. The current signal obtained by the photo detector 58 represents the optical output of the SMZM 4.

The controller 30 includes an I/V converter 60 to convert a current signal into a voltage signal. Therefore, the I/V converter 60 outputs a voltage signal representing the output optical signal of the SMZM 4. The I/V converter 60 is realized by a transimpedance amplifier. The voltage signal generated by the I/V converter 60 is guided to a peak detector 62 and a bottom detector 64. The peak detector 62 detects the waveform at the peak side of the optical output using the output signal of the I/V converter 60. On the other hand, the bottom detector 64 detects the waveform at the bottom side of the optical output using the output signal of the I/V converter 60.

Figure 83:
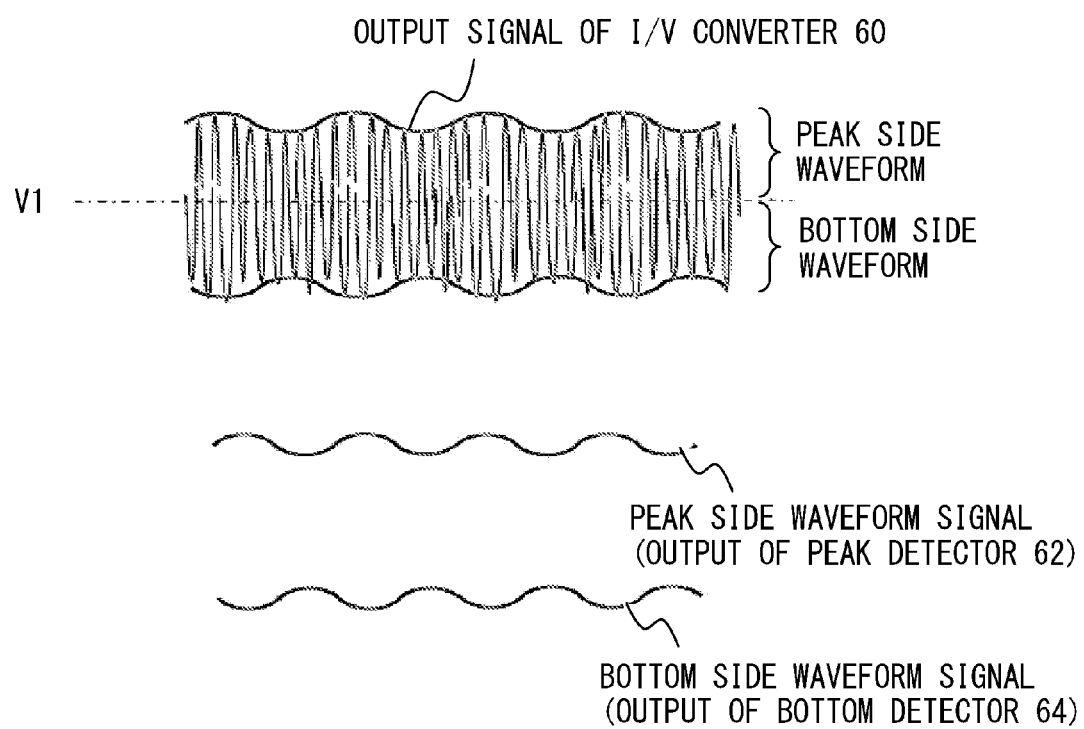
FIG. 83 is an explanatory view of extracting a peak side waveform signal and a bottom side waveform signal.

The peak detector 62 includes a diode D1, a capacitor C1, and a resistor R1 as illustrated in FIG. 82A. The voltage signal from the I/V converter 60 is input to the anode of the diode D1. The voltage V1 is applied to the cathode of the diode D1 through the capacitor C1 and the resistor R1. The capacitor C1 and the resistor R1 are coupled in parallel to each other. It is preferable that the voltage V1 is adjusted to the central voltage of the voltage signal from the I/V converter 60 as illustrated in FIG. 83. With this circuit configuration, the peak detector 62 extracts the signal on the high voltage side of the voltage V1 from the voltage signal of the I/V converter 60. That is, a peak side waveform of the output optical signal of the SMZM 4 is obtained by the peak detector 62.

The bottom detector 64 includes a diode D2, a capacitor C2, and a resistor R2 as illustrated in FIG. 82B. The voltage signal from the I/V converter 60 is input to the cathode of the diode D1. The voltage V1 is applied to the anode of the diode D2 through the capacitor C2 and the resistor R2. The capacitor C2 and the resistor R2 are coupled to each other in parallel. With this circuit configuration, the bottom detector 64 extracts a signal on the low voltage side of the voltage V1 from the voltage signal of the I/V converter 60. That is, the waveform on the bottom side of the output optical signal of the SMZM 4 is obtained by the bottom detector 64.

The peak side waveform signal detected by the peak detector 62 is guided to a phase comparator 68. The bottom side waveform signal detected by the bottom detector 64 is guided to a phase comparator 70.

A low frequency modulator 66 is an example of the low frequency signal generator 34 illustrated in FIG. 3. The low frequency modulator 66 generates a low frequency. This low frequency signal may be referred to low frequency modulation signal. The low frequency signal is provided for the phase comparators 68 and 70.

The phase comparator 68 corresponds to a part of the phase detector 36 illustrated in FIG. 3. The phase comparator 68 compares the phases between the peak side waveform signal obtained by the peak detector 62 and the low frequency signal, and acquires peak side phase information. The phase comparator 70 also corresponds to a part of the phase detector 36. The phase comparator 70 compares the phases between the bottom side waveform signal obtained by the bottom detector 64 and the low frequency signal, and acquires bottom side phase information.

The output signals of the phase comparators 68 and 70 are integrated by the integrators 72 and 74, respectively, and then guided to the bias voltage generator 38 and the amplitude calculator 76. The integrators 72 and 74 are examples of elements for removing the high frequency components to smooth the output signals of the phase comparators 68 and 70, respectively. Therefore, each of the integrators 72 and 74 can be realized by, for example, a low pass filter. When the phase information obtained by the phase comparators 68 and 70 does not include high frequency components and the phase information is a direct current signal, the integrators 72 and 74 can be omitted.

The bias voltage generator 38 includes a Y-axis direction bias calculator 78 and an X-axis direction bias calculator 80. The Y-axis direction bias calculator 78 controls the bias voltages V1bias and V2bias so that the Y-axis direction bias is optimized or approximately optimized using the output signals of the integrators 72 and 74. The X-axis direction bias calculator 80 controls the bias voltages V1bias and V2bias so that the X-axis direction bias is optimized or approximately optimized using the output signals of the integrator 72.

A first adder 82, a second adder 84, and a third adder 86 are provided on the output side of the Y-axis direction bias calculator 78 and the X-axis direction bias calculator 80. The adders 82, 84, and 86 realize an example of a superimposer. The adder 82 adds the inverted output signal of the Y-axis direction bias calculator 78 and the output signal of the X-axis direction bias calculator 80. The adder 84 adds the output signal of the adder 82 and the low frequency signal to generate the bias voltage V1bias. The adder 86 adds the output signals of the Y-axis direction bias calculator 78 and the X-axis direction bias calculator 80 to generate the bias voltage V2bias. In the present embodiment, the low frequency signal is superimposed on one of the bias voltage V1bias and the bias voltage V2bias. However, the low frequency signal may be superimposed on both of the bias voltage V1bias and the bias voltage V2bias.

The amplitude calculator 76 generates the amplitude control signal Vc for control of the amplitude of the in-phase modulation signal V1$pp$ and the reversed-phase modulation signal V2$pp$. The amplitude control signal Vc is provided for the modulator 280.

With the configuration, as the Y-axis direction control, the Y-axis direction bias control and the control of the modulation amplitude are performed. As the X-axis direction control, the X-axis direction bias control is performed.

When the bias voltage is controlled in the Y-axis direction, the bias voltages V1bias and V2bias are shifted in the opposite directions to each other by same amount. That is, when the bias voltage is to be changed in the Y-axis direction, the bias voltages V1bias and V2bias are controlled according to "$\Delta V1bias=-\Delta V2bias$". On the other hand, when the bias voltage is controlled in the X-axis direction, the bias voltages V1bias and V2bias are shifted in the same direction by the same amount. That is, when the bias voltage is to be changed in the X-axis direction, the bias voltages V1bias and V2bias are controlled according to "$\Delta V1bias=\Delta V2bias$".

Figure 14:
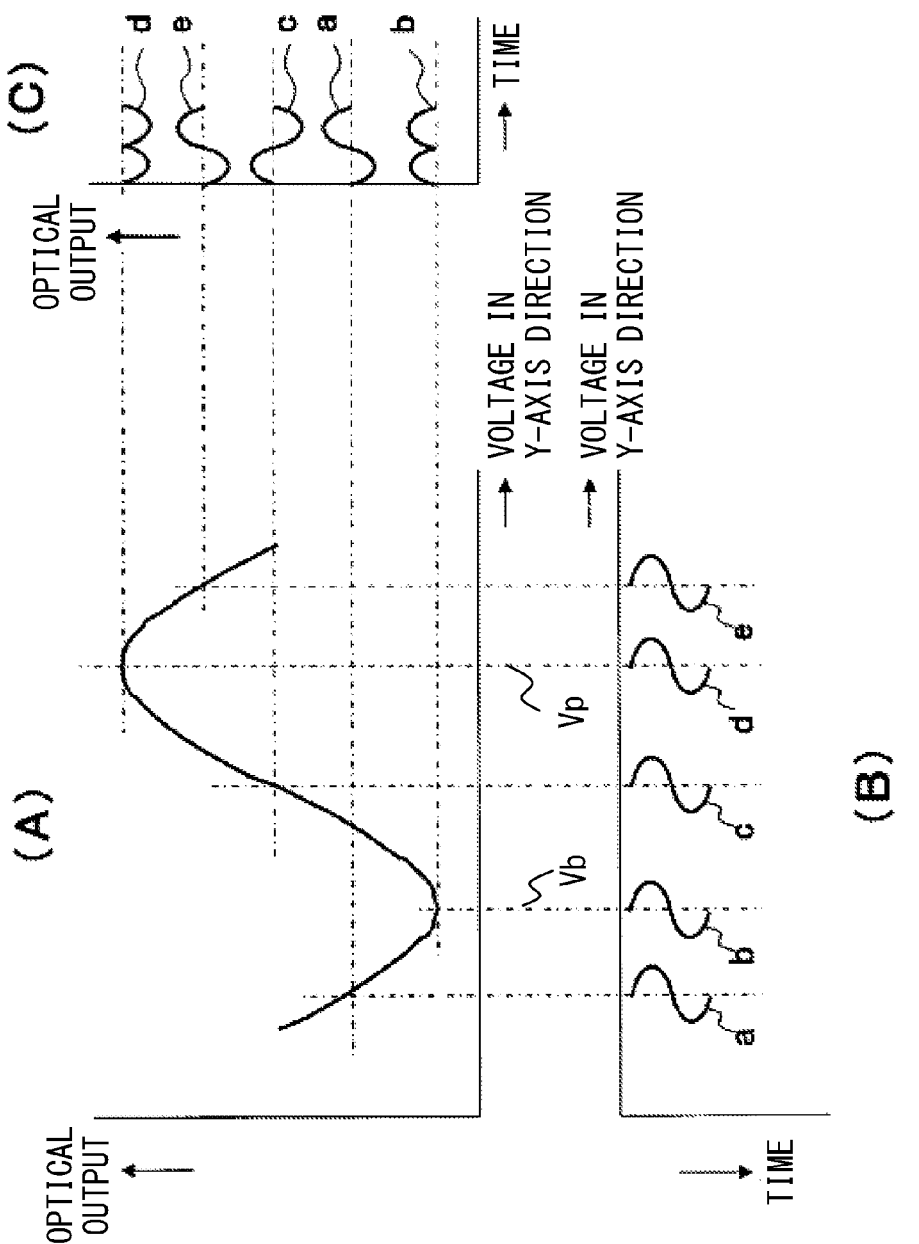
FIG. 14 illustrates the optical output characteristic when the bias voltage in the Y-axis direction is modulated.

The control in the Y-axis direction is described below with reference to FIG. 14. FIG. 14 illustrates the optical output characteristic when the bias voltage in the Y-axis direction is modulated by the low frequency signal. (A) illustrates the static characteristic of the SMZM. (B) illustrates the voltage (data modulation signal) in the Y-axis direction. (C) illustrates the output optical waveform. The optical waveforms a through e illustrated by (C) are generated corresponding to the input voltage signals a through e illustrated in (B) in FIG. 14.

In the SMZM 4, when the voltage of an input signal exceeds a peak voltage Vp, the waveform of an output optical signal is inverted. Similarly, when the voltage of an input signal exceeds the bottom voltage Vb, the waveform of the output optical signal is inverted.

In FIG. 14, when a voltage signal c is provided for the SMZM 4 between the bottom voltage Vb and the peak voltage Vp, an optical signal c is output. When a voltage signal a lower than the bottom voltage Vb is provided for the SMZM 4, an optical signal a is output. In this case, the phase of the optical signal a is inverted with respect to the optical signal c. Similarly, when a voltage signal e higher than the peak voltage Vp is provided for the SMZM 4, an optical signal e is output. In this case, the phase of the optical signal e is inverted with respect to the optical signal c.

The voltage signal b is arranged around the bottom voltage Vb. In this case, fold-back of the optical waveform occurs for the voltage components lower than the bottom voltage Vb. Therefore, the frequency of the corresponding optical signal b is double the frequency of the voltage signal b. In addition, the optical signal b includes one in-phase component and one reversed-phase component for one cycle of the voltage signal b.

On the other hand, the voltage signal d is arranged around the peak voltage Vp. In this case, fold-back of the optical waveform occurs for the voltage components higher than the peak voltage Vp. Therefore, the frequency of the corresponding optical signal d is double the frequency of the voltage signal d. In addition, the optical signal d includes one in-phase component and one reversed-phase component for one cycle of the voltage signal d.

The controller 30 optimizes the Y-axis direction bias and the modulation amplitude using this characteristic. That is, the controller 30 superimposes the low frequency signal on the bias voltage of the SMZM 4, and monitors the phase of the low frequency component in the output optical signal of the SMZM 4. Then, the controller 30 controls the Y-axis direction bias and the modulation amplitude based on the phase of the low frequency component. In this case, the peak side waveform signal obtained by the peak detector 62 is controlled to be the phase state of the optical signal d, and the bottom side waveform signal obtained by the bottom detector 64 is controlled to be the phase state of the optical signal b. As a result, the minimum optical power is obtained for the data "0", and the maximum optical power is obtained for the data "1". That is, the Y-axis direction bias and the modulation amplitude are optimized.

Fourth Embodiment

The fourth embodiment is described below with reference to FIG. 15. FIG. 15 illustrates an example of an optical transmission module according to the fourth embodiment. In FIG. 15, the same reference numeral is assigned to similar element illustrated in FIG. 13.

An optical transmission module 200B according to the fourth embodiment includes the SMZM 4 as in the third embodiment illustrated in FIG. 13. The optical transmission module 200B also includes an inverter 88 and a fourth adder 90 in addition to the configuration of the third embodiment. The inverter 88 inverts the low frequency signal output from the low frequency modulator 66. A reversed-phase low frequency signal obtained by the inverter 88 is guided to the adder 90. The adder 90 adds the output signal of the adder 86 and the reversed-phase low frequency signal. Therefore, in the fourth embodiment, the bias voltage generator 38 generates a bias voltage V2bias on which the reversed-phase low frequency signal is superimposed. Other configurations are substantially the same as those according to the second embodiment illustrated in FIG. 3 or the third embodiment illustrated in FIG. 13. Therefore, the detailed explanation is omitted here.

In the fourth embodiment, the modulation amplitude and the Y-axis direction bias voltage are controlled by superimposing a low frequency signal on the Y-axis direction bias voltage. To modulate the Y-axis direction bias voltage by the low frequency signal, the adder 84 superimposes the low frequency signal on the output signal (voltage for generating the bias voltage V2bias) of the adder 82. By so doing, bias voltage V1bias modulated by the low frequency signal is generated. The adder 90 superimposes the reversed-phase low frequency signal obtained by the inverter 88 on the output signal (voltage for generating the bias voltage V2bias) of the adder 86. By so doing, the bias voltage V2bias modulated by the reversed-phase low frequency signal is generated. That is, the adders 84 and 90 operate as a superimposer for superimposing a low frequency signal on a bias voltage.

Also in the fourth embodiment, the phase of a peak side waveform signal obtained by the peak detector 62 and the phase of a bottom side waveform signal obtained by the bottom detector 64 are detected by using the phase comparators 68 and 70. The controller 30 detects an error of modulation amplitude and an error of the Y-axis direction bias voltage based on the phases. Then, the controller 30 controls the Y-axis direction bias voltage and the modulation amplitude so that the error of the modulation amplitude and the error of the Y-axis direction bias voltage is reduced. Therefore, also in the fourth embodiment, the modulation amplitude and the Y-axis direction bias voltage is automatically optimized or approximately optimized.

Figure 16:
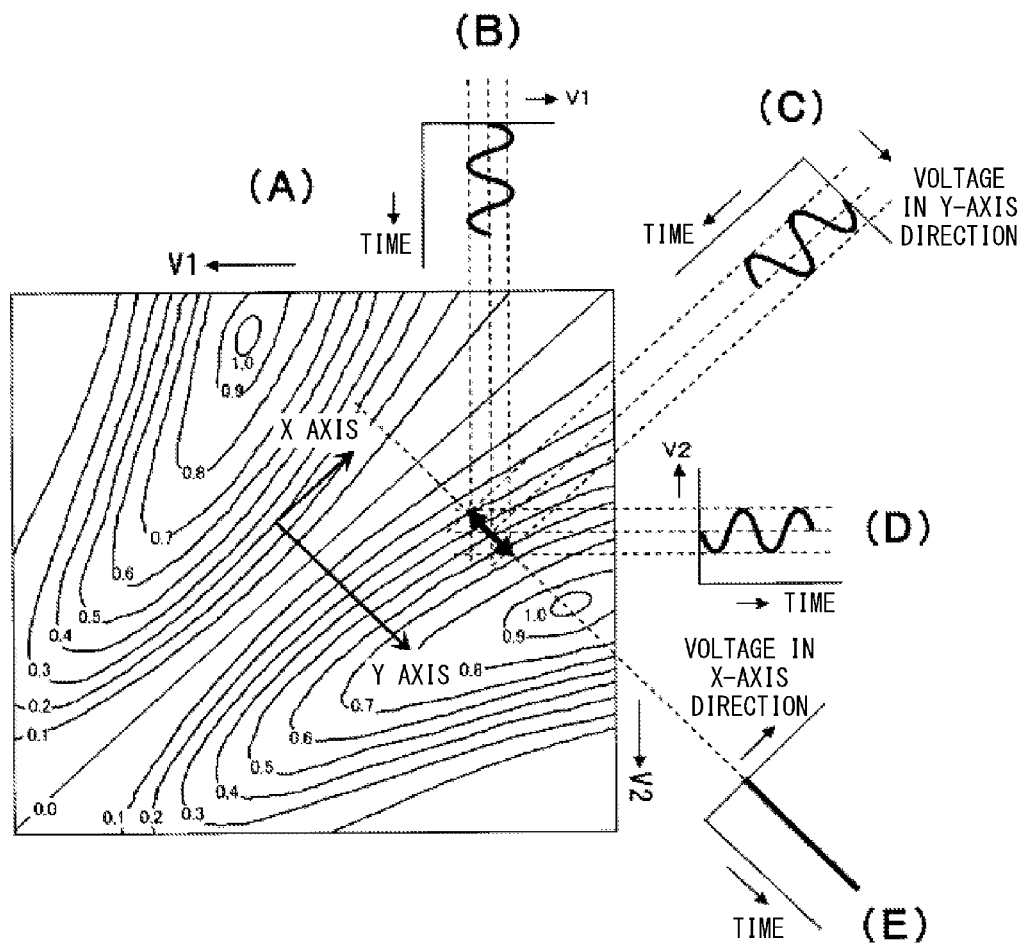
FIG. 16 illustrates an example of the characteristic when a bias modulation is performed only in the Y-axis direction.

The modulation of the Y-axis direction voltage is described below with reference to FIG. 16 and FIG. 17. FIG. 16 illustrates an operation when a bias voltage is modulated by a low frequency signal only in the Y-axis direction. In FIG. 16, (A) illustrates the static characteristic of a SMZM, (B) illustrates a waveform of an input voltage V1, (C) illustrates a voltage in the Y-axis direction, (D) illustrates a waveform of an input voltage V2, and (E) illustrates a voltage in the X-axis direction. FIG. 17 illustrates the voltage in the input voltage V1, the input voltage V2, the voltage in the X-axis direction, and the voltage in the Y-axis direction on the time axis.

When a pair of low frequency signals, having reverse phase from each other, are superimposed on the input voltages V1 and V2, the low frequency component voltage in the X-axis direction is cancelled. Therefore, only the voltage in the Y-axis direction is modulated by the low frequency signal. It is assumed that the amplitudes of the low frequency signal superimposed on the input voltages V1 and V2 are identical to each other. This modulating operation is realized by, for example, as illustrated in FIG. 15, superimposing the low frequency signal on the V1bias, and superimposing the reversed-phase low frequency signal on the V2bias.

Described next is the method of controlling the modulation amplitude and the Y-axis direction bias voltage. In the following description, as illustrated in FIG. 16 and FIG. 17, the Y-axis direction bias voltage is modulated by the low frequency signal.

Figure 18:
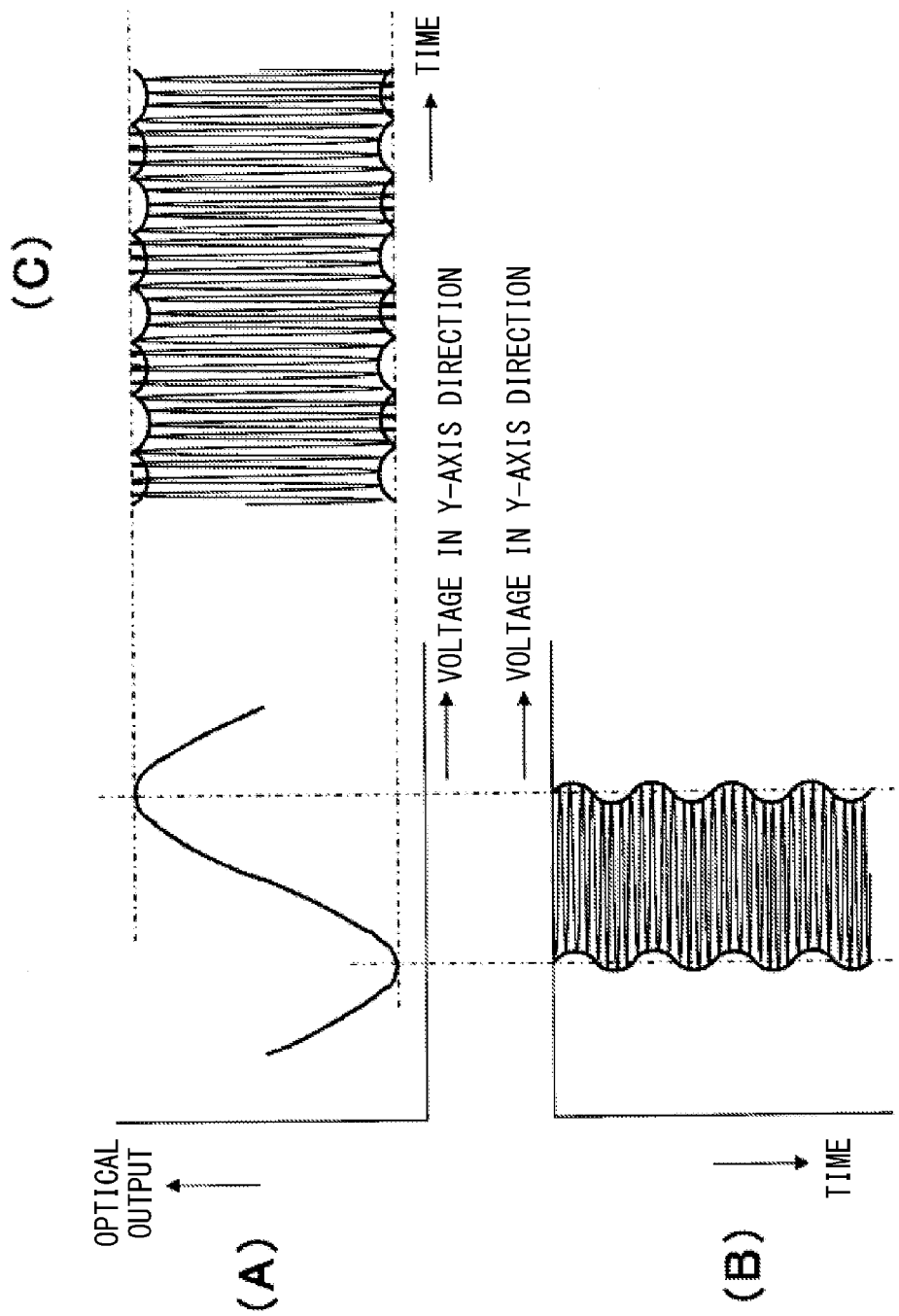
FIGS. 18-20 illustrate the case in which the modulation amplitude and the bias voltage in the Y-axis direction are at the optimum.
Figure 19:
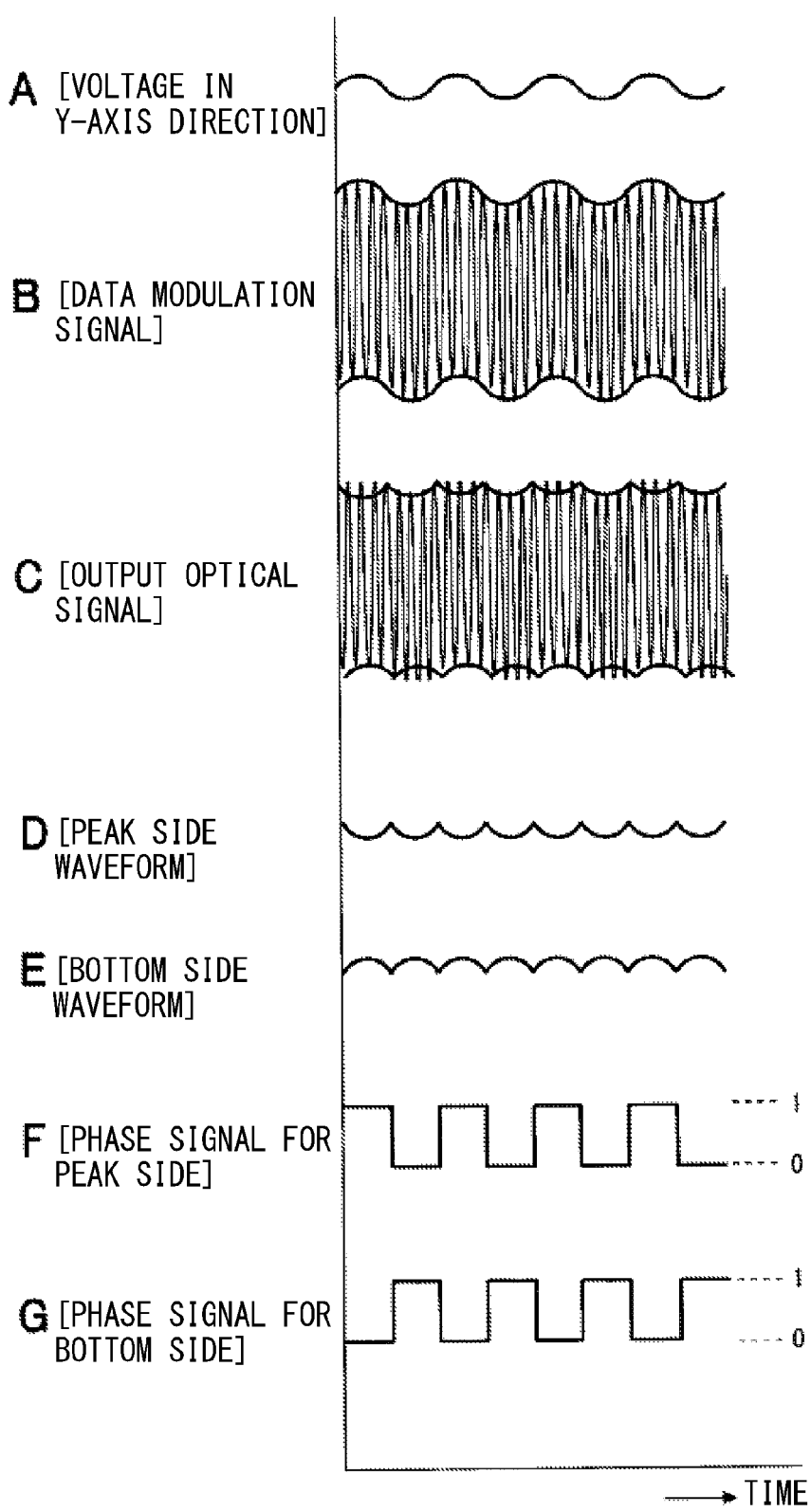
Figure 20:
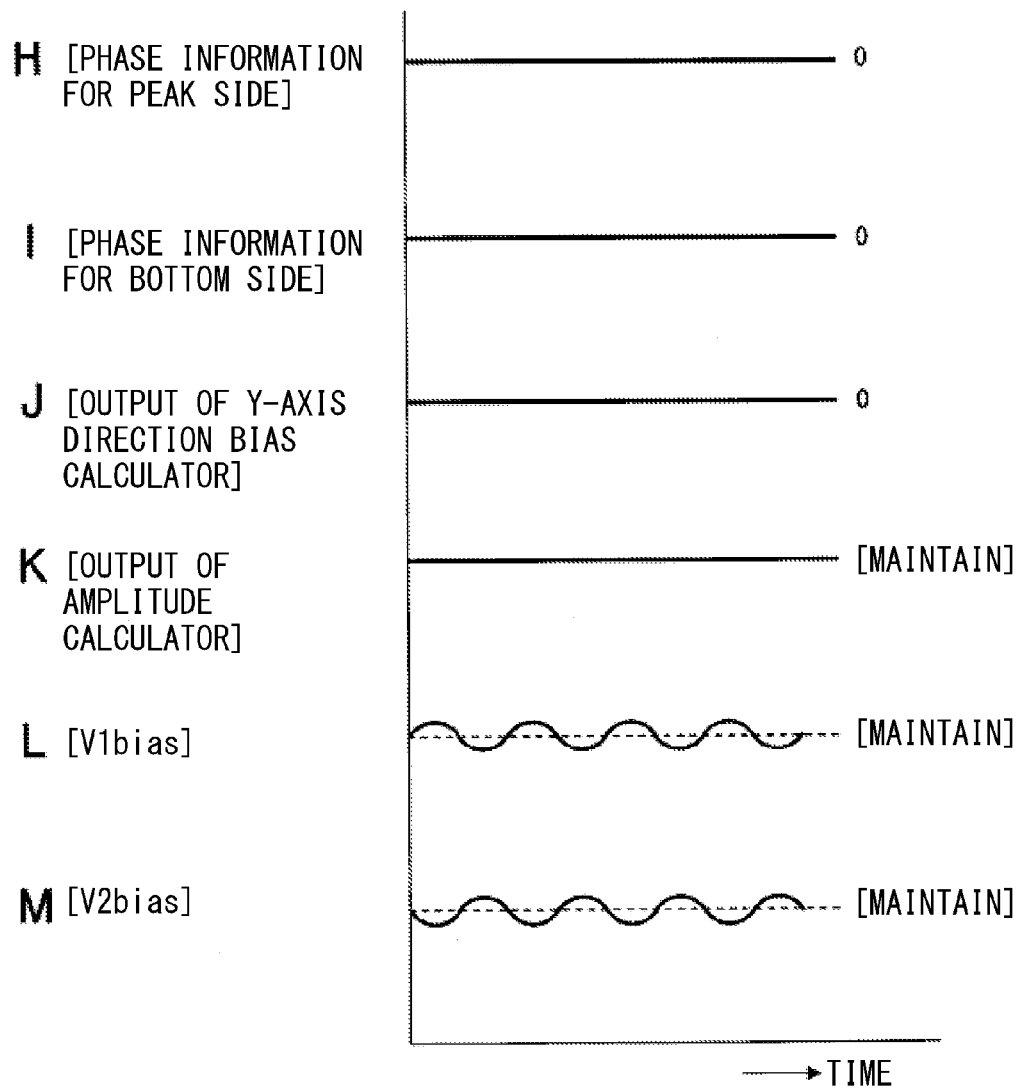

(1) When the Modulation Amplitude and the Y-Axis Direction Bias Voltage is Optimum (FIGS. 18-20)

FIG. 18 through FIG. 20 illustrate the state in which the modulation amplitude and the Y-axis direction bias voltage are optimum. In FIG. 18, (A) illustrates the input/output characteristic of the SMZM 4, (B) illustrates a modulation signal waveform, (C) illustrates an output optical signal. FIG. 19 and FIG. 20 illustrate a signal obtained by each element of the optical transmission module 200B. In FIG. 19, (A) illustrates the voltage in the Y-axis direction. Note that the waveform of the low frequency signal generated by the low frequency modulator 66 is substantially the same as the waveform illustrated by (A) in FIG. 19. (B) illustrates the data modulation signal output from the modulator 280, (C) illustrates an output optical signal of the SMZM 4, (D) illustrates the peak side waveform signal obtained by the peak detector 62, (E) illustrates the bottom side waveform signal obtained by the bottom detector 64. (F) illustrates the phase signal of the peak side waveform signal obtained by the phase comparator 68, (G) illustrates the phase signal of the bottom side waveform signal obtained by the phase detector 70. In FIG. 20, (H) illustrates peak side phase information obtained by the integrator 70, (I) illustrates bottom side phase information obtained by the integrator 72. (J) illustrates an output signal of the Y-axis direction bias calculator 78, (K) illustrates an output signal of the amplitude calculator 76. (L) and (M) in FIG. 20 illustrate the bias voltages V1bias and V2bias, respectively.

In the fourth embodiment, the low frequency signal is superimposed on the Y-axis direction bias voltage. Therefore, both of the peak side waveform and the bottom side waveform of the input voltage of the SMZM 4 are in phase with the low frequency signal as illustrated by (A) and (B) in FIG. 19.

When the modulation amplitude and the Y-axis direction bias voltage are optimum, the waveform of the output optical signal has the fold-back on both peak side and bottom side. In this case, the peak side waveform of the optical signal alternately indicates the in-phase section and the reversed-phase section with respect to the low frequency signal as indicated by (D) in FIG. 19. Then, the phase signal obtained by the phase comparator 68 alternately indicates "1" and "0" as indicated by (F) in FIG. 19. The integrator 72 integrates (that is, averaging) the phase signal. If the phase signal indicated by (F) in FIG. 19 is averaged, "0.5" is obtained. However, the integrator 72 outputs, for example, the value obtained by subtracting "0.5" from the average value of the phase signal. Therefore, in this case, the integrator 72 outputs "0" as indicated by (H) in FIG. 20. Similarly, the bottom side waveform of the optical signal alternately indicates the in-phase section and the reversed-phase section with respect to the low frequency signal as indicated by (E) in FIG. 19. Therefore, the integrator 74 outputs "0" as indicated by (I) in FIG. 20.

When both of the outputs of the integrators 72 and 74 are zero, the amplitude calculator 76 maintains the amplitude control signal Vc as indicated by (K) in FIG. 20. In this case, the modulation amplitude does not change. In addition, when both of the outputs of the integrators 72 and 74 are zero, the Y-axis direction bias calculator 78 maintains the output voltage as indicated by (J) in FIG. 20. In this case, the bias voltages V1bias and V2bias are not changed.

Figure 21:
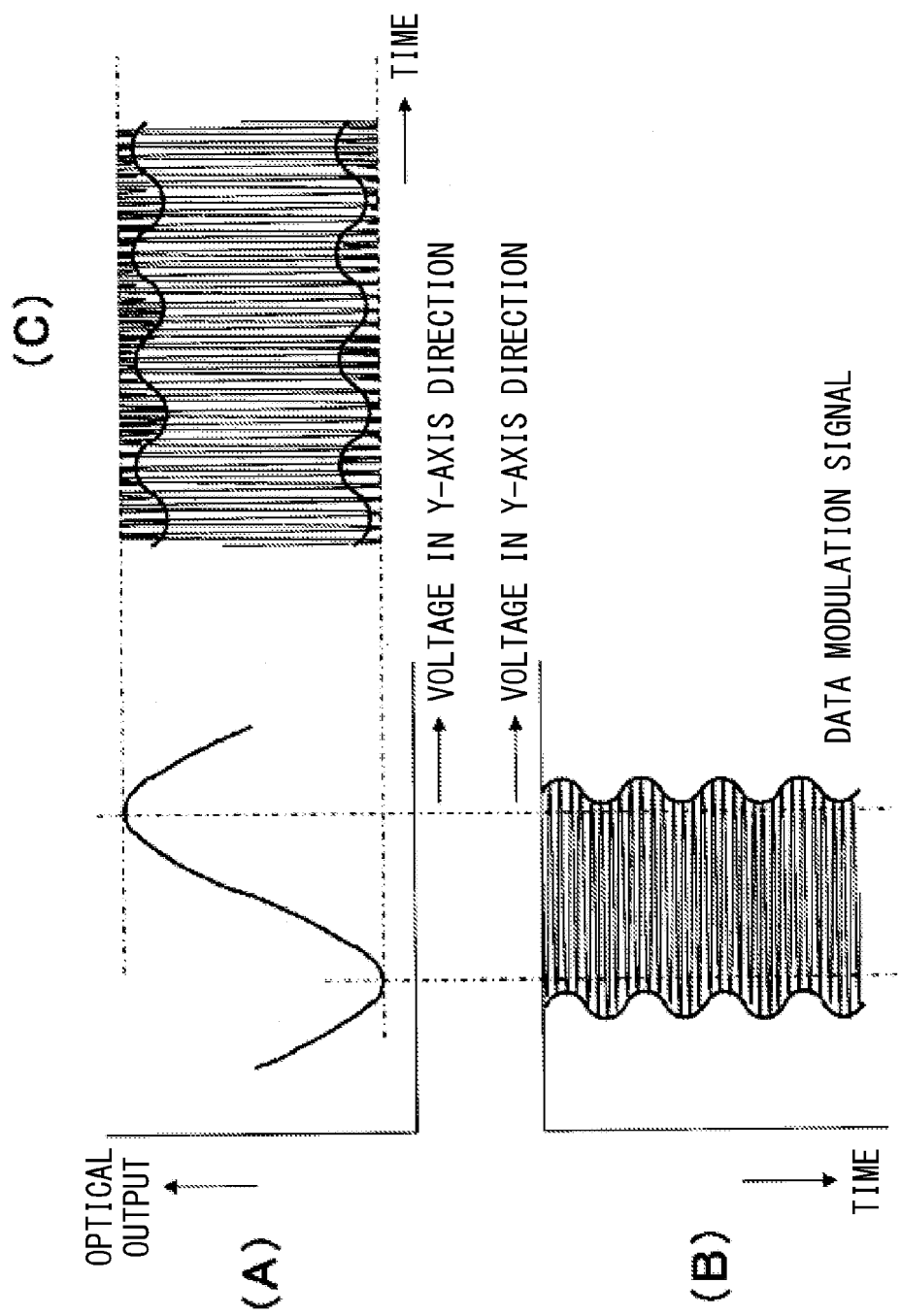
FIGS. 21-23 illustrate the case in which the modulation amplitude is large.
Figure 22:
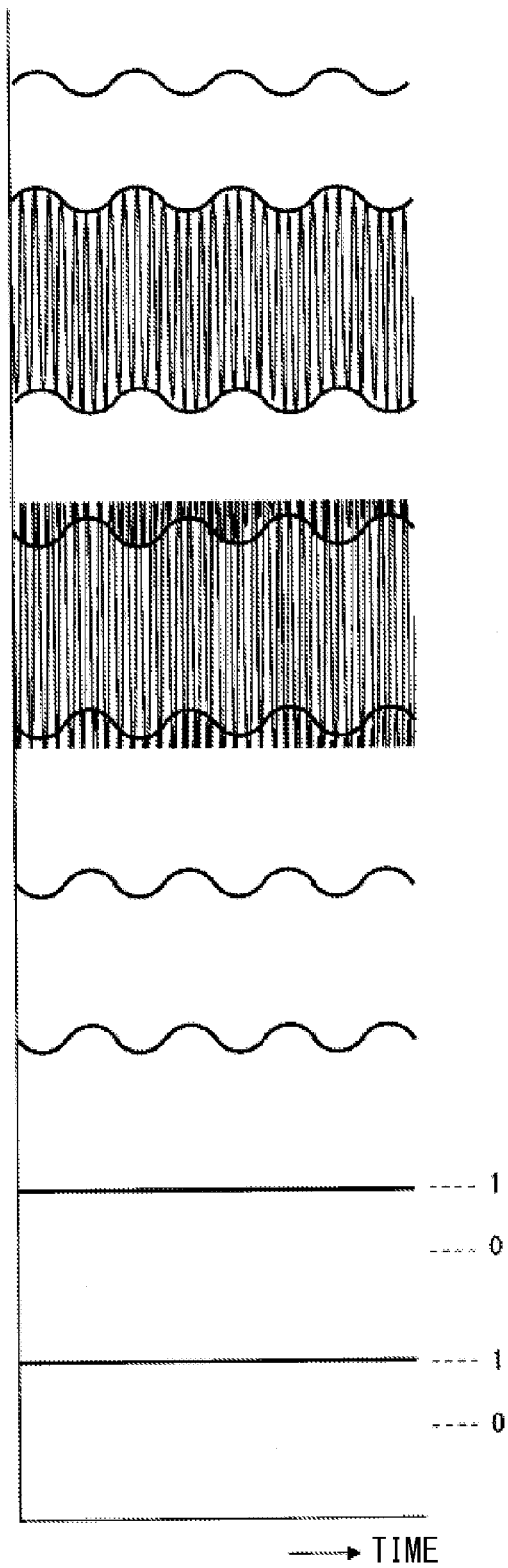
Figure 23:
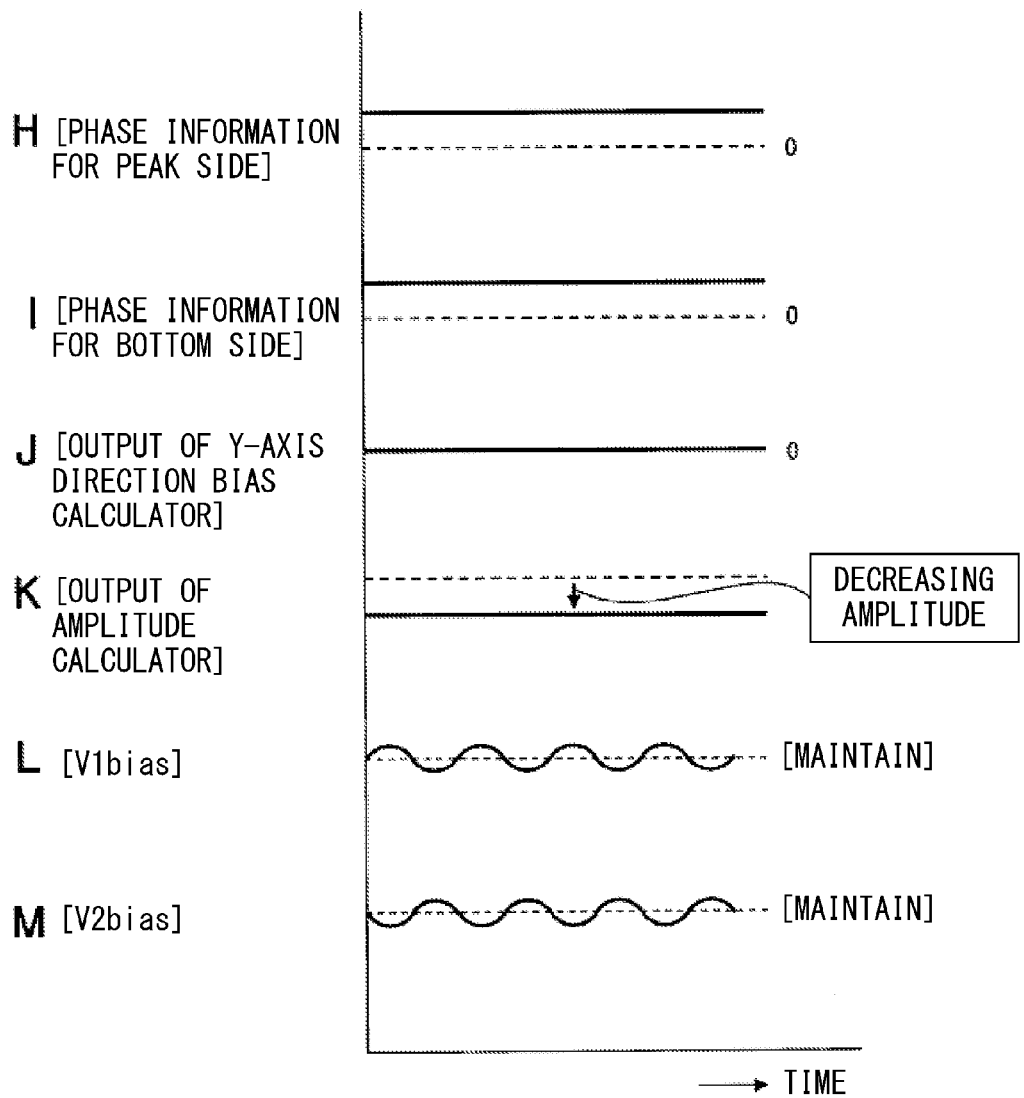

(2) When the Modulation Amplitude is Large (FIGS. 21-23)

FIG. 21 through FIG. 23 illustrate the state in which the modulation amplitude is larger than the optimum value. It is assumed that the Y-axis direction bias is appropriately adjusted. (A) through (C) in FIG. 21 correspond to (A) through (C) in FIG. 18, respectively. (A) through (G) in FIG. 22 and (H) through M in FIG. 23 correspond to (A) through (G) in FIG. 19 and (H) through (M) in FIG. 20, respectively.

When the modulation amplitude is larger than the optimum value, the phase of the peak side waveform signal of an output optical signal indicates the reversed-phase with respect to the low frequency signal as indicated by (D) in FIG. 22. In this case, the phase signal obtained by the phase comparator 68 is continuously "1" as indicated by (F) in FIG. 22. The integrator 72 averages the phase signal, and subtracts "0.5" from the averaged value. As a result, the integrator 72 outputs a positive value as indicated by (H) in FIG. 23. Similarly, the bottom side waveform of the output optical signal indicates the reversed-phase with respect to the low frequency signal as indicated by (E) in FIG. 22. Therefore, the integrator 74 also outputs a positive value as indicated by (I) in FIG. 23.

When both of the integrators 72 and 74 output a positive value, the amplitude calculator 76 changes the amplitude control signal Vc so that the modulation amplitude is reduced as indicated by (K) in FIG. 23. In addition, when both of the integrators 72 and 74 output a positive value, the Y-axis direction bias calculator 78 maintains the output signal. In this case, the bias voltages V1bias and V2bias are not changed.

Figure 26:
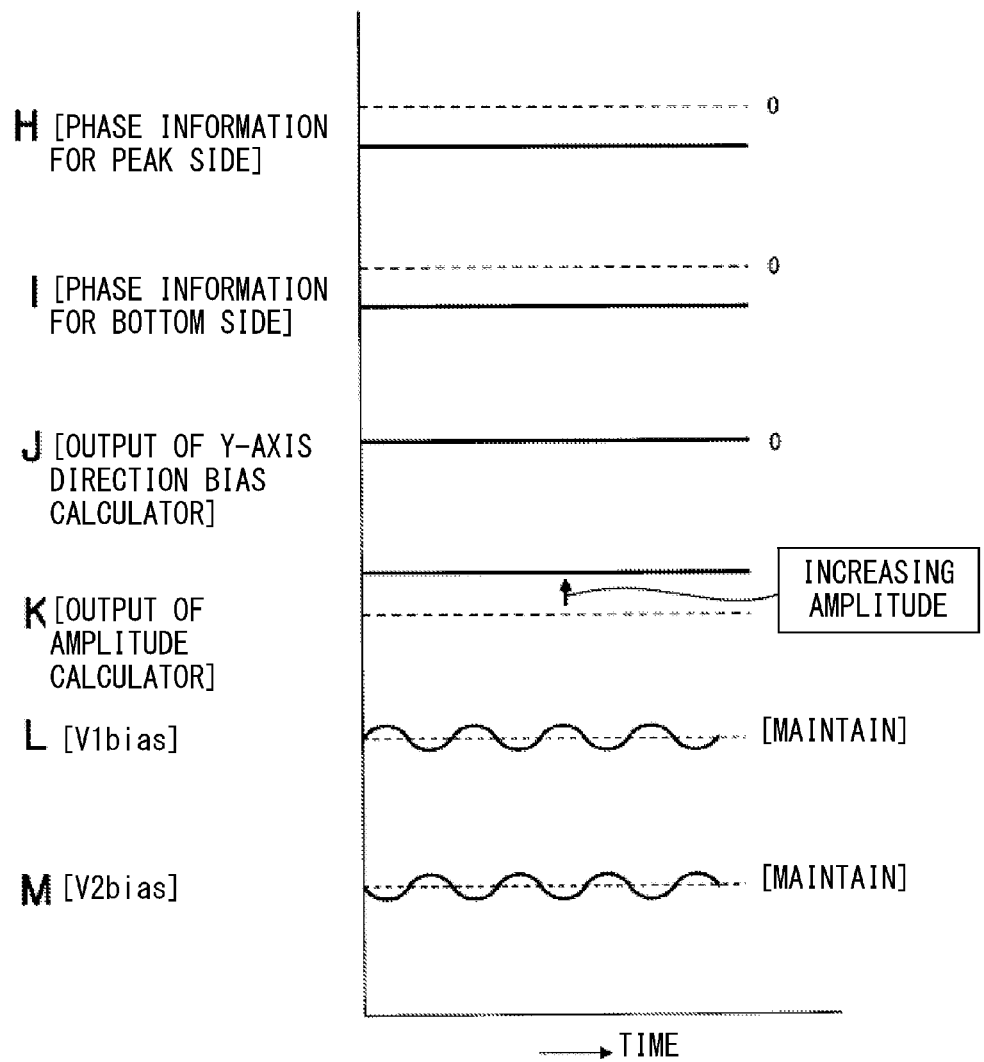

(3) When the Modulation Amplitude is Small (FIGS. 24-26)

FIG. 24 through FIG. 26 illustrate the state in which the modulation amplitude is smaller than the optimum value. It is assumed that the Y-axis direction bias is appropriately adjusted. (A) through (C) in FIG. 24 correspond to (A) through (C) in FIG. 18, respectively. (A) through (G) in FIG. 25 and (H) through (M) in FIG. 26 correspond to (A) through (G) in FIG. 19 and (H) through (M) in FIG. 20, respectively.

When the modulation amplitude is smaller than the optimum value, the phase of the peak side waveform signal of an output optical signal indicates the reversed-phase with respect to the low frequency signal as indicated by (D) in FIG. 25. In this case, the phase signal obtained by the phase comparator 68 is continuously "0" as indicated by (F) in FIG. 25. The integrator 72 averages the phase signal, and subtracts "0.5" from the averaged value. As a result, the integrator 72 outputs a negative value as indicated by (H) in FIG. 26. Similarly, the bottom side waveform of the output optical signal indicates the reversed-phase with respect to the low frequency signal as indicated by (E) in FIG. 25. Therefore, the integrator 74 also outputs a negative value as indicated by (I) in FIG. 26.

When both of the integrators 72 and 74 output a negative value, the amplitude calculator 76 changes the amplitude control signal Vc so that the modulation amplitude is increased as indicated by (K) in FIG. 26. In addition, when both of the integrators 72 and 74 output a negative value, the Y-axis direction bias calculator 78 maintains the output voltage. In this case, the bias voltages V1bias and V2bias are not changed.

Figure 27:
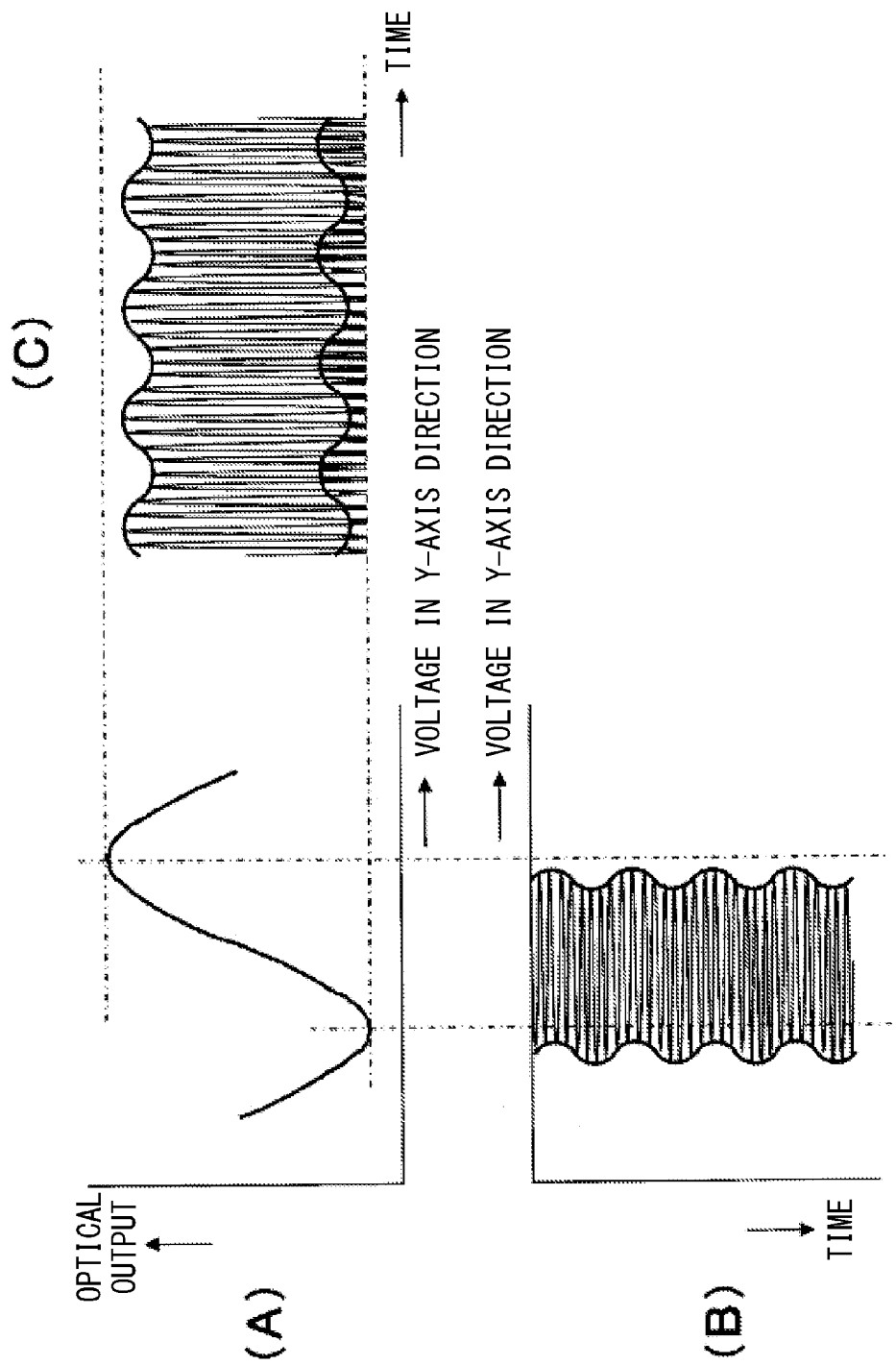
FIGS. 27-29 illustrate the case in which the bias voltage in the Y-axis direction is low.
Figure 28:
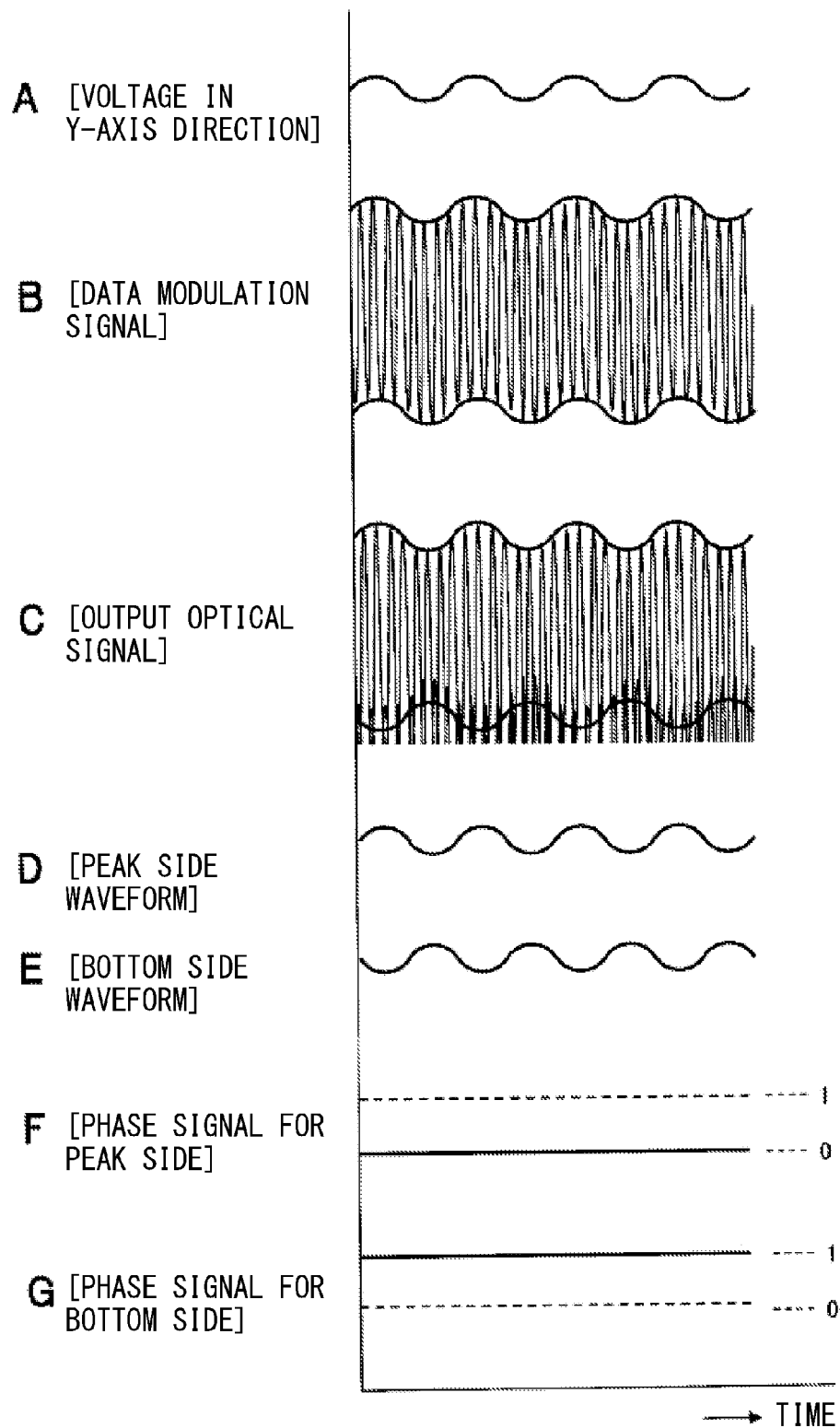
Figure 29:
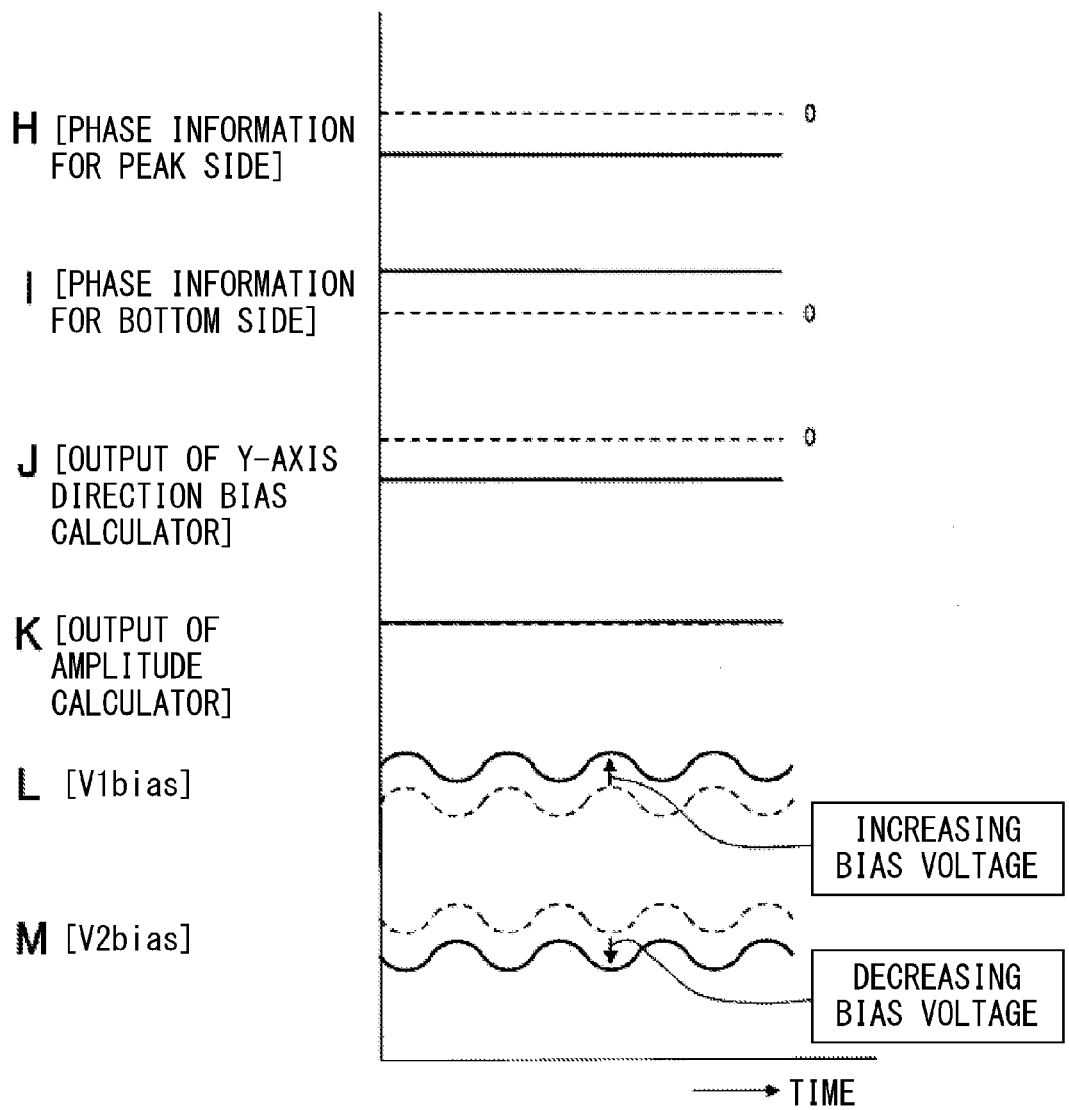

(4) When the Y-Axis Direction Bias Voltage is Low (FIGS. 27-29)

FIG. 27 through FIG. 29 illustrate the state in which the Y-axis direction bias voltage is lower than the optimum value. It is Assumed that the Modulation Amplitude is appropriately adjusted. (A) through (C) in FIG. 27 correspond to (A) through (C) in FIG. 18, respectively. (A) through (G) in FIG. 28 and (H) through (M) in FIG. 29 correspond to (A) through (G) in FIG. 19 and (H) through (M) in FIG. 20, respectively.

When the Y-axis direction bias voltage is lower than the optimum value, the phase of the peak side waveform signal of an output optical signal indicates the in-phase with respect to the low frequency signal as indicated by (D) in FIG. 28. In this case, the phase signal obtained by the phase comparator 68 is continuously "0" as indicated by (F) in FIG. 28. Therefore, as indicated by (H) in FIG. 29, the integrator 72 outputs a negative value. On the other hand, the phase of the bottom side waveform signal of the output optical signal indicates the reversed-phase with respect to the low frequency signal as indicated by (E) in FIG. 28. In this case, the phase signal obtained by the phase comparator 70 is continuously "1" as indicated by (G) in FIG. 28. Thus, the integrator 74 outputs a positive value as indicated by (I) in FIG. 29.

When the integrator 72 outputs a negative value and the integrator 74 outputs a positive value, the amplitude calculator 76 does not change the amplitude control signal Vc as indicated by (K) in FIG. 29. In this case, the modulation amplitude is not changed. However, when the integrator 72 outputs a negative value and the integrator 74 outputs a positive value, the Y-axis direction bias calculator 78 changes the output voltage so that the Y-axis direction bias voltage is increased as indicated by (J) (L) (M) in FIG. 29. In this case, for example, the bias voltage V1bias is increased by ΔV, and the bias voltage V2bias is reduced by ΔV.

Figure 30:
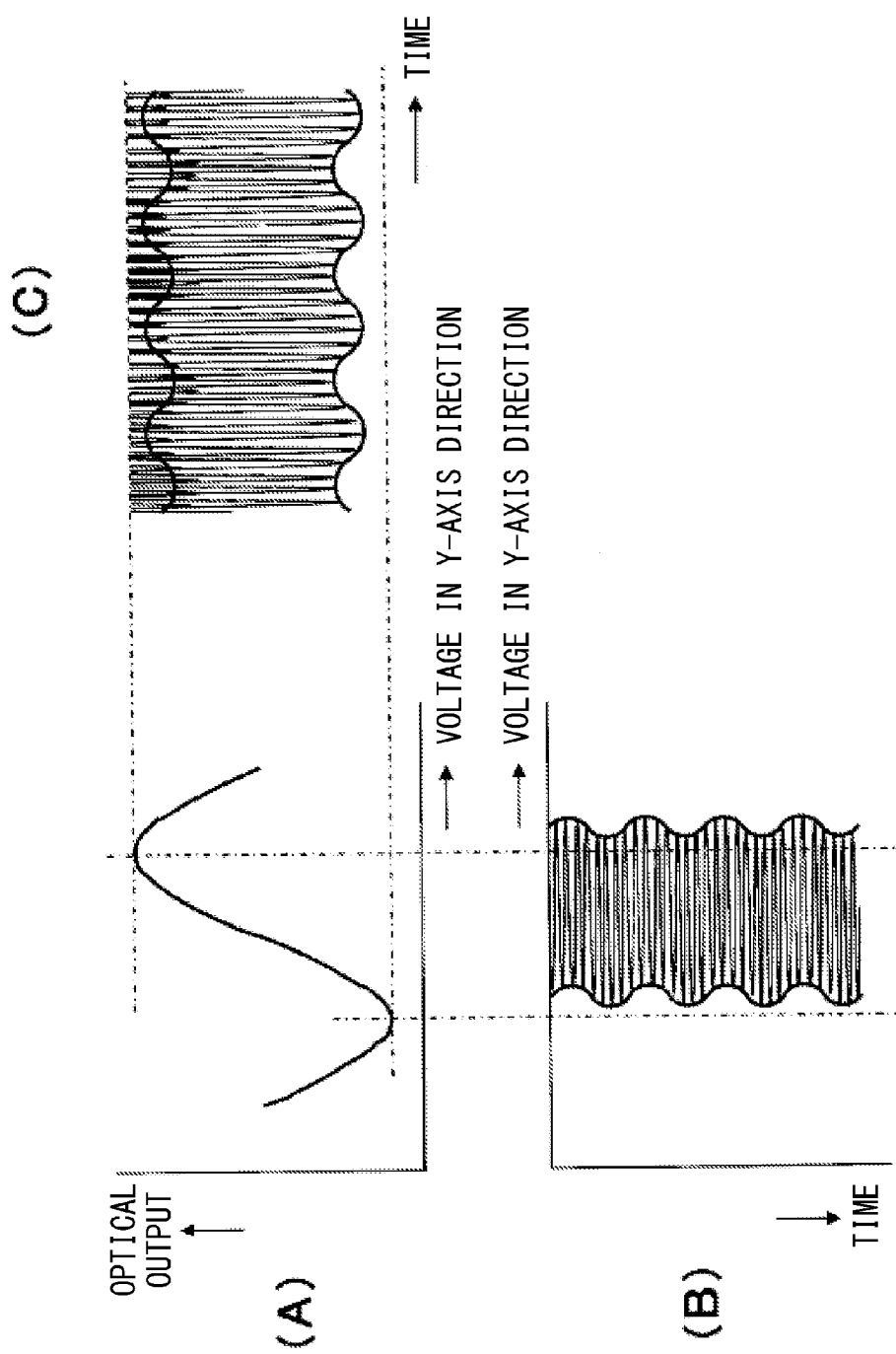
FIGS. 30-32 illustrate the case in which the bias voltage in the Y-axis direction is high.
Figure 31:
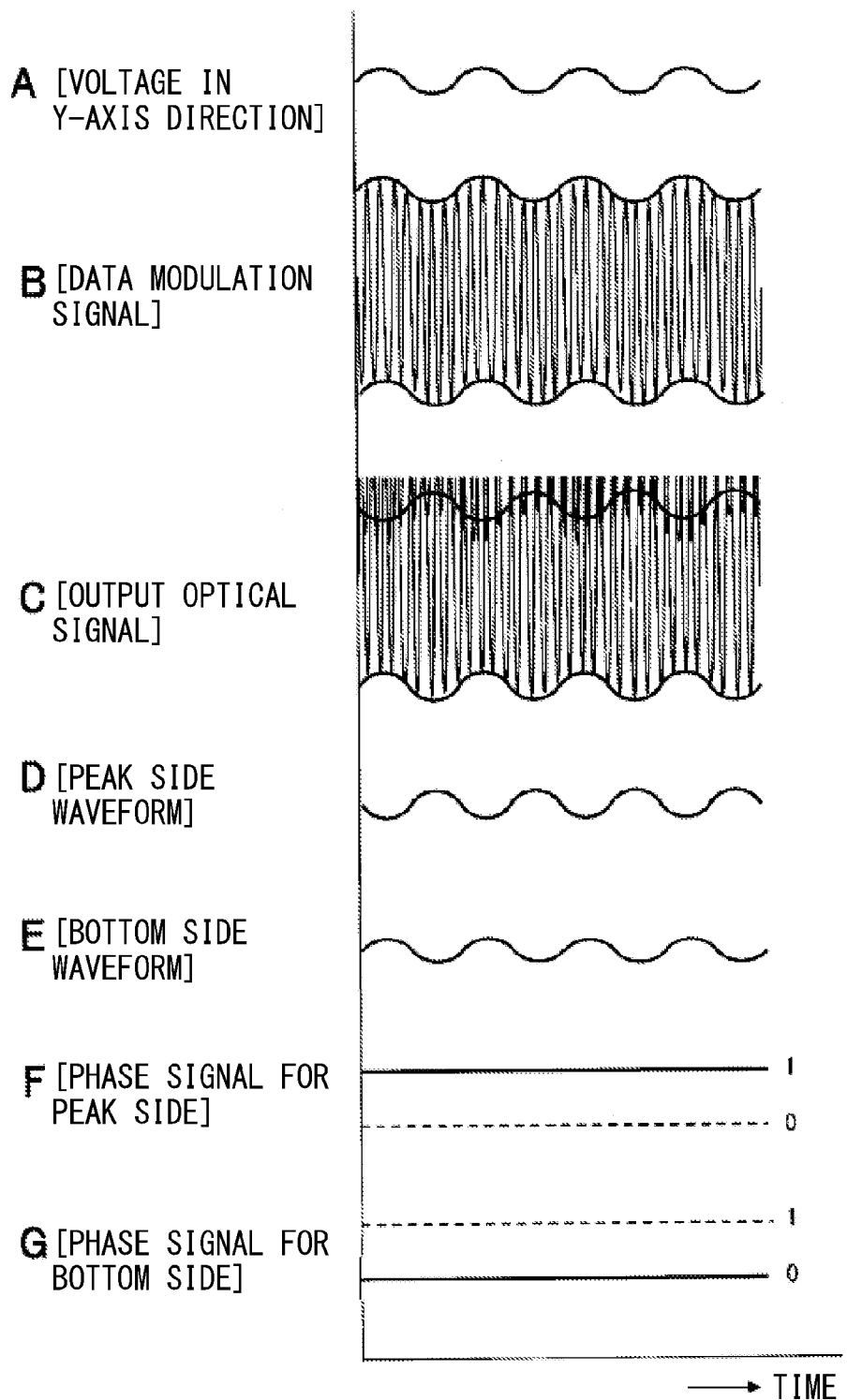
Figure 32:
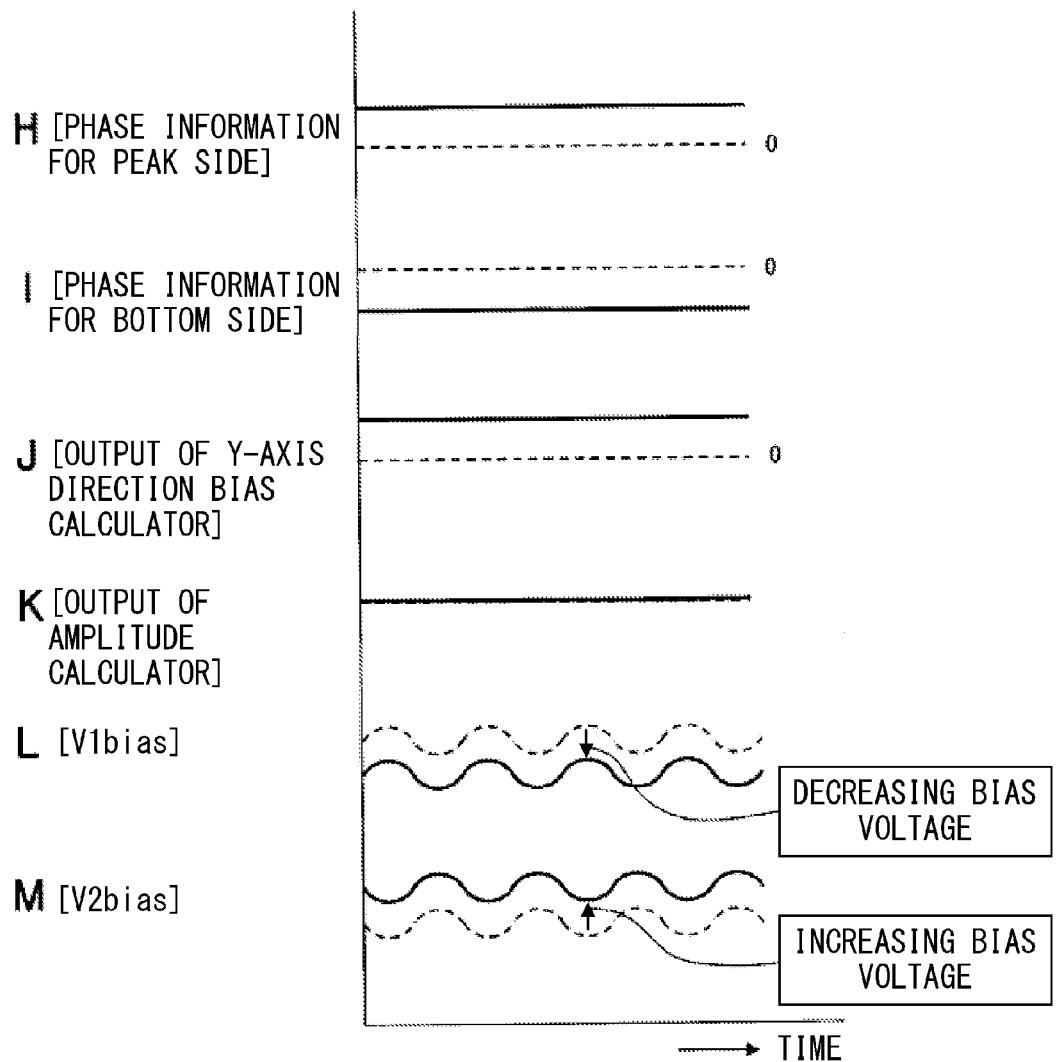

(5) When the Y-Axis Direction Bias Voltage is High (FIGS. 30-32)

FIG. 30 through FIG. 32 illustrate the state in which the Y-axis direction bias voltage is higher than the optimum value. It is Assumed that the Modulation Amplitude is appropriately adjusted. (A) through (C) in FIG. 30 correspond to (A) through (C) in FIG. 18, respectively. (A) through (G) in FIG. 31 and (H) through (M) in FIG. 32 correspond to (A) through (G) in FIG. 19 and (H) through (M) in FIG. 20, respectively.

When the Y-axis direction bias voltage is higher than the optimum value, the phase of the peak side waveform signal of an output optical signal indicates the reversed-phase with respect to the low frequency signal as indicated by (D) in FIG. 31. In this case, the phase signal obtained by the phase comparator 68 is continuously "1" as indicated by (F) in FIG. 31. Therefore, as indicated by (H) in FIG. 32, the integrator 72 outputs a positive value. On the other hand, the phase of the bottom side waveform signal of the output optical signal indicates the in-phase with respect to the low frequency signal as indicated by (E) in FIG. 31. In this case, the phase signal obtained by the phase comparator 70 is continuously "0" as indicated by (G) in FIG. 31. Thus, the integrator 74 outputs a negative value as indicated by (I) in FIG. 32.

When the integrator 72 outputs a positive value and the integrator 74 outputs a negative value, the amplitude calculator 76 does not change the amplitude control signal Vc as indicated by (K) in FIG. 32. In this case, the modulation amplitude is not changed. However, when the integrator 72 outputs a positive value and the integrator 74 outputs a negative value, the Y-axis direction bias calculator 78 changes the output voltage so that the Y-axis direction bias voltage is decreased as indicated by (J) (L) (M) in FIG. 32. In this case, for example, the bias voltage V1bias is reduced by ΔV, and the bias voltage V2bias is increased by ΔV.

Fifth Embodiment

Figure 33:
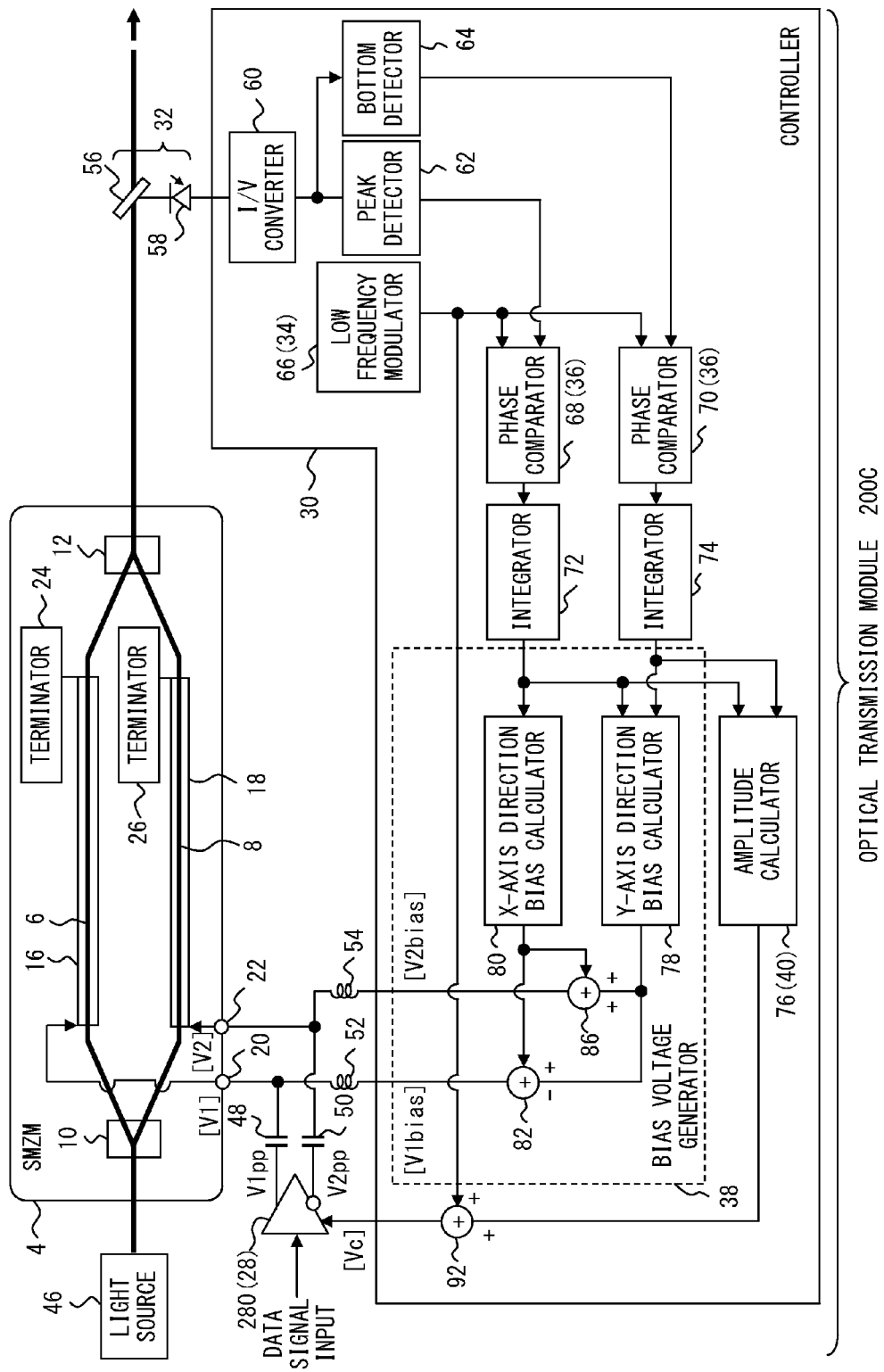
FIG. 33 illustrates an example of an optical transmission module according to the fifth embodiment.

The fifth embodiment is described below with reference to FIG. 33. FIG. 33 illustrates an example of an optical transmission module according to the fifth embodiment. In FIG. 33, similar element also illustrated in FIG. 13 is assigned the same reference numeral.

In an optical transmission module 200C according to the fifth embodiment, the amplitude control signal Vc for control of a modulation amplitude is modulated by a low frequency signal. In the optical transmission module 200C according to the fifth embodiment as compared with that according to the third embodiment, the adder 84 is deleted, and a fifth adder 92 is added. The fifth adder 92 adds an output signal of the amplitude calculator 76 and the low frequency signal generated by the low frequency modulator 66. By so doing, the fifth adder 92 generates the amplitude control signal Vc modulated by the low frequency signal, and provides it for the amplitude-control input port of the modulator 280. Since other configurations of the fifth embodiment are substantially identical to those of the third or fourth embodiment, the detailed explanation is omitted here.

The amplitude modulation using the low frequency signal is realized by superimposing the low frequency signal on the output signal of the amplitude calculator 76 (that is, the voltage for control of the modulation amplitude). The control of the modulation amplitude and the Y-axis direction bias voltage according to the fifth embodiment are described below.

As with the control performed when the low frequency signal is superimposed on the Y-axis direction bias voltage, an error of the modulation amplitude and an error of the Y-axis direction bias voltage are detected by detecting the phases of the peak side waveform and the bottom side waveform using the phase comparators 68 and 70. Then, the controller 30 controls the modulation amplitude and the Y-axis direction bias voltage so that the error of the modulation amplitude and the error of the Y-axis direction bias voltage are reduced. Therefore, the modulation amplitude and the Y-axis direction bias voltage are automatically optimized or approximately optimized.

Figure 34:
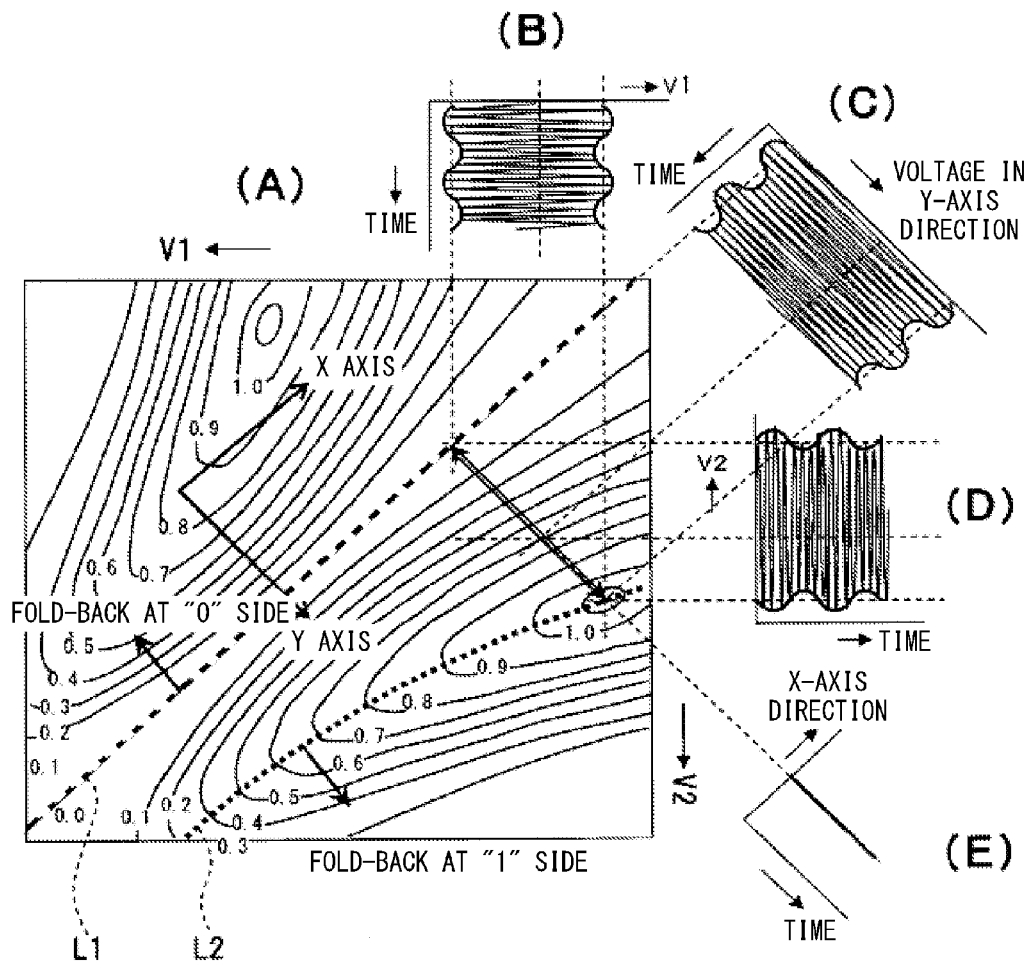
FIG. 34 illustrates an example of the characteristic when a low frequency modulation is performed on the amplitude of a data signal.

The operation of dithering the modulation amplitude by the low frequency signal is described below with reference to FIG. 34 and FIG. 35. FIG. 34 illustrates an operation performed when the amplitude of the modulation signal is dithered by a low frequency. In FIG. 34, (A) illustrates the static characteristic of an SMZM, (B) illustrates a waveform of the input voltage V1, (C) illustrates a voltage in the Y-axis direction, (D) illustrates a waveform of the input voltage V2, and (E) illustrates a voltage in the X-axis direction. In FIG. 35, (A) illustrates the amplitude control signal Vc, (B) illustrates an in-phase modulation signal, (C) illustrates a reversed-phase modulation signal, and (D) illustrates a voltage in the Y-axis direction When the amplitude control signal Vc of the modulator 280 is modulated by the low frequency signal, the amplitude of the modulation signal is dithered in synchronization with the low frequency signal as indicated by (B) and (C) in FIG. 35. Thus, the amplitudes of the input voltages V1 and V2 are also dithered in synchronization with the low frequency signal. As a result, the voltage in the Y-axis direction dithers in synchronization with the low frequency signal as indicated by (C) in FIG. 34 or (D) in FIG. 35. On the other hand, in the X-axis direction, the low frequency components of the input voltages V1 and V2 are cancelled. Therefore, the voltage in the X-axis direction does not change as illustrated by (E) in FIG. 34.

Described next is the method of controlling the modulation amplitude and the Y-axis direction bias voltage. As described below with reference to FIG. 34 and FIG. 35, it is assumed that the amplitude control signal Vc is modulated by the low frequency signal.

Figure 36:
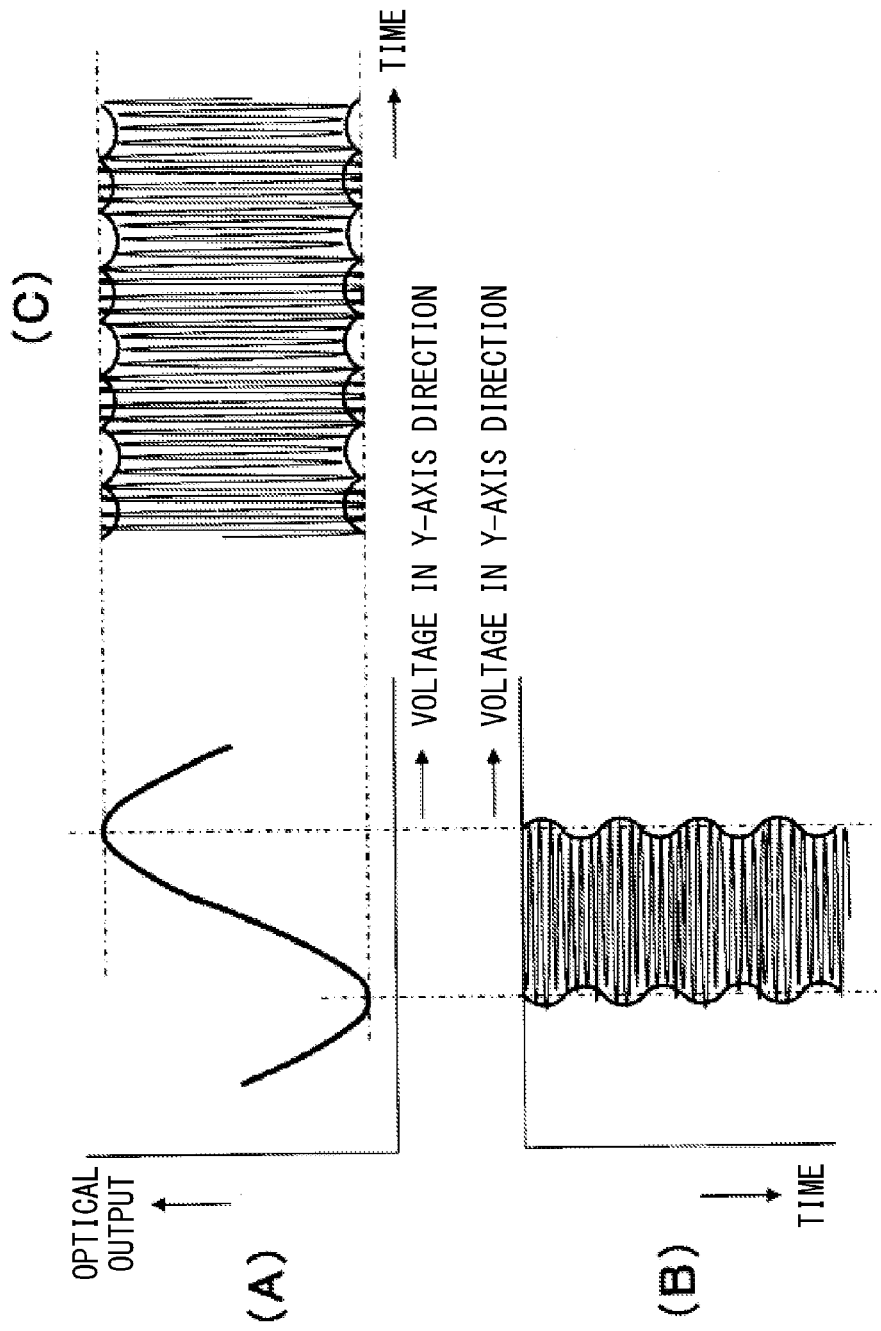
FIGS. 36-38 illustrate the case in which the modulation amplitude and the bias voltage in the Y-axis direction are at the optimum.
Figure 37:
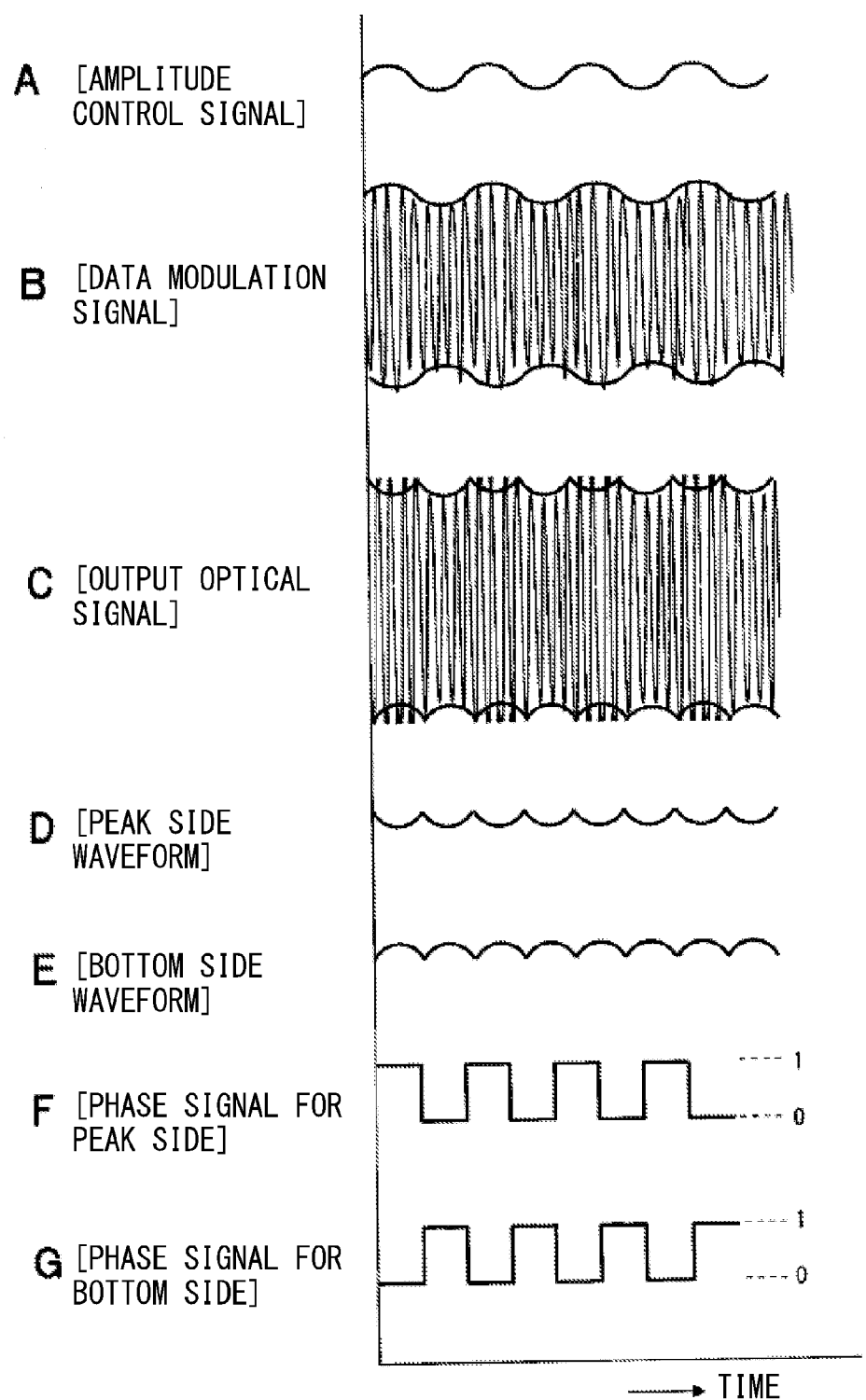
Figure 38:
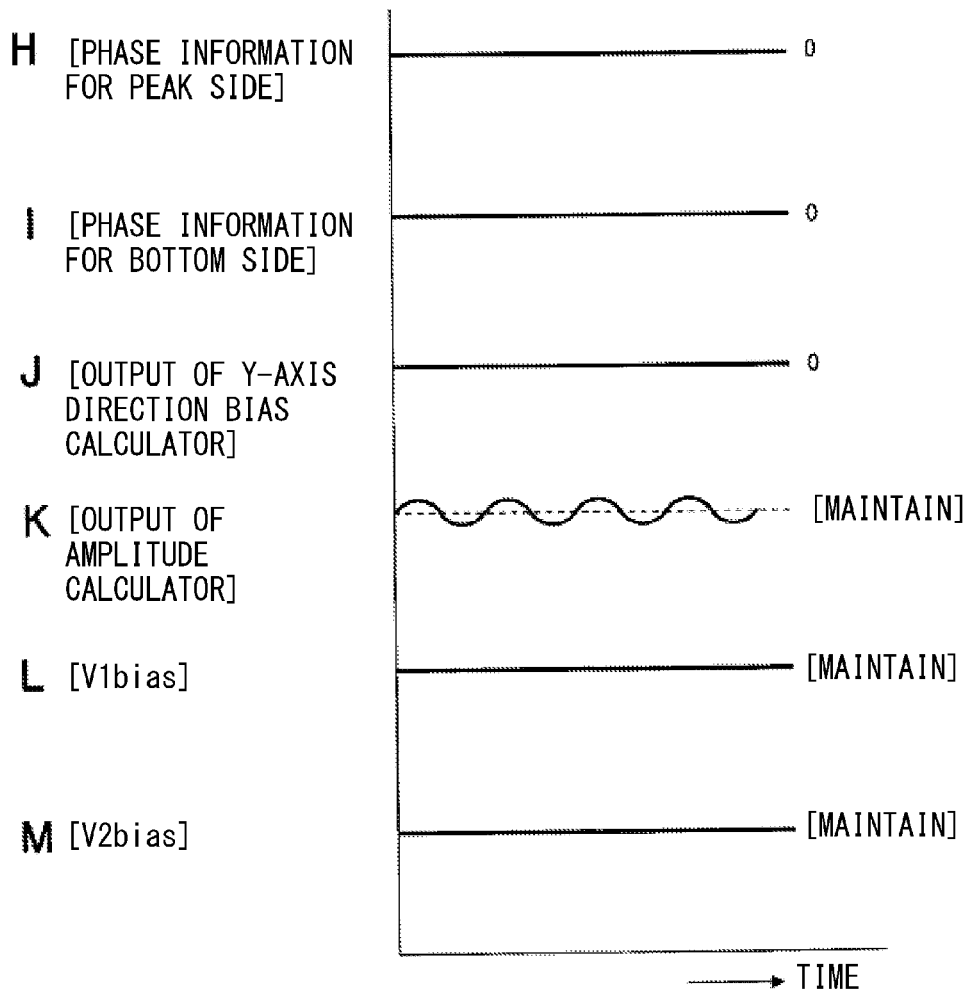

(1) When the Modulation Amplitude and the Y-Axis Direction Bias Voltage are Optimum (FIGS. 36-38)

FIG. 36 through FIG. 38 illustrate the state in which the modulation amplitude and the Y-axis direction bias voltage are optimized. In FIG. 36, (A) indicates the operation characteristic of the SMZM 4, (B) indicates a modulation signal waveform, and (C) indicates an output optical signal. FIG. 37 and FIG. 38 illustrate a signal obtained by each element of the optical transmission module 200C. In FIG. 37, (A) illustrates the amplitude control signal Vc on which the low frequency signal is superimposed. Note that the waveform of the low frequency signal generated by the low frequency modulator 66 is substantially the same as the waveform indicated by (A) in FIG. 37. (B) illustrates the data modulation signal output from the modulator 280, (C) illustrates an output optical signal of the SMZM 4, (D) illustrates the peak side waveform signal obtained by the peak detector 62, (E) illustrates the bottom side waveform signal obtained by the bottom detector 64. (F) illustrates the phase signal of the peak side waveform signal obtained by the phase comparator 68, (G) illustrates the phase signal of the bottom side waveform signal obtained by the phase detector 70. In FIG. 38, (H) illustrates peak side phase information obtained by the integrator 70, (I) illustrates bottom side phase information obtained by the integrator 72. (J) illustrates an output signal of the Y-axis direction bias calculator 78. In (K) of FIG. 38, the broken line indicates the output signal of the amplitude calculator 76, and the solid line indicates the amplitude control signal on which the low frequency signal is superimposed. (L) and (M) in FIG. 38 illustrate the bias voltages V1bias and V2bias, respectively.

When the modulation amplitude and the Y-axis direction bias voltage are optimum, the waveform of the output optical signal has the fold-back on both peak side and bottom side. Therefore, the operation of the controller 30 is substantially identical to the operation described above with reference to FIG. 18 through FIG. 20. That is, each of the integrators 72 and 74 outputs "zero" as indicated by (H) and (I) in FIG. 38.

When the outputs of the integrators 72 and 74 are zero, the amplitude calculator 76 maintains the amplitude control signal Vc as indicated by (K) in FIG. 38. In this case, the modulation amplitude is not changed. In addition, when the outputs of the integrators 72 and 74 are zero, the Y-axis direction bias calculator 78 does not change the output voltage as indicated by (J) in FIG. 38. In this case, the bias voltages V1bias and V2bias are not changed.

In the fifth embodiment, the low frequency signal is superimposed on the amplitude control signal Vc. Therefore, as indicated by (B) in FIG. 37, the peak side waveform of the input voltage signal of the SMZM 4 indicates the in-phase with respect to the low frequency signal, and the bottom side waveform of the input voltage signal of the SMZM 4 indicates the reversed-phase with respect to the low frequency signal. Thus, in the fifth embodiment, unlike the fourth embodiment, the phases of the peak side waveform and the bottom side waveform of the input voltage signal of the SMZM 4 indicate reversed phases to each other.

Figure 39:
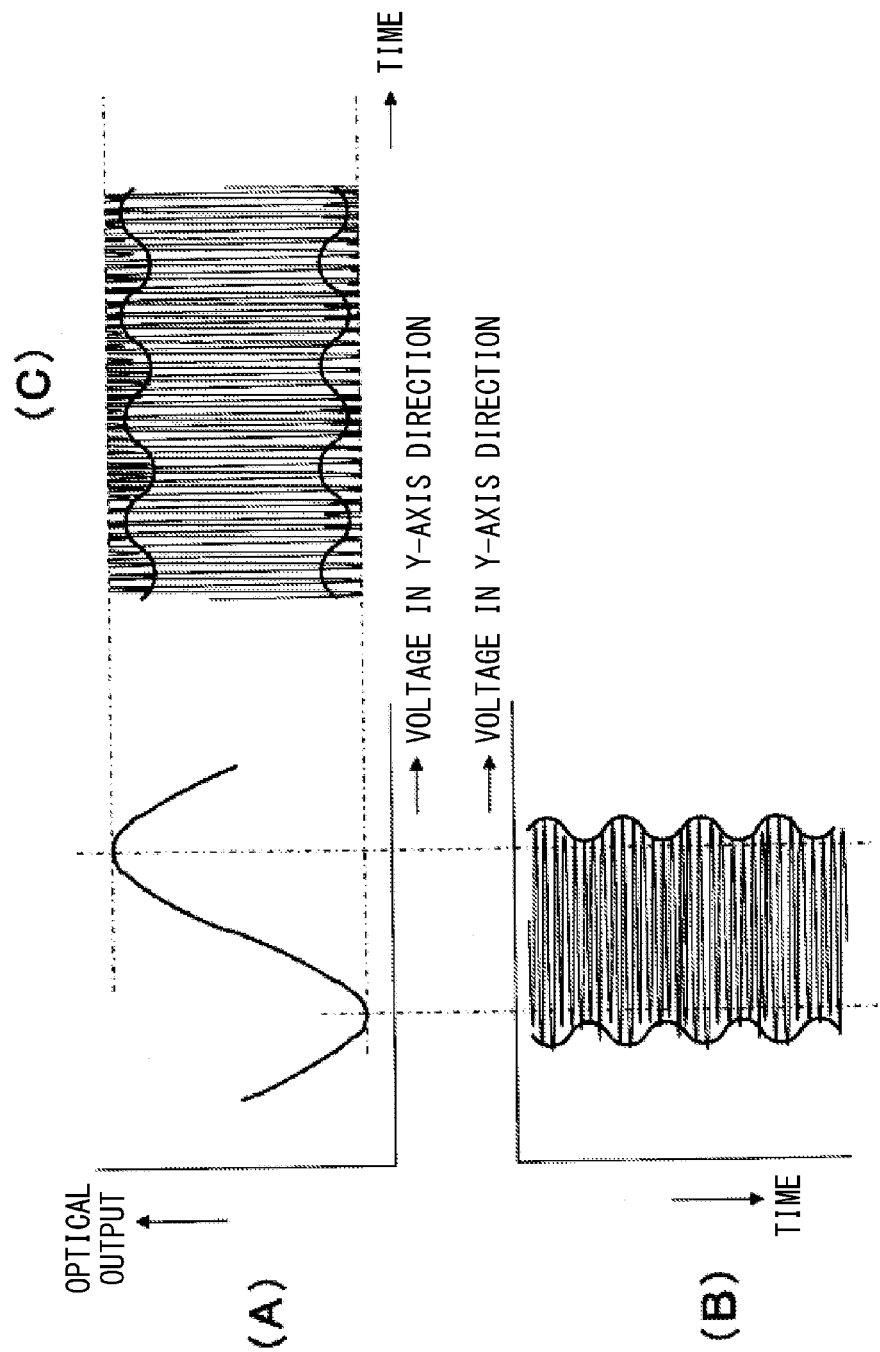
Figure 41:
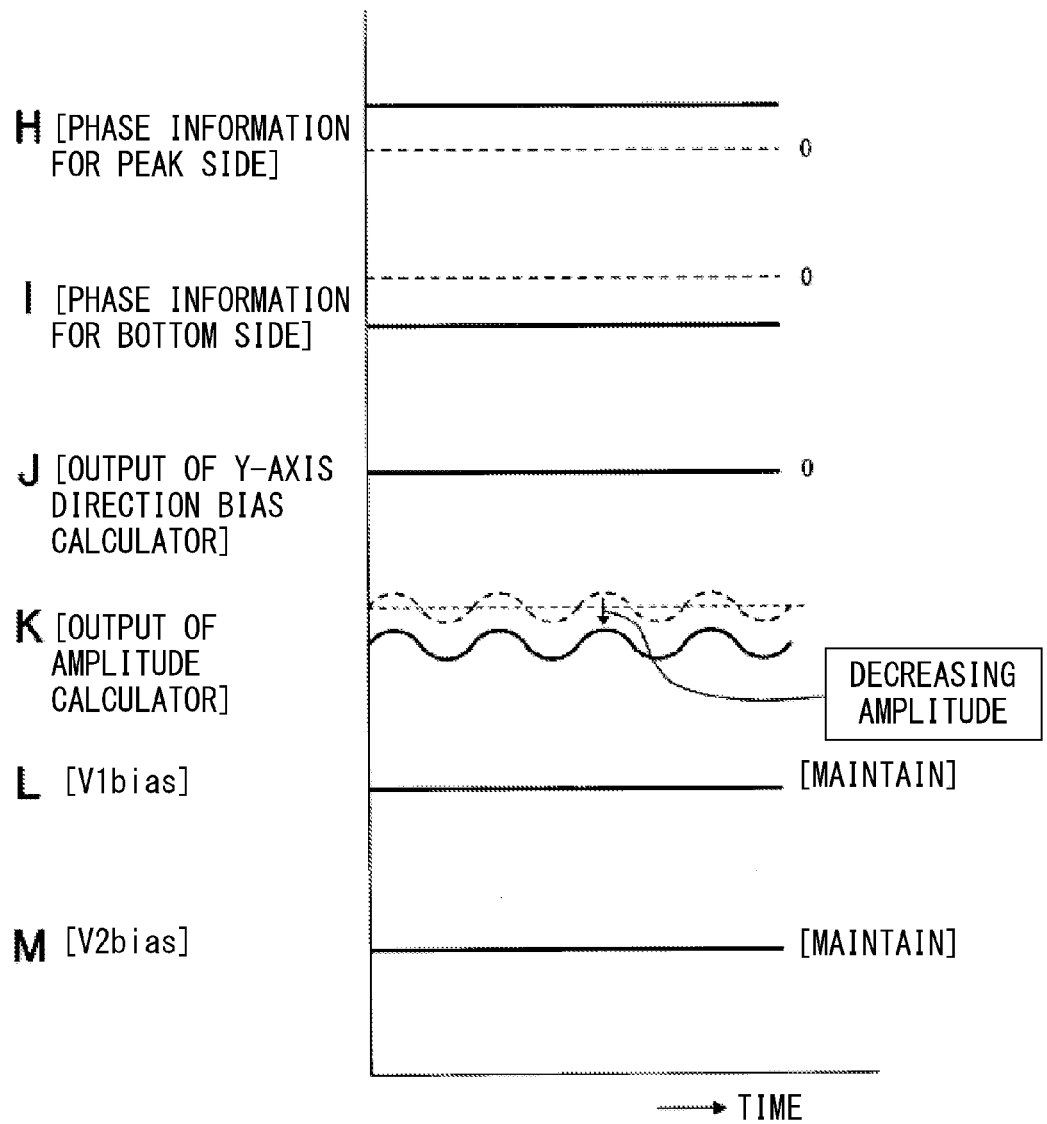

(2) When the Modulation Amplitude is Large (FIGS. 39-41)

FIG. 39 through FIG. 41 illustrate the state in which the modulation amplitude is larger than the optimum value. It is assumed that the Y-axis direction bias is appropriately adjusted. (A) through (C) in FIG. 39 correspond to (A) through (C) in FIG. 36, respectively. (A) through (G) in FIG. 40 and (H) through (M) in FIG. 41 correspond to (A) through (G) in FIG. 37 and (H) through (M) in FIG. 38, respectively.

When the modulation amplitude is larger than the optimum value, the phase of the peak side waveform signal of an output optical signal indicates the reversed-phase with respect to the low frequency signal as indicated by (D) in FIG. 40. In this case, the phase signal obtained by the phase comparator 68 is continuously "1" as indicated by (F) in FIG. 40. As in the fourth embodiment, the integrator 72 averages the phase signal, and subtracts "0.5" from the averaged value. As a result, the integrator 72 outputs a positive value as indicated by (H) in FIG. 41. On the other hand, the bottom side waveform of the output optical signal indicates the in-phase with respect to the low frequency signal as indicated by (E) in FIG. 40. Therefore, the integrator 74 outputs a negative value as indicated by (I) in FIG. 41.

In the fifth embodiment, when the integrator 72 outputs a positive value and the integrator 74 outputs a negative value, the amplitude calculator 76 changes the amplitude control signal Vc so that the modulation amplitude is reduced as indicated by (K) in FIG. 41. In addition, when the integrator 72 outputs a positive value and the integrator outputs a negative value, the Y-axis direction bias calculator 78 does not change the output voltage. In this case, the bias voltages V1bias and V2bias are not changed.

Figure 42:
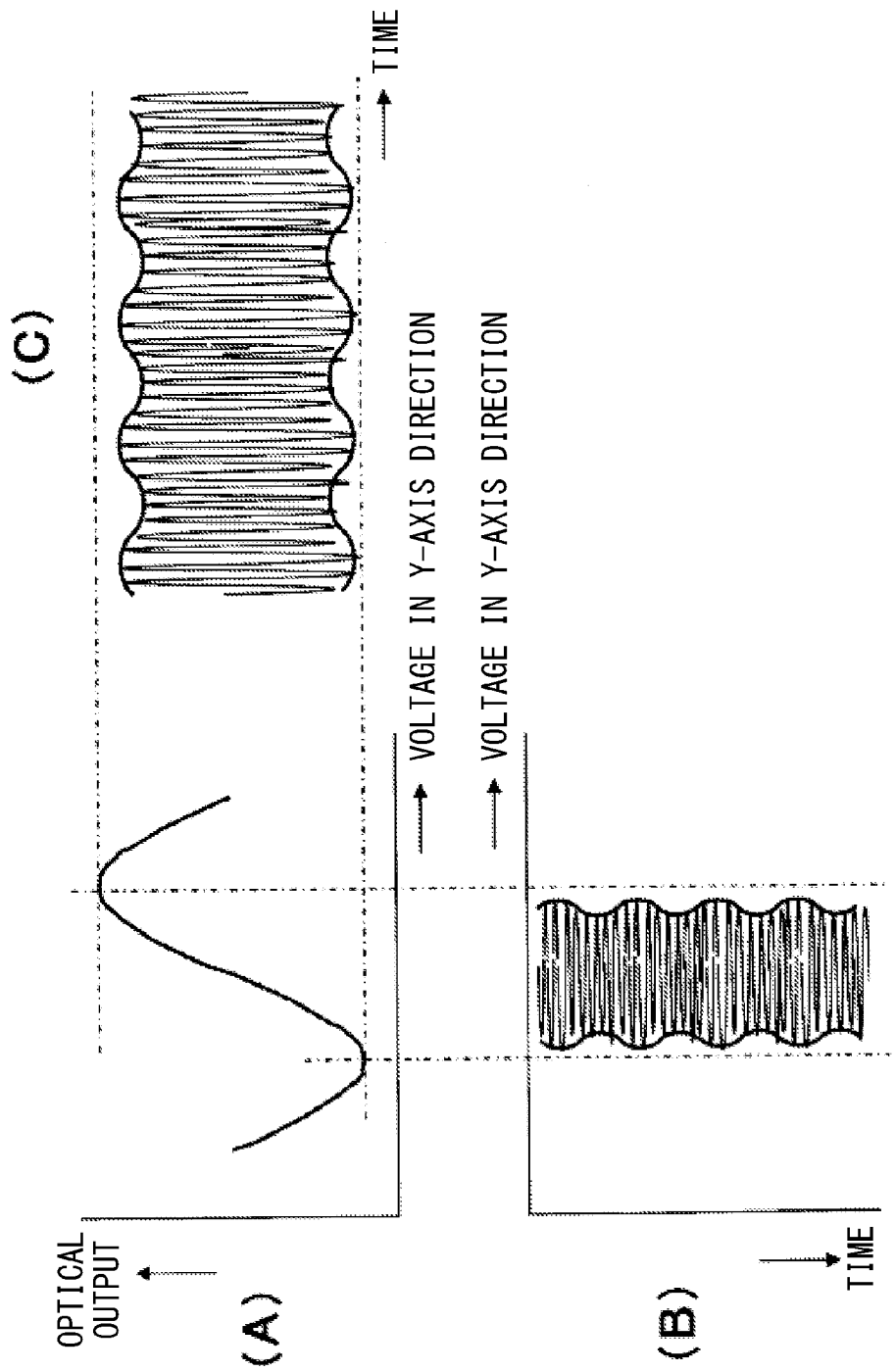
Figure 43:
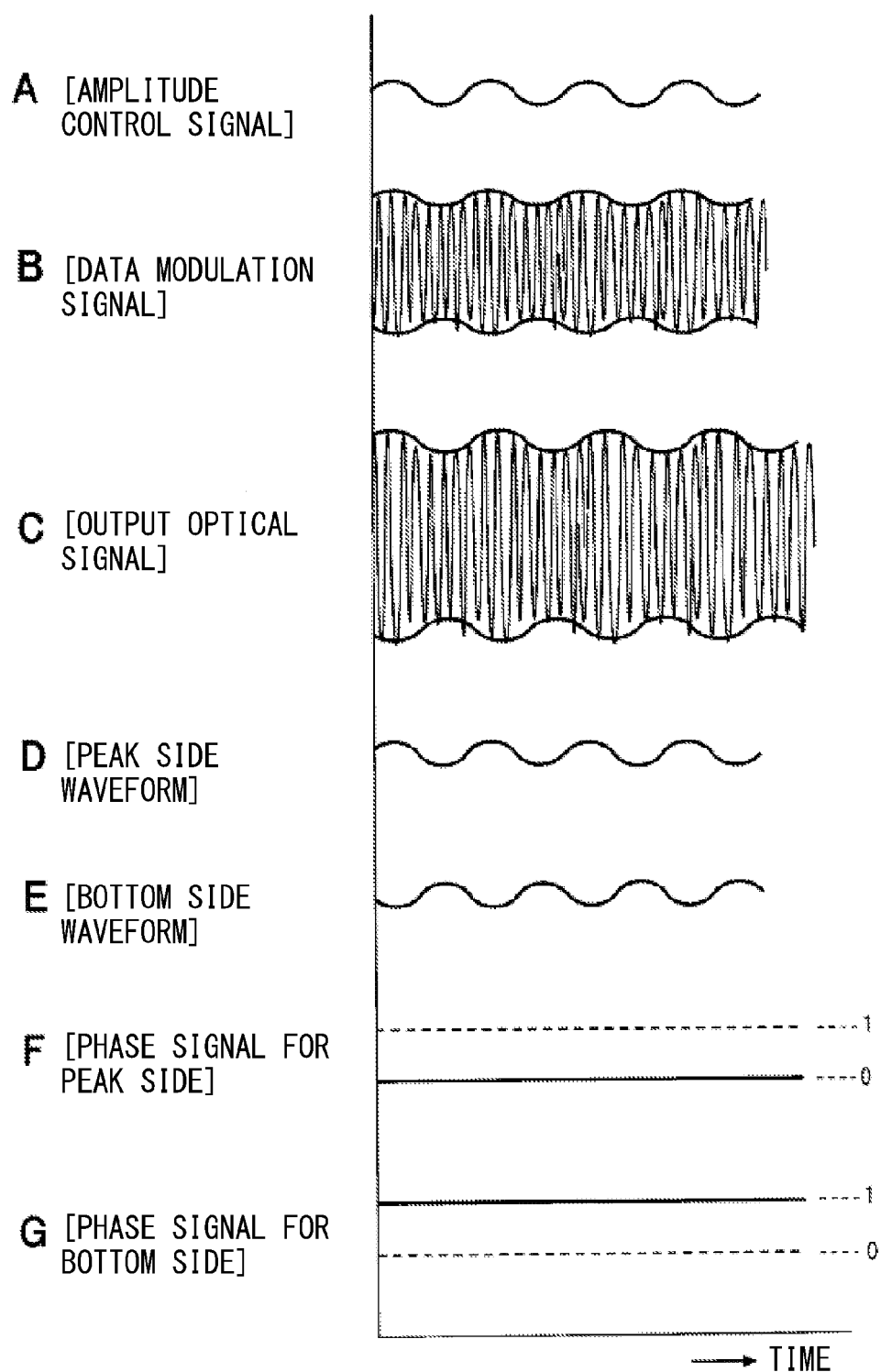

(3) When the Modulation Amplitude is Small (FIGS. 42-44)

FIG. 42 through FIG. 44 illustrate the state in which the modulation amplitude is smaller than the optimum value. It is assumed that the Y-axis direction bias is appropriately adjusted. (A) through (C) in FIG. 42 correspond to (A) through (C) in FIG. 36, respectively. (A) through (G) in FIG. 43 and (H) through (M) in FIG. 44 correspond to (A) through (G) in FIG. 37 and (H) through (M) in FIG. 38, respectively.

When the modulation amplitude is smaller than the optimum value, the phase of the peak side waveform signal of an output optical signal indicates the in-phase with respect to the low frequency signal as indicated by (D) in FIG. 43. In this case, the phase signal obtained by the phase comparator 68 is continuously "0" as indicated by (F) in FIG. 43. The integrator 72 averages the phase signal, and subtracts "0.5" from the averaged value. As a result, the integrator 72 outputs a negative value as indicated by (H) in FIG. 44. On the other hand, the bottom side waveform of the output optical signal indicates the reverse-phase with respect to the low frequency signal as indicated by (E) in FIG. 43. Therefore, the integrator 74 outputs a positive value as indicated by (I) in FIG. 44.

In the fifth embodiment, when the integrator 72 outputs a negative value and the integrator 74 outputs a positive value, the amplitude calculator 76 changes the amplitude control signal Vc so that the modulation amplitude is increased as indicated by (K) in FIG. 44. In addition, when the integrator 72 outputs a negative value and the integrator 74 outputs a negative value, the Y-axis direction bias calculator 78 does not change the output voltage. In this case, the bias voltages V1bias and V2bias are not changed.

Figure 45:
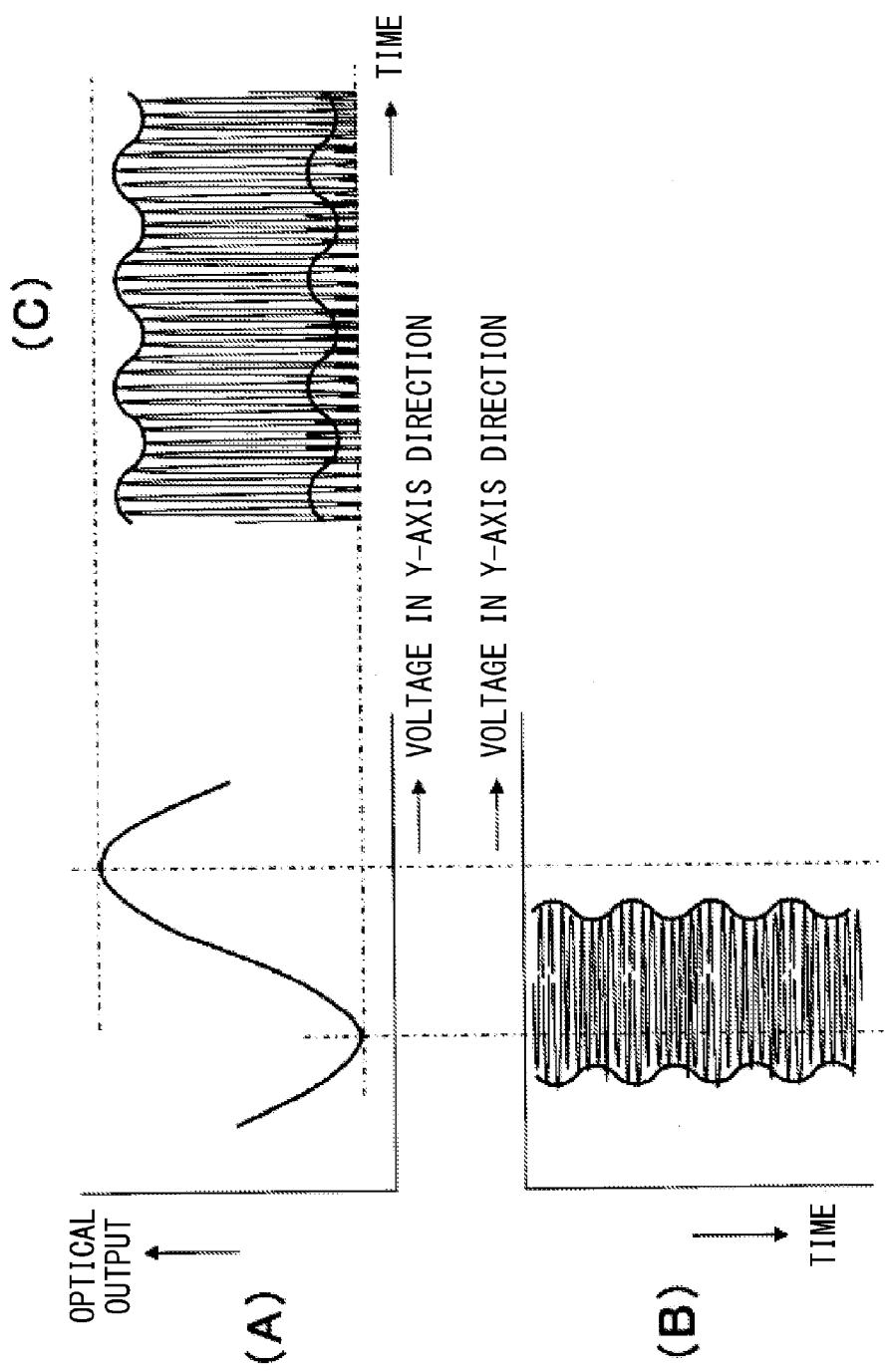
FIGS. 45-47 illustrate the case in which the bias voltage in the Y-axis direction is low.
Figure 46:
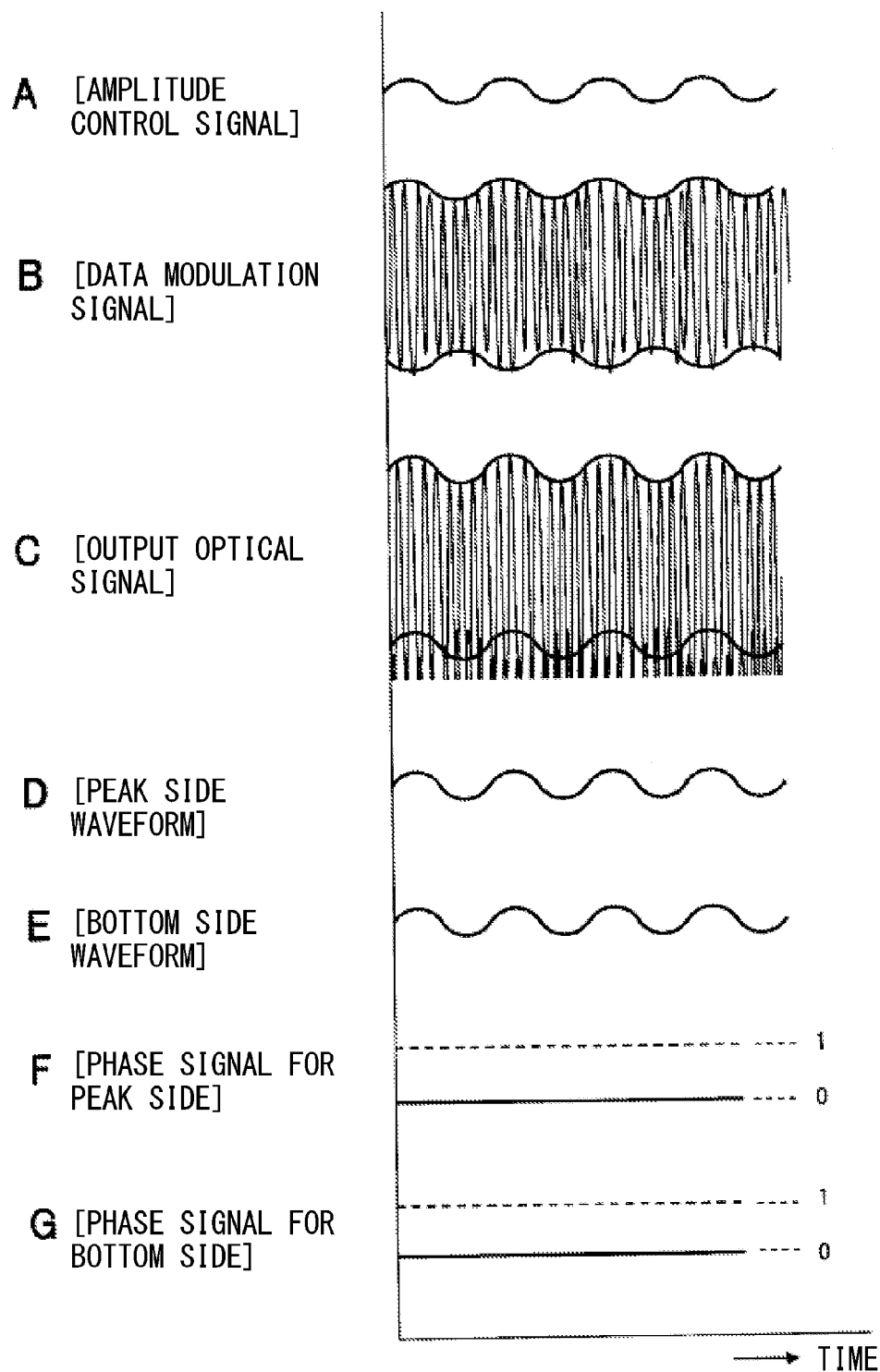
Figure 47:
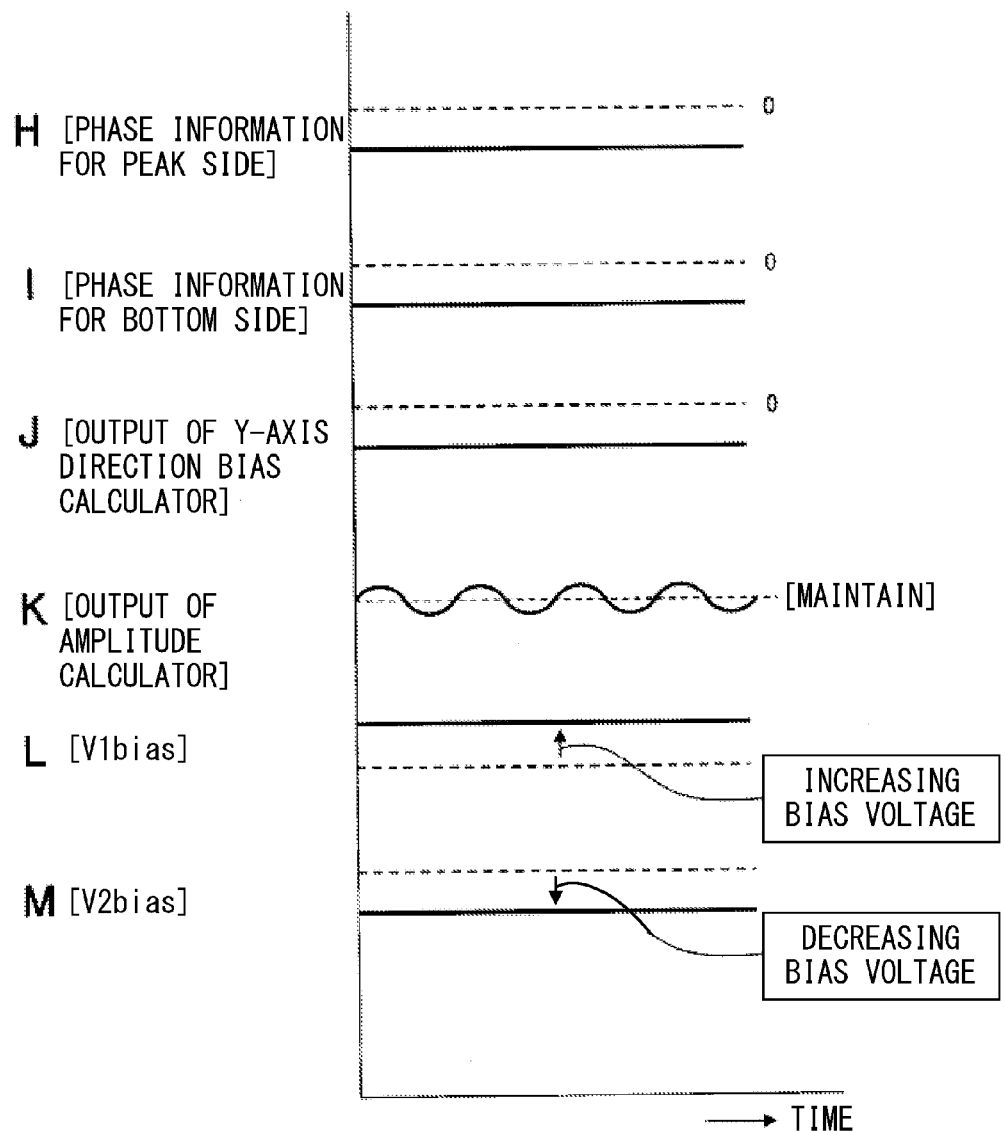

(4) When the Y-Axis Direction Bias Voltage is Low (FIGS. 45-47)

FIG. 45 through FIG. 47 illustrate the state in which the Y-axis direction bias voltage is lower than the optimum value. It is Assumed that the Modulation Amplitude is appropriately adjusted. (A) through (C) in FIG. 45 correspond to (A) through (C) in FIG. 36, respectively. (A) through (G) in FIG. 46 and (H) through (M) in FIG. 47 correspond to (A) through (G) in FIG. 37 and (H) through (M) in FIG. 38, respectively.

When the Y-axis direction bias voltage is lower than the optimum value, the phase of the peak side waveform signal of an output optical signal indicates the in-phase respect to the low frequency signal as indicated by (D) in FIG. 46. In this case, the phase signal obtained by the phase comparator 68 is continuously "0" as indicated by (F) in FIG. 46. Therefore, as indicated by (H) in FIG. 47, the integrator 72 outputs a negative value. On the other hand, the phase of the bottom side waveform signal of the output optical signal indicates the in-phase with respect to the low frequency signal as indicated by (E) in FIG. 46. In this case, the phase signal obtained by the phase comparator 70 is continuously "0" as indicated by (G) in FIG. 46. Thus the integrator 74 also outputs a negative value as indicated by (I) in FIG. 47.

In the fifth embodiment, when both of the integrators 72 and 74 output a negative value, the amplitude calculator 76 does not change the amplitude control signal Vc as indicated by (K) in FIG. 47. In this case, the modulation amplitude is maintained. In addition, when both of the integrators 72 and 74 output a negative value, the Y-axis direction bias calculator 78 changes the output voltage so that the Y-axis direction bias voltage is increased as indicated by (J) (L) (M) in FIG. 47. The bias voltages V1bias and V2bias are changed according to the change in the output voltage of the Y-axis direction bias calculator 78. In the configuration illustrated in FIG. 33, when the Y-axis direction bias calculator 78 decreases the output voltage, V1bias increases and V2bias decreases.

Figure 48:
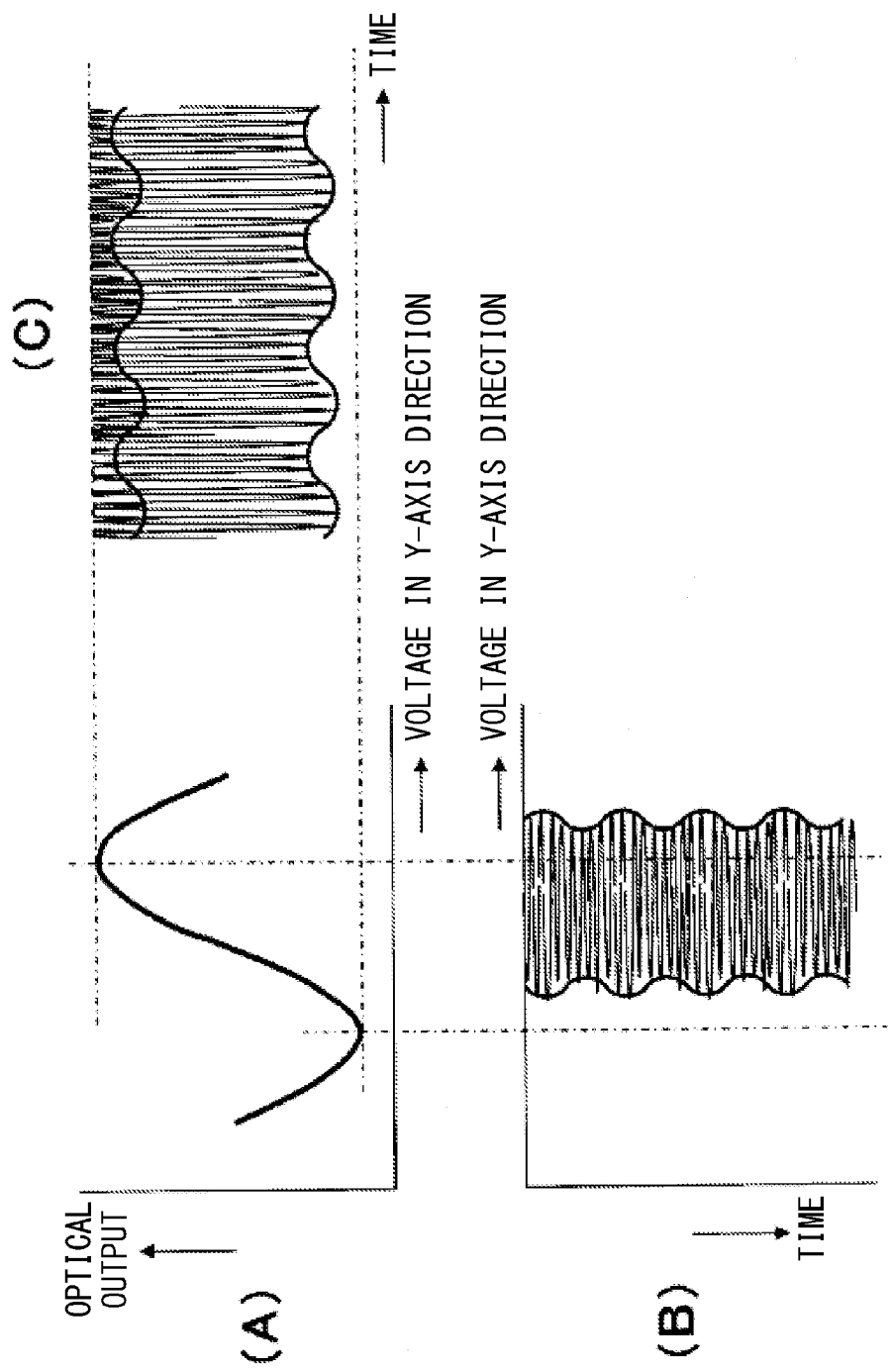
Figure 50:
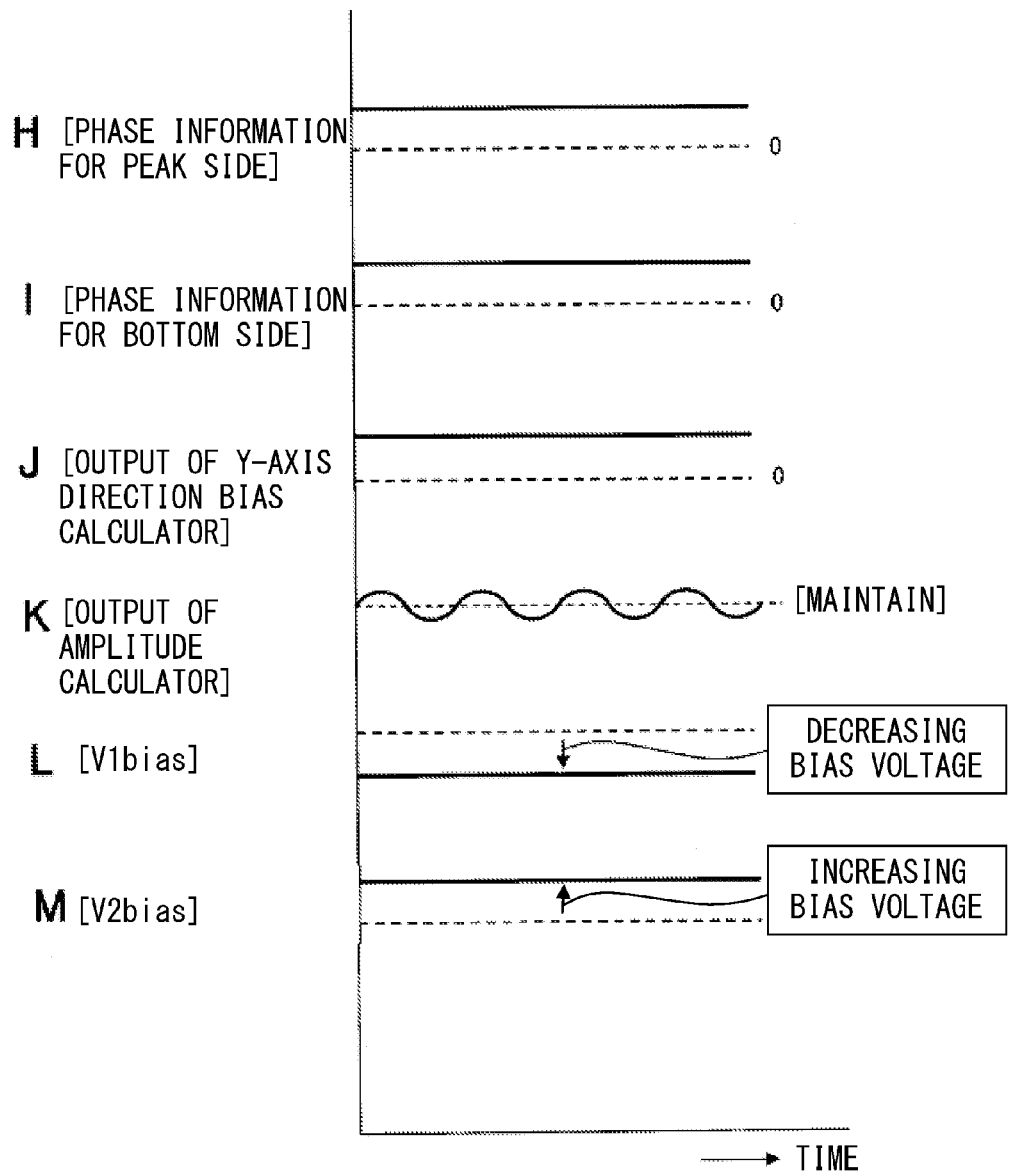

(5) When the Y-Axis Direction Bias Voltage is High (FIGS. 48-50)

FIG. 48 through FIG. 50 illustrate the state in which the Y-axis direction bias voltage is higher than the optimum value. It is Assumed that the Modulation Amplitude is appropriately adjusted. (A) through (C) in FIG. 48 correspond to (A) through (C) in FIG. 36, respectively. (A) through (G) in FIG. 49 and (H) through (M) in FIG. 50 correspond to (A) through (G) in FIG. 37 and (H) through (M) in FIG. 38, respectively.

When the Y-axis direction bias voltage is higher than the optimum value, the phase of the peak side waveform signal of an output optical signal indicates the reversed-phase with respect to the low frequency signal as indicated by (D) in FIG. 49. In this case, the phase signal obtained by the phase comparator 68 is continuously "1" as indicated by (F) in FIG. 49. Therefore, as indicated by (H) in FIG. 50, the integrator 72 outputs a positive value. Similarly, the phase of the bottom side waveform signal of the output optical signal indicates the reversed-phase with respect to the low frequency signal as indicated by (E) in FIG. 49. In this case, the phase signal obtained by the phase comparator 70 is continuously "1" as indicated by (G) in FIG. 49. Thus the integrator 74 also outputs a positive value as indicated by (I) in FIG. 50.

In the fifth embodiment, when both of the integrators 72 and 74 output a positive value, the amplitude calculator 76 does not change the amplitude control signal Vc as indicated by (K) in FIG. 50. In this case, the modulation amplitude is maintained. In addition, when both of the integrators 72 and 74 output a positive value, the Y-axis direction bias calculator 78 changes the output voltage so that the Y-axis direction bias voltage is decreased as indicated by (J) (L) (M) in FIG. 50. The bias voltages V1bias and V2bias are changed according to the change in the output voltage of the Y-axis direction bias calculator 78. In the configuration illustrated in FIG. 33, when the Y-axis direction bias calculator 78 increases the output voltage, V1bias decreases and V2bias increases.

As described, in the fifth embodiment, the low frequency signal is superimposed on the amplitude control signal. On the other hand, in the fourth embodiment described above, the low frequency signal is superimposed on the bias voltage. Therefore, the phases of the bottom side waveform of optical signals are different from each other between the fourth and fifth embodiments. In addition, the logics to determine the control operations by the amplitude calculator 76 and the Y-axis direction bias calculator 78 are different from each other between the fourth and fifth embodiments.

Sixth Embodiment

Figure 51:
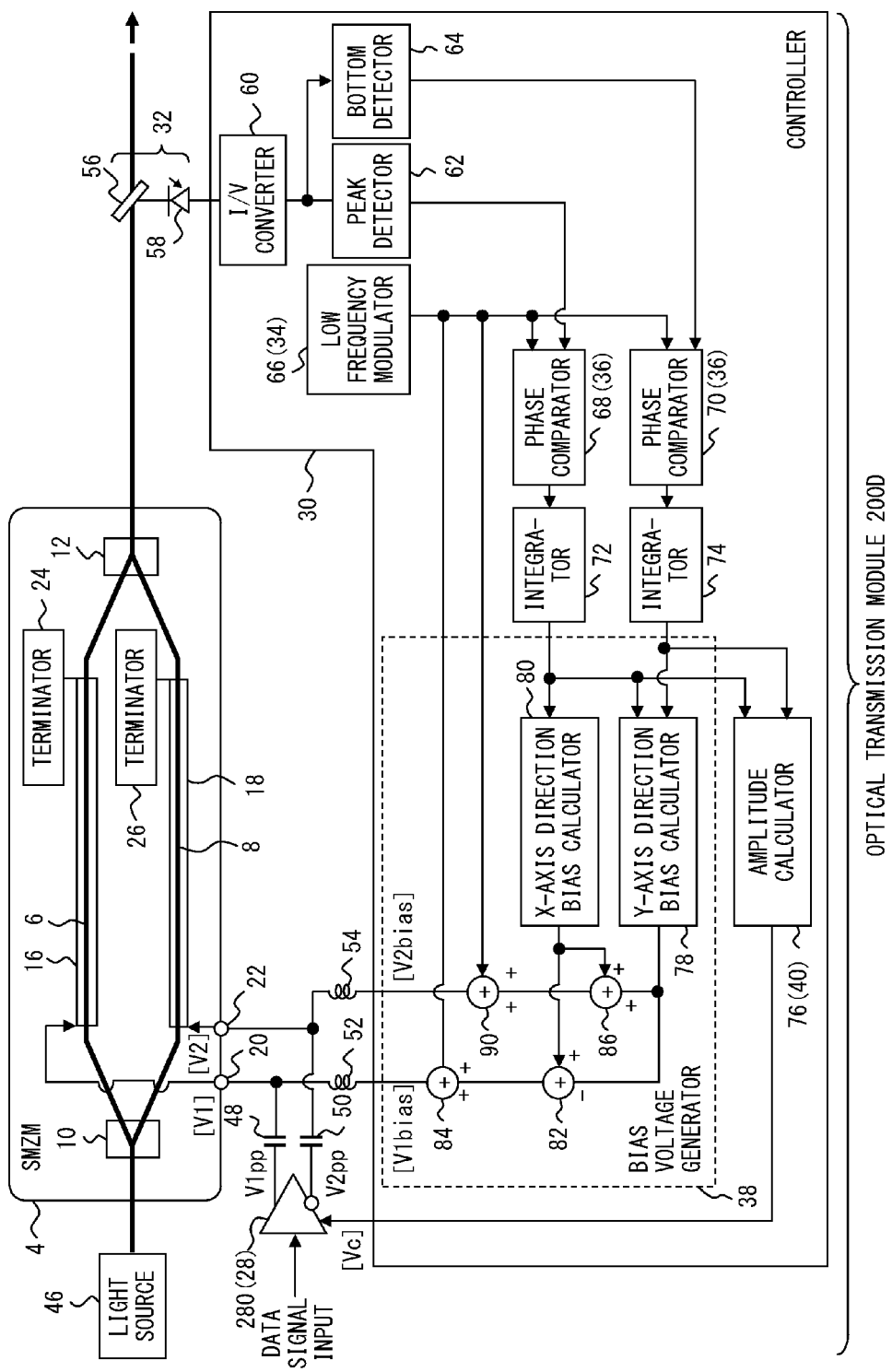
FIG. 51 illustrates an example of an optical transmission module according to the sixth embodiment.

The sixth embodiment is described below with reference to FIG. 51. FIG. 51 illustrates an example of an optical transmission module according to the sixth embodiment. In FIG. 51, similar element also illustrated in FIG. 15 is assigned the same reference numeral.

The Y-axis direction control is described above in the fourth and fifth embodiments. In the sixth embodiment, the X-axis direction control is described. In the X-axis direction control, the X-axis direction bias voltage is adjusted so that the extinction ratio is optimized or approximately optimized. The X-axis direction bias voltage is optimized by controlling the bias voltages V1bias and V2bias. By shifting the bias voltages V1bias and V2bias in the same direction by substantially the same amount, the bias voltage is changed in the X-axis direction, while the bias voltage is substantially maintained in the Y-axis direction.

When the bias voltage is changed in the X-axis direction, for example, as illustrated in FIG. 9, the optical output power is changed. To improve the extinction ratio, it is necessary to increase the maximum optical output power. That is, the control in the X-axis direction includes the operation of controlling the bias voltage in the X-axis direction so that the output optical power is increased.

When the modulation amplitude and the Y-axis direction bias voltage are appropriately controlled, the modulation signal of "0" is arranged on the bottom side boundary line L1 illustrated in FIG. 5, and the modulation signal of "1" is arranged on the peak side boundary line L2. Afterwards, to optimize the extinction ratio, the bias voltage is controlled in the X-axis direction while maintaining the modulation amplitude. During this control operation, it is preferable that the modulation signal "0" is still arranged on the bottom side boundary line L1. In this case, the modulation signal "1" is shifted from the peak side boundary line L2.

It is assumed that the low frequency signal is superimposed on the bias voltage. In this case, the output optical signal of the SMZM 4 includes a low frequency component. The phases of the peak side waveforms of the low frequency components are reversed to each other between when the modulation signal "1" exceeds the peak side boundary line L2 and when the modulation signal "1" does not exceed the peak side boundary line L2. Therefore, the X-axis direction bias voltage can be optimized or approximately optimized by monitoring the phase of the peak side waveform of the output optical signal in the X-axis direction control.

An optical transmission module 200D according to the sixth embodiment superimposes a low frequency signal on the X-axis direction bias voltage as illustrated in FIG. 51. To superimpose the low frequency signal on the X-axis direction bias voltage, the low frequency signal is added to each of the bias voltages V1bias and V2bias in the present embodiment. Therefore, the bias voltage generator 38 according to the sixth embodiment includes the adders 82, 84, 86, and 90 as in the fourth embodiment illustrated in FIG. 15. However, in the sixth embodiment, the bias voltage generator 38 is not provided with the inverter 88. Therefore, the adder 90 is provided with the low frequency signal generated by the low frequency modulator 66. That is, the bias voltages V1bias and V2bias are modulated by the in-phase low frequency signal. The descriptions of the operations of the peak detector 62, the bottom detector 64, the phase comparators 68 and 70, and the integrators 72 and 74 are omitted here since they are substantially the same as those according to the third through fifth embodiments.

Figure 52:
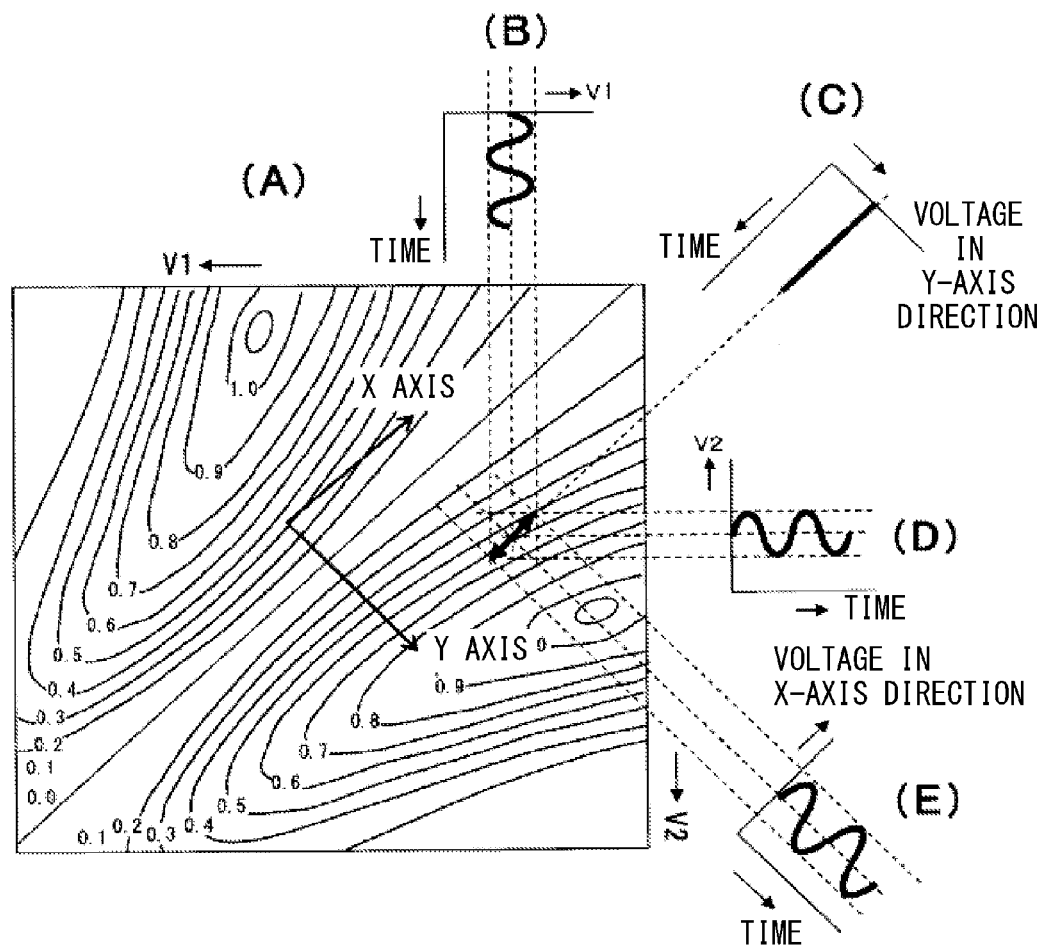
FIG. 52 illustrates an example of the characteristic when a bias modulation is performed only in the X-axis direction.
Figure 53:
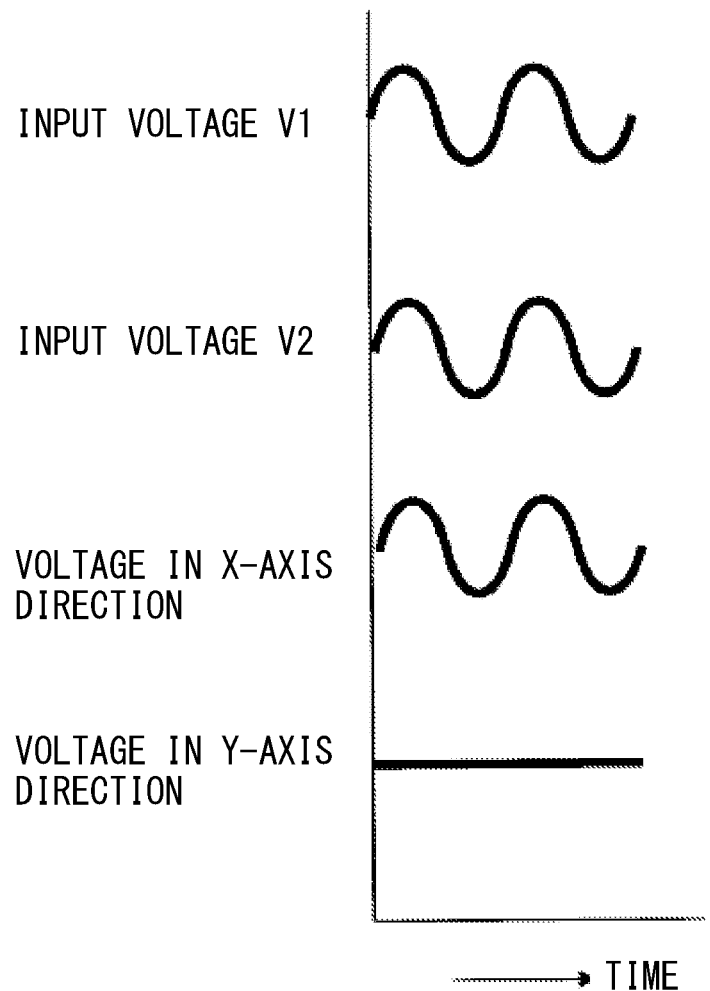
FIG. 53 illustrates the waveforms of respective points.

The control of the X-axis direction bias voltage is described below with reference to FIG. 52 and FIG. 53. FIG. 52 illustrates the operation performed when the bias voltage is modulated by the low frequency signal only in the X-axis direction. In FIG. 52, (A) illustrates the static characteristic of the SMZM 4, (B) illustrates the waveform of the input voltage V1, (C) illustrates the voltage in the Y-axis direction, (D) illustrates the waveform of the input voltage V2, and (E) illustrates the voltage in the X-axis direction. FIG. 53 illustrates the input voltages V1 and V2, the voltage in the X-axis direction, and the voltage in the Y-axis direction on a time axis.

When the low frequency signals with same phase are superimposed on the input voltages V1 and V2, respectively, the low frequency component in the Y-axis direction is cancelled. Therefore, only the voltage in the X-axis direction is modulated by the low frequency signal. It is assumed that the amplitudes of the low frequency signals superimposed on the input voltages V1 and V2 are identical. This modulating operation is realized by superimposing the same low frequency signal on the bias voltages V1bias and V2bias as illustrated in FIG. 51.

Described next is the method of controlling the X-axis direction bias voltage. In the descriptions below, as illustrated in FIG. 51 and FIG. 52, it is assumed that the bias voltage is modulated by the low frequency signal in the X-axis direction. It is preferable that the modulation amplitude and the Y-axis direction bias voltage are optimized by, for example, the method described above with reference to the third through fifth embodiments.

Figure 54:
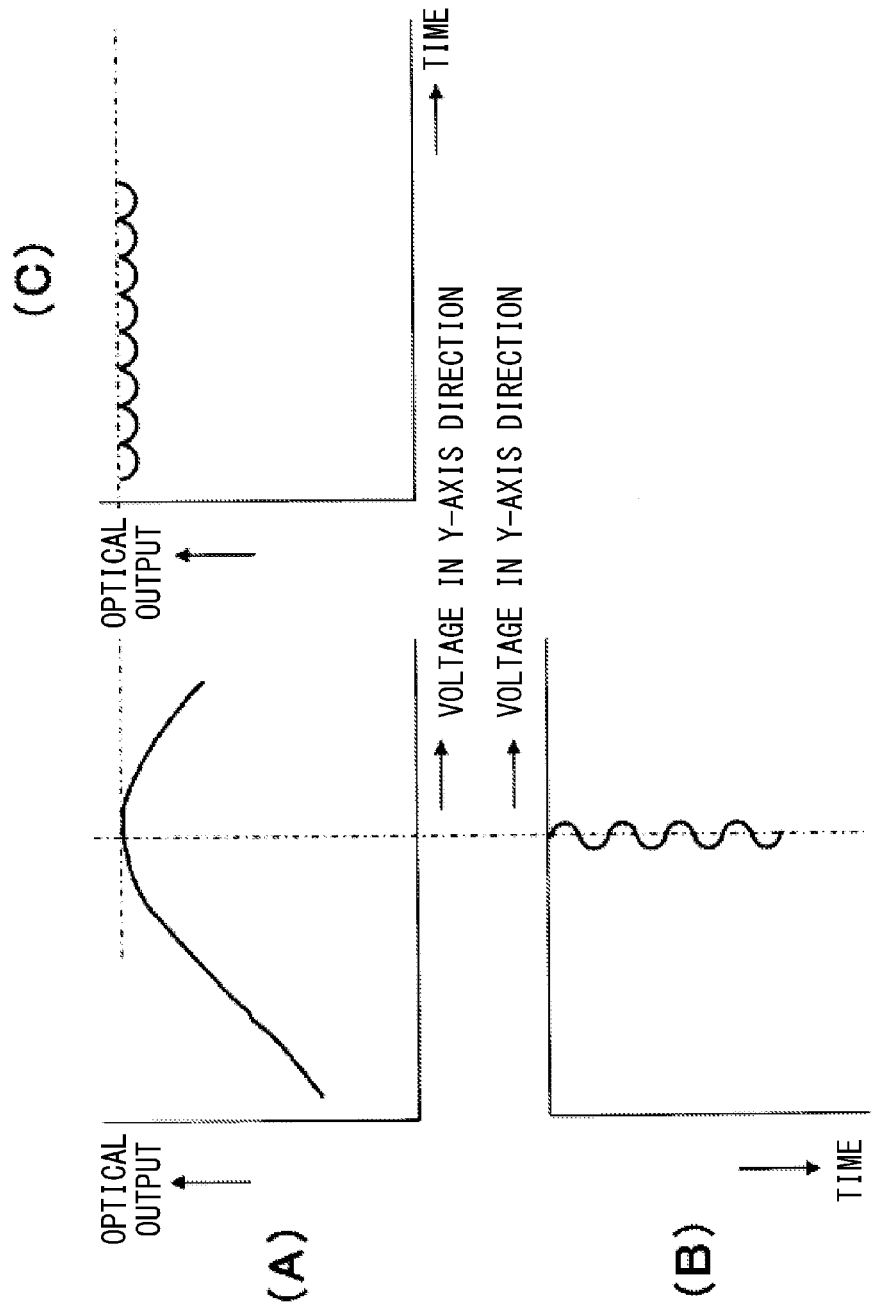
FIGS. 54-55 illustrate the case in which the bias voltage in the X-axis direction is at the optimum.
Figure 55:
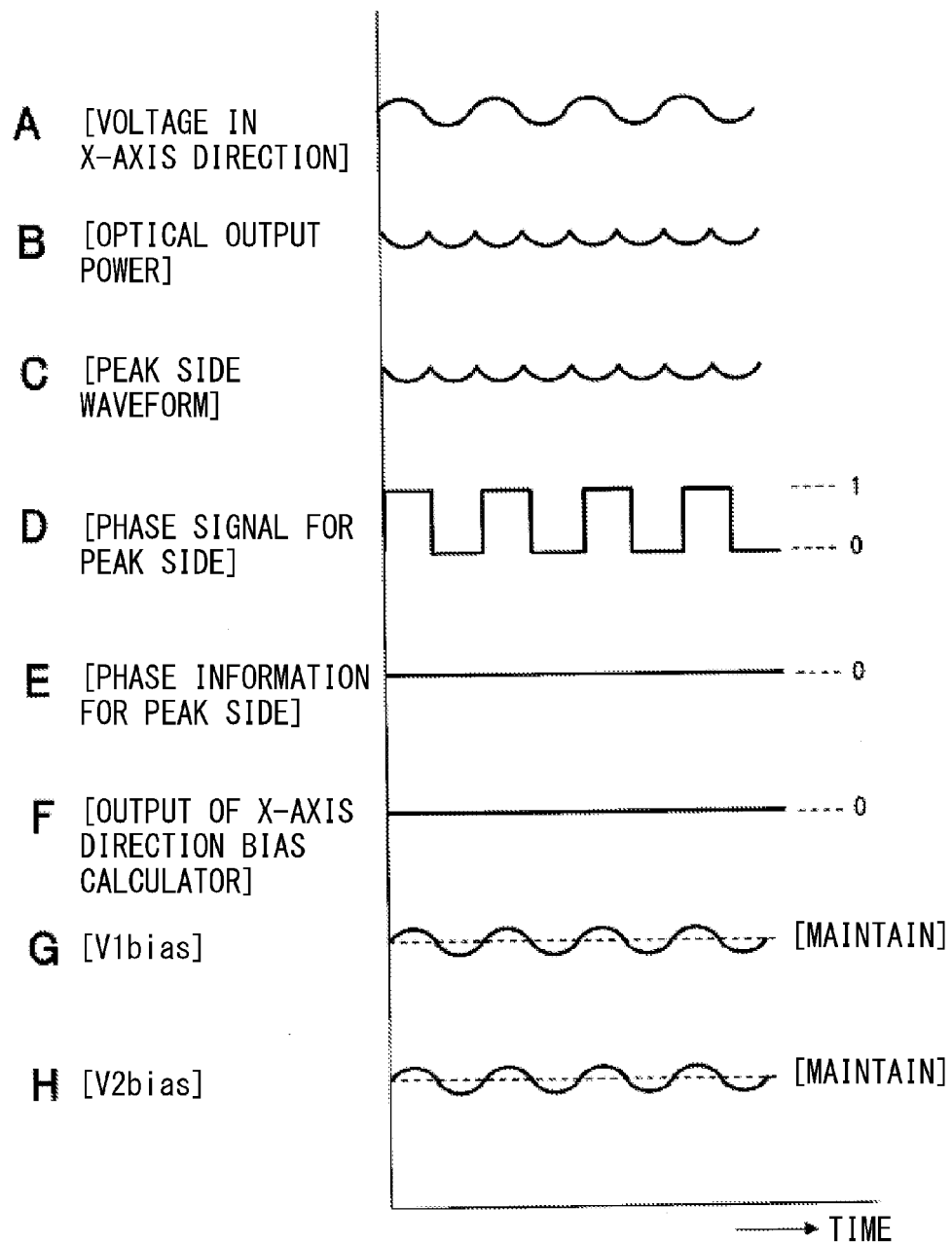

(1) When the X-Axis Direction Bias Voltage is Optimum (FIGS. 54-55)

FIG. 54 and FIG. 55 illustrate the state in which the X-axis direction bias voltage is optimized. In FIG. 54, (A) illustrates the input/output characteristic in the X-axis direction of the SMZM 4, (B) illustrates the voltage in the X-axis direction, and (C) illustrates an output optical signal. In FIG. 55, (A) illustrates the voltage in the X-axis direction. The waveform of the low frequency signal generated by the low frequency modulator 66 is substantially the same as the waveform indicated by (A) in FIG. 55. (B) illustrates optical output power, (C) illustrates a peak side waveform signal, (D) illustrates the phase signal of the peak side waveform signal obtained by the phase comparator 68, (E) illustrates the peak side phase information obtained by the integrator 72, and (F) illustrates an output signal of the X-axis direction bias calculator 80. (G) and (H) illustrate the bias voltages V1bias and V2bias.

When the X-axis direction bias voltage is optimum, the waveform of the output optical signal has the fold-back on both the peak side and bottom side. Thus the peak side waveform of an optical signal alternately indicates the in-phase section and the reversed-phase section with respect to the low frequency signal as indicated by (C) in FIG. 55. In this case, the phase signal obtained by the phase comparator 68 alternately repeats "1" and "0" as indicated by (D) in FIG. 55. The integrator 72 integrates (that is, average) the phase signal, and subtracts "0.5" from the averaged value. Therefore, in this case, the integrator 72 outputs "zero" as indicated by (E) in FIG. 55.

In the sixth embodiment, when the output of the integrator 72 is zero, the X-axis direction bias calculator 80 does not change the output voltage. In this case, the bias voltages V1bias and V2bias are not changed.

Figure 56:
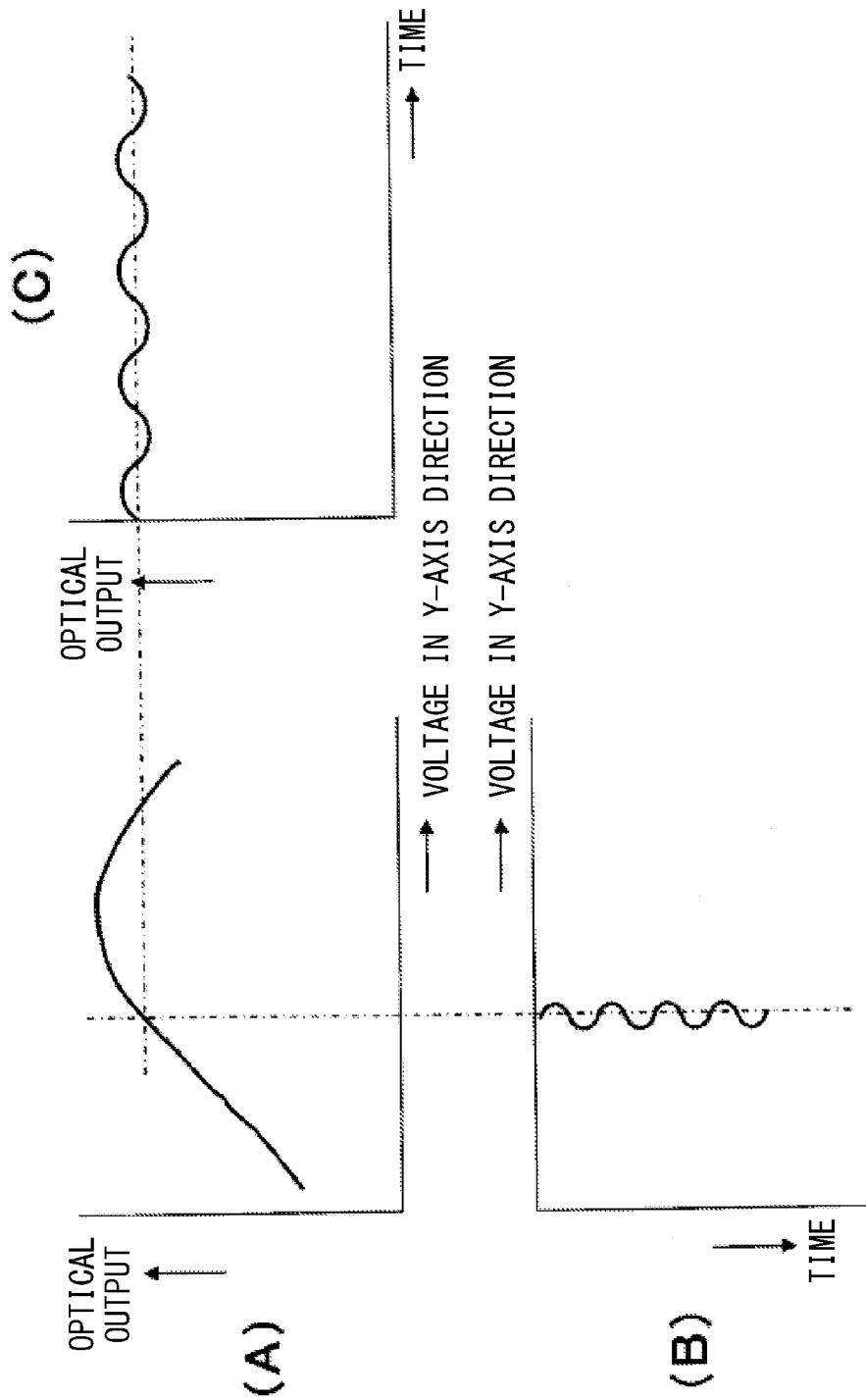

(2) When the X-Axis Direction Bias Voltage is Low (FIGS. 56-57)

FIG. 56 and FIG. 57 illustrate the state in which the X-axis direction bias voltage is lower than the optimum value. (A) through (C) in FIG. 56 respectively correspond to (A) through (C) in FIG. 54. (A) through (H) in FIG. 57 respectively correspond to (A) through (H) in FIG. 55.

When the X-axis direction bias voltage is lower than the optimum value, the phase of the peak side waveform signal of an output optical signal indicates the in-phase with respect to the low frequency signal as indicated by (C) in FIG. 57. In this case, the phase signal obtained by the phase comparator 68 is continuously "0" as indicated by (D) in FIG. 57. Therefore, the integrator 72 outputs a negative value as indicated by (E) in FIG. 57.

In the sixth embodiment, when the integrator 72 outputs a negative value, the X-axis direction bias calculator 80 changes the output voltage so that the X-axis direction bias voltage is increased. In this case, both of the bias voltages V1bias and V2bias are increased by ΔV.

Figure 58:
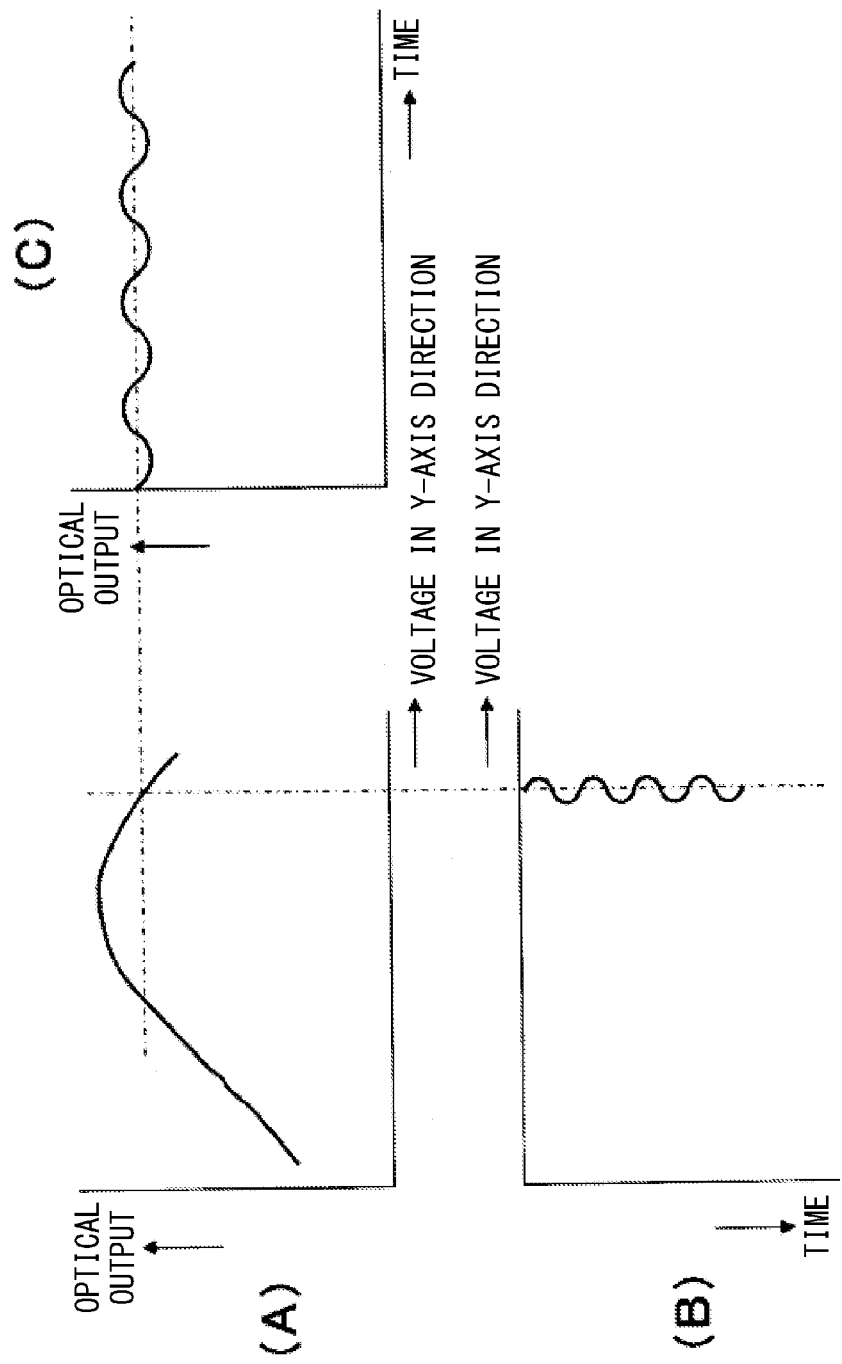
FIGS. 58-59 illustrate the case in which the bias voltage in the X-axis direction is higher than the optimum value.
Figure 59:
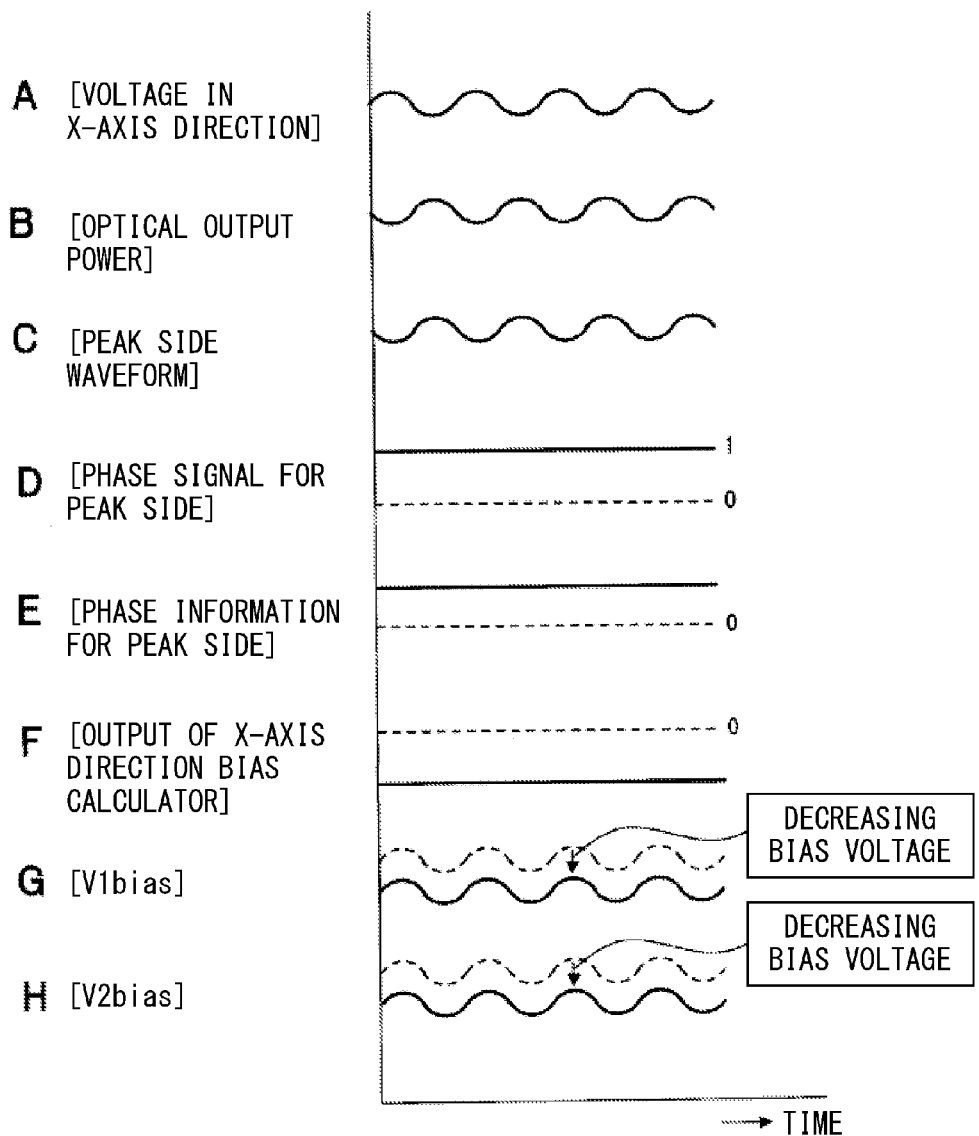

(3) When the X-Axis Direction Bias Voltage is High (FIGS. 58-59)

FIG. 58 and FIG. 59 illustrate the state in which the X-axis direction bias voltage is higher than the optimum value. (A) through (C) in FIG. 58 respectively correspond to (A) through (C) in FIG. 54. (A) through (H) in FIG. 59 respectively correspond to (A) through (H) in FIG. 55.

When the X-axis direction bias voltage is higher than the optimum value, the phase of the peak side waveform signal of an output optical signal indicates the reversed-phase with respect to the low frequency signal as indicated by (C) in FIG. 59. In this case, the phase signal obtained by the phase comparator 68 is continuously "1" as indicated by (D) in FIG. 59. Therefore, the integrator 72 outputs a positive value as indicated by (E) in FIG. 59.

In the sixth embodiment, when the integrator 72 outputs a positive value, the X-axis direction bias calculator 80 changes the output voltage so that the X-axis direction bias voltage is decreased. In this case, both of the bias voltages V1bias and V2bias are decreased by ΔV.

In the embodiment illustrated in FIG. 51, the X-axis direction bias calculator 80 controls the X-axis direction bias using the bottom side waveform, but the present invention is not limited to this configuration. That is, the X-axis direction bias calculator 80 may control the X-axis direction bias using the peak side waveform and the bottom side waveform.

Seventh Embodiment

Figure 60:
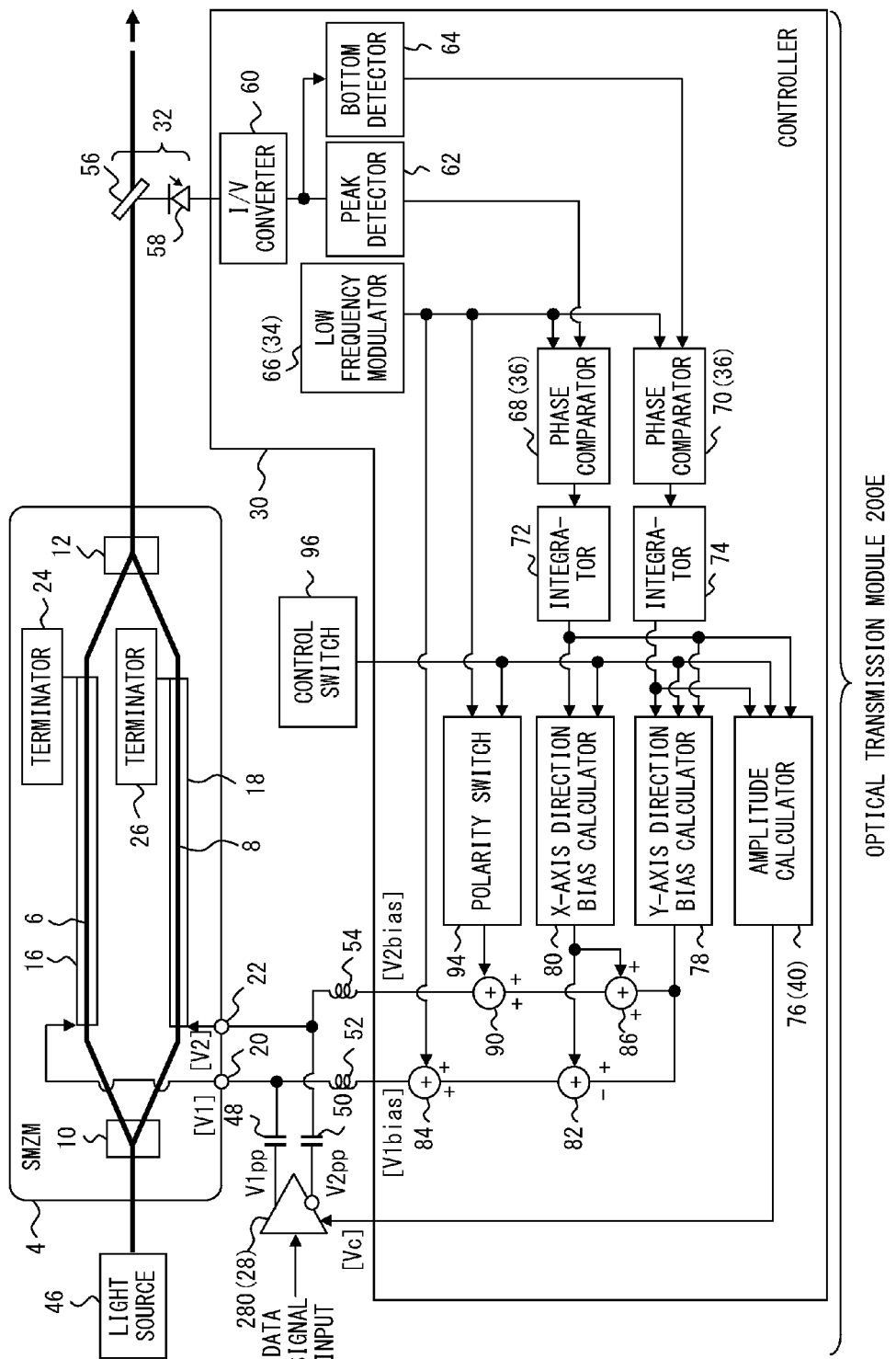
FIG. 60 illustrates an example of an optical transmission module according to the seventh embodiment.

The seventh embodiment is described below with reference to FIG. 60. FIG. 60 illustrates an example of an optical transmission module according to the seventh embodiment.

In the seventh embodiment, the Y-axis direction control (control of the Y-axis direction bias voltage, control of the modulation amplitude) and the X-axis direction control (control of the X-axis direction bias voltage) are performed with different timings. According to this configuration, there occurs no interference between the Y-axis direction control and the X-axis direction control. That is, operation state of the optical modulator and/or the optical transmission module is accurately controlled.

An optical transmission module 200E according to the seventh embodiment includes a polarity switch 94 and a control switch 96 in addition to the amplitude calculator 76, the Y-axis direction bias calculator 78, and the X-axis direction bias calculator 80. The operations of the amplitude calculator 76, the Y-axis direction bias calculator 78, and the X-axis direction bias calculator 80 are switched by the control switch 96. The polarity switch 94 outputs an in-phase low frequency signal or a reversed-phase low frequency signal at an instruction of the control switch 96. The reversed-phase low frequency signal is generated by inverting the output signal of the low frequency modulator 66. The in-phase low frequency signal is generated by not inverting the output signal of the low frequency modulator 66. The control switch 96 performs, for example, the Y-axis direction control and the X-axis direction control in the time division scheme.

The polarity switch 94 is provided between the low frequency modulator 66 and the adder 90. Therefore, at an instruction of the control switch 96, the in-phase low frequency signal or the reversed-phase low frequency signal is superimposed on the bias voltage V2bias. When the polarity switch 94 outputs the reversed-phase low frequency signal, the low frequency signal is superimposed only in the Y-axis direction of the bias voltage, and substantially the same Y-axis direction control as in the optical transmission module 200B illustrated in FIG. 15 is realized. On the other hand, when the polarity switch 94 outputs the in-phase low frequency signal, the low frequency signal is superimposed only in the X-axis direction of the bias voltage, and substantially the same X-axis direction control as in the optical transmission module 200D illustrated in FIG. 51 is realized.

Figure 65:
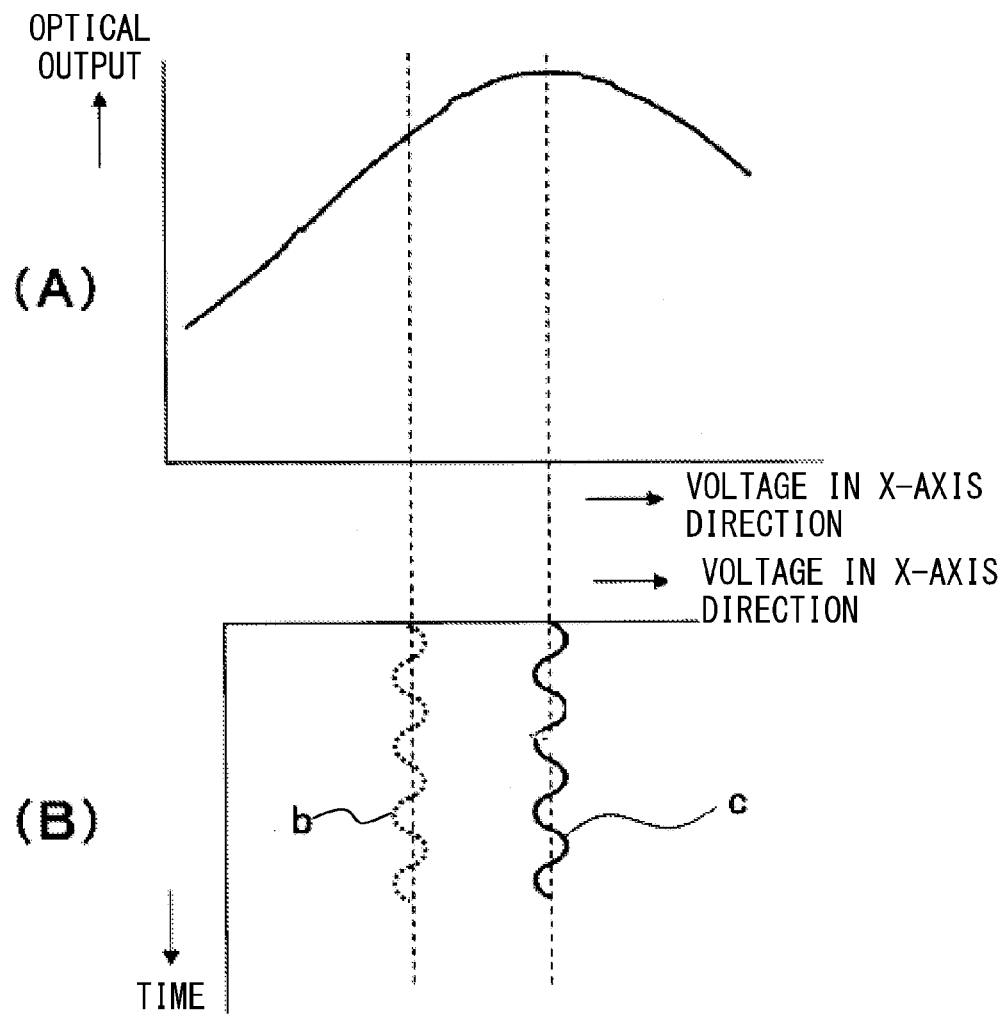

The optimization of the bias voltages V1bias and V2bias and the modulation amplitude according to the seventh embodiment is described below with reference to FIG. 61 through FIG. 66. FIG. 61 through FIG. 66 illustrate the operation characteristic of the SMZM 4. In FIGS. 62-64 and 66, (B) illustrates a voltage in the Y-axis direction. (B) in FIG. 65 illustrates a voltage in the X-axis direction.

Figure 61:
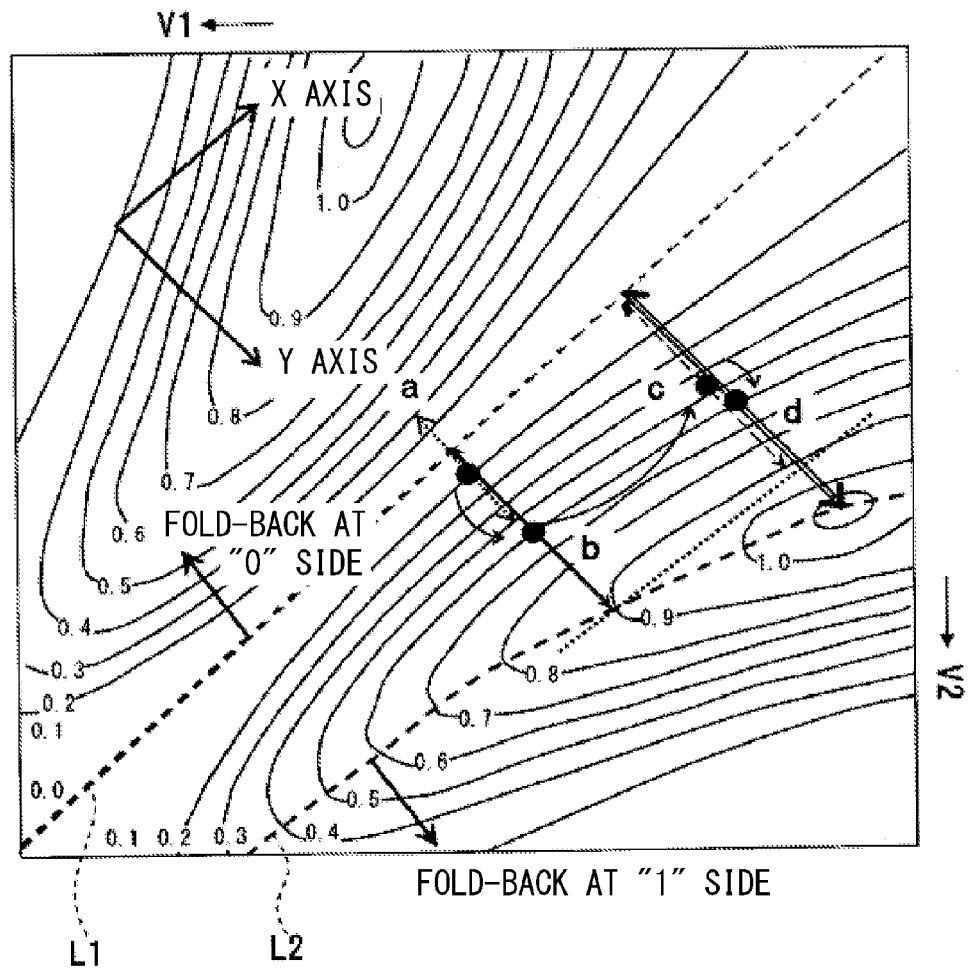

Described below is the procedure of optimizing the X-axis direction bias voltage, the Y-axis direction bias voltage, and the modulation amplitude. Described below is the control from the state a to the state d. In the state a, the X-axis direction bias voltage, the Y-axis direction bias voltage, and the modulation amplitude deviate from the respective optimum values. The state d indicates a preferable operating state. In FIG. 61, each operation state a-d is represented by an arrow. One tip of the arrow indicates "0", and the other tip of the arrow indicates "1".

First, the Y-axis direction control (control of the Y-axis direction bias voltage and the modulation amplitude) is performed. In this case, the control switch 96 enables the Y-axis direction bias calculator 78 and the amplitude calculator 76, and disables the X-axis direction bias calculator 80. The control switch 96 makes the polarity switch 94 operate. By so doing, the polarity switch 94 inverts the polarity of the low frequency signal generated by the low frequency modulator 66. As a result, the reversed-phase low frequency signal is superimposed on the voltage V2bias.

Figure 62:
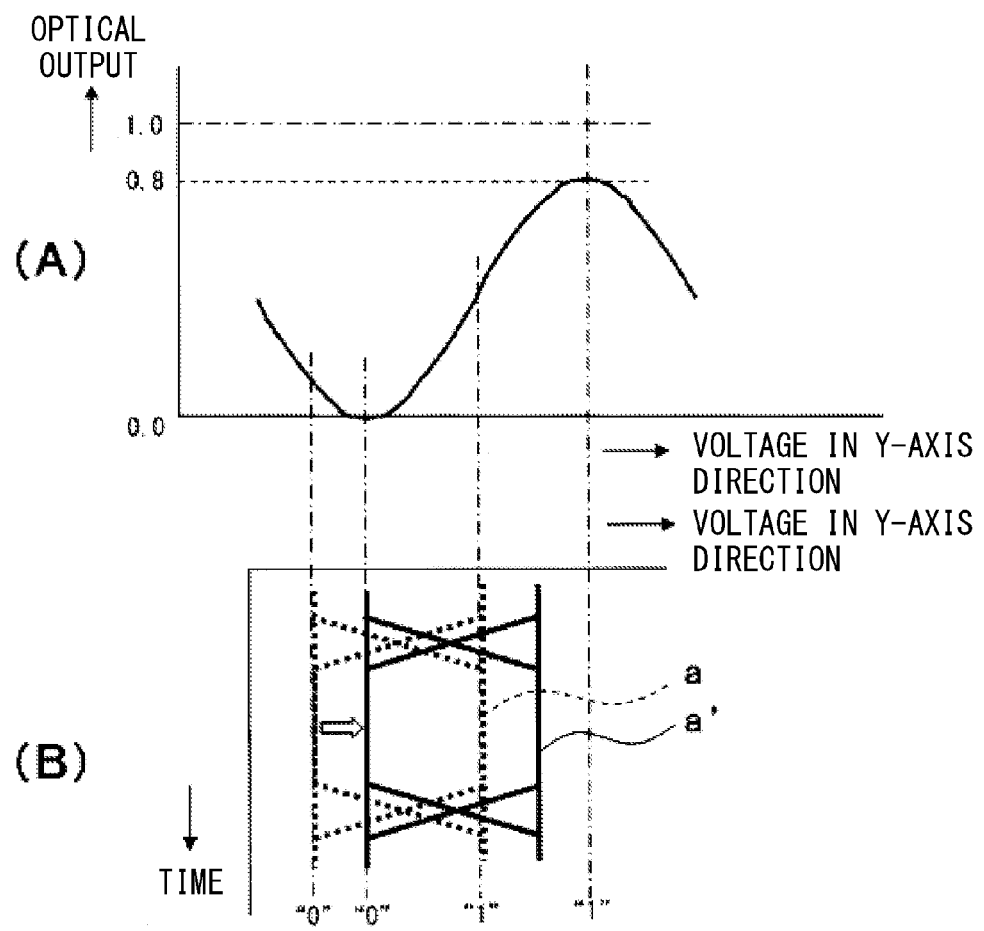

In FIG. 61 and FIG. 62, the state a corresponds to the "case in which the Y-axis direction bias voltage is low", as illustrated in, for example, FIG. 27. In this case, the controller 30 increases the bias voltage in the Y-axis direction. As a result, the state a' illustrated in FIG. 62 is obtained. In the state a', the modulation signal "0" is set as the bottom voltage Vb. That is to say, one tip of the arrow in FIG. 61 is located on the broken line L1 that indicates the fold-back boundary line of the bottom side.

The state a' corresponds to the "case in which the modulation amplitude is small". Therefore, the controller 30 increases the modulation amplitude. Thus, the state a'' illustrated in FIG. 63 is obtained. However, when the modulation amplitude is increased while fixing the bias voltage, the modulation signal "0" is shifted from the bottom voltage Vb. That is, in this example, the "case in which the Y-axis direction bias voltage is low" occurs again by adjusting the modulation amplitude. Therefore, the controller 30 alternately performs the control of optimizing the modulation amplitude and the control of optimizing the Y-axis direction bias voltage. As a result, the Y-axis direction control converges, and the state b illustrated in FIG. 64 is obtained. In the state b, the modulation signal "0" is controlled to be the bottom voltage Vb, and the modulation signal "1" is controlled to be the peak voltage Vp.

Then, the X-axis direction bias voltage is controlled. In this case, the control switch 96 enables the X-axis direction bias calculator 80, and disables the Y-axis direction bias calculator 78 and the amplitude calculator 76. In addition, the polarity switch 94 is controlled so that it does not perform the inverting operation. As a result, the in-phase low frequency signal is superimposed on the bias voltage V2bias.

The state b corresponds to the "case in which the X-axis direction bias voltage is low" as illustrated in FIG. 64 or 65. Therefore, the controller 30 increases the bias voltage in the X-axis direction. As a result, the state c illustrated in FIG. 65 is obtained.

By the control above, the X-axis direction bias voltage is optimized. However, in the process of controlling the X-axis direction bias voltage, the Y-axis direction bias voltage and/or the modulation amplitude may deviate from the optimum values. Therefore, in the seventh embodiment, after the control of the X-axis direction bias voltage becomes stable, the Y-axis direction control is performed as necessary. Afterwards, the X-axis direction control and the Y-axis direction control are alternately performed until both states in the X-axis direction and the Y-axis direction become stable. As a result, the X-axis direction bias voltage, the Y-axis direction bias voltage and the modulation amplitude are all optimized, and the state d illustrated in FIG. 66 is obtained.

As described above, by alternately performing the Y-axis direction control and the X-axis direction control, the X-axis direction bias voltage, the Y-axis direction bias voltage, and the modulation amplitude are optimized or approximately optimized. Therefore, a stable modulated optical signal is constantly generated.

Eighth Embodiment

Figure 67:
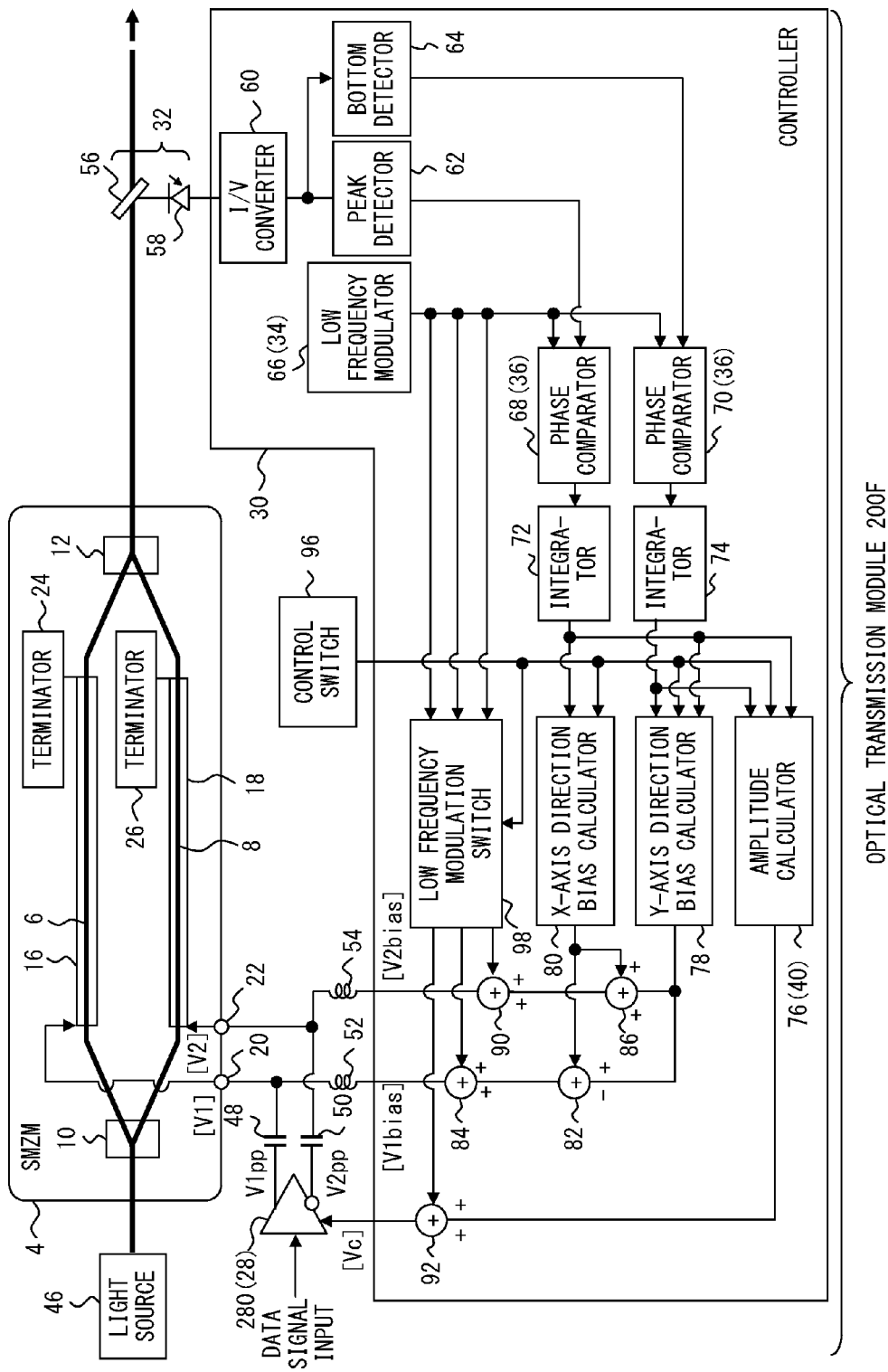
FIG. 67 illustrates an example of an optical transmission module according to the eighth embodiment.

The eighth embodiment is described below with reference to FIG. 67. FIG. 67 illustrates an example of the optical transmission module according to the eighth embodiment.

In the second, third, fourth, sixth, and seventh embodiments (refer to FIGS. 3, 13, 15, 51, and 60), the bias voltages in the X-axis direction and the Y-axis direction and the modulation amplitude are controlled by modulating the bias voltage by a low frequency signal. In the eighth embodiment, as in the fifth embodiment illustrated in FIG. 33, the control is similarly performed as in the second through seventh embodiments by dithering the modulation amplitude using the low frequency signal.

An optical transmission module 200F according to the eighth embodiment includes the control switch 96 and a low frequency modulation switch 98 as illustrated in FIG. 67. The control switch 96 controls the operations of the X-axis direction bias calculator 80, the Y-axis direction bias calculator 78, the amplitude calculator 76, and the low frequency modulation switch 98.

When the Y-axis direction control is performed, for example, the low frequency modulation switch 98 guides the low frequency signal to the adder 92. The X-axis direction bias calculator 80 is disabled, and the Y-axis direction bias calculator 78 and the amplitude calculator 76 perform the controlling operation. That is, the controlling operation of the optical transmission module 200C illustrated in FIG. 33 is realized.

When the X-axis direction control is performed, the low frequency modulation switch 98 guides the low frequency signal to the adders 84 and 90. The X-axis direction bias calculator 80 performs the controlling operation, and the Y-axis direction bias calculator 78 and the amplitude calculator 76 are disabled. That is, the controlling operation of the optical transmission module 200D illustrated in FIG. 51 is realized.

Ninth Embodiment

The ninth embodiment is described below with reference to FIG. 68. FIG. 68 illustrates an example of the optical transmission module according to the ninth embodiment.

In an optical transmission module 200G according to the ninth embodiment, a first band pass filter (BPF) 100 is provided at the output side of the peak detector 62, and a second band pass filter (BPF) 102 is provided at the output side of the bottom detector 64. The BPF 100 extracts a specific frequency component from the output signal of the peak detector 62, and the BPF 102 extracts a specific frequency component from the output signal of the bottom detector 64. The peak side waveform signal which has passed the BPF 100 is guided to an amplitude controller 104, a Y-axis direction bias controller 106, and an X-axis direction bias controller 108. The bottom side waveform signal which has passed the BPF 102 is guided to the amplitude controller 104 and the Y-axis direction bias controller 106.

The amplitude controller 104 corresponds to the amplitude calculator 76, and includes a phase comparator 110 and an integrator 112. The phase comparator 110 compares the phase of the low frequency signal with those of the peak side waveform signal and the bottom side waveform signal. The integrator 112 integrates the comparison result of the phase comparator 110. The output signal of the amplitude controller 104 is guided to a modulation controller 114. The modulation controller 114 controls the amplitude of the output signal of the modulator 280 according to the output signal of the amplitude controller 104.

The Y-axis direction bias controller 106 includes the phase comparator 68 and the integrator 72. The phase comparator 68 compares the phase of the low frequency signal with those of the peak side waveform signal and the bottom side waveform signal. The integrator 72 integrates the comparison result of the phase comparator 68. Then, the output signal and the inverted output signal of the integrator 72 are guided to the adders 82 and 86, respectively.

The X-axis direction bias controller 108 includes the phase comparator 70 and the integrator 74. The phase comparator 70 compares the phase of the low frequency signal with the phase of the peak side waveform signal. The integrator 74 integrates the comparison result of the phase comparator 70. Then, the output signal of the X-axis direction bias controller 108 is guided to the adders 82 and 86.

The bias voltage generator 38 according to the ninth embodiment includes a bias controller 116 for generating the bias voltage V1bias, and a bias controller 118 for generating the bias voltage V2bias. The bias controller 116 is provided with an output signal of the adder 82 and the low frequency signal generated by the low frequency modulator 66, and obtains the bias voltage V1bias modulated by the low frequency signal. The bias controller 118 generates the bias voltage V2bias according to the output signal of the adder 86.

Figure 69:
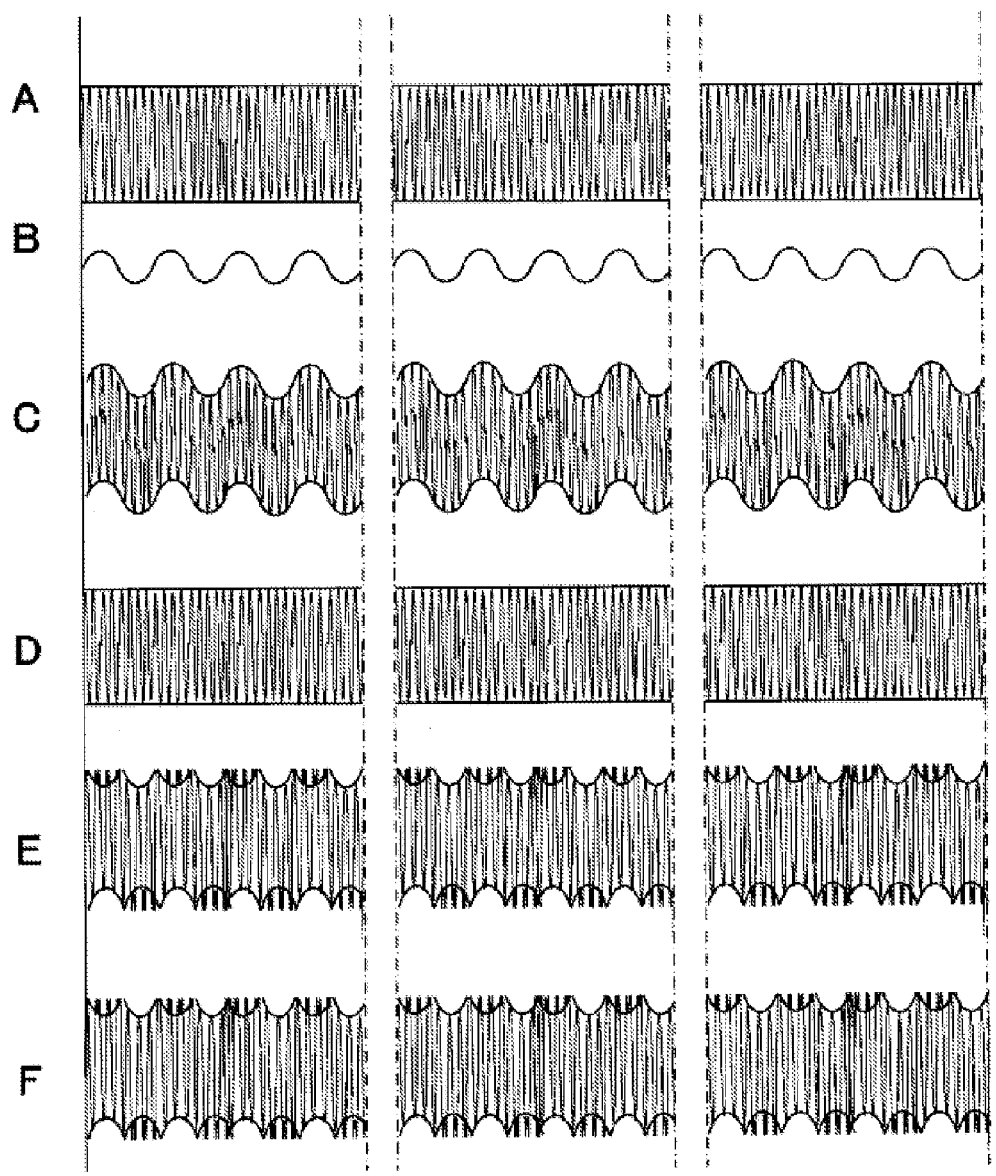
FIGS. 69-70 illustrate waveforms of respective points.
Figure 70:
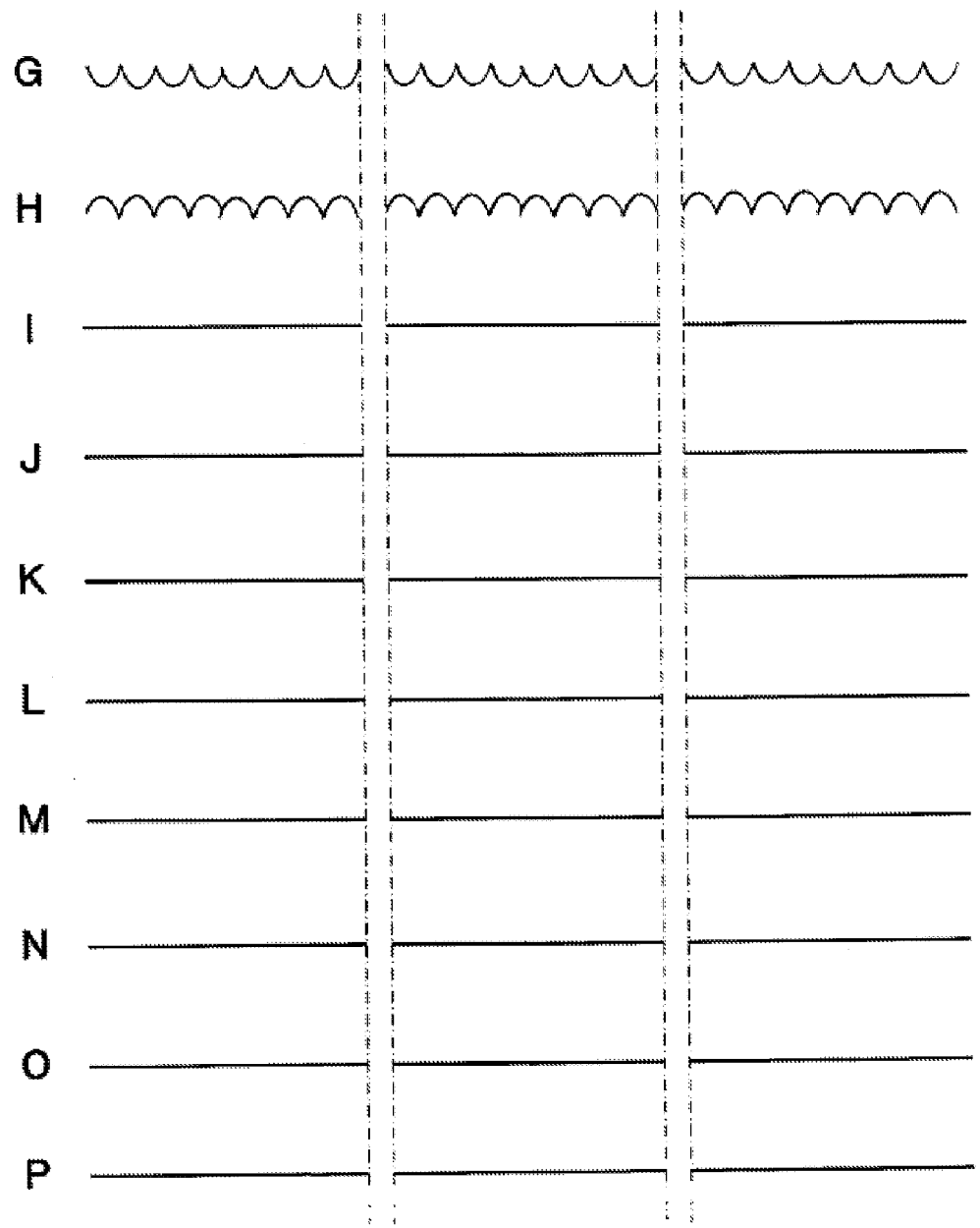

The operation of the optical transmission module 200G according to the ninth embodiment illustrated in FIG. 68 is described below with reference to FIG. 69 and FIG. 70. In FIG. 69, (A) illustrates an input data signal, (B) illustrates the low frequency signal, (C) illustrates an input voltage V1, (D) illustrates an input voltage V2, (E) illustrates an output optical waveform, and (F) illustrates an output signal of the I/V converter 60. In FIG. 70, (G) and (H) illustrate bottom side waveform signal and peak side waveform signal, respectively, (I) and (J) illustrate output signals of the BPF 102 and 100, respectively, (K) (L) (M) illustrate output signals of the phase comparators 70, 68, 110 respectively, (N) (O) (P) illustrate output signals of the integrators 74, 72, 112, respectively.

Figure 71:
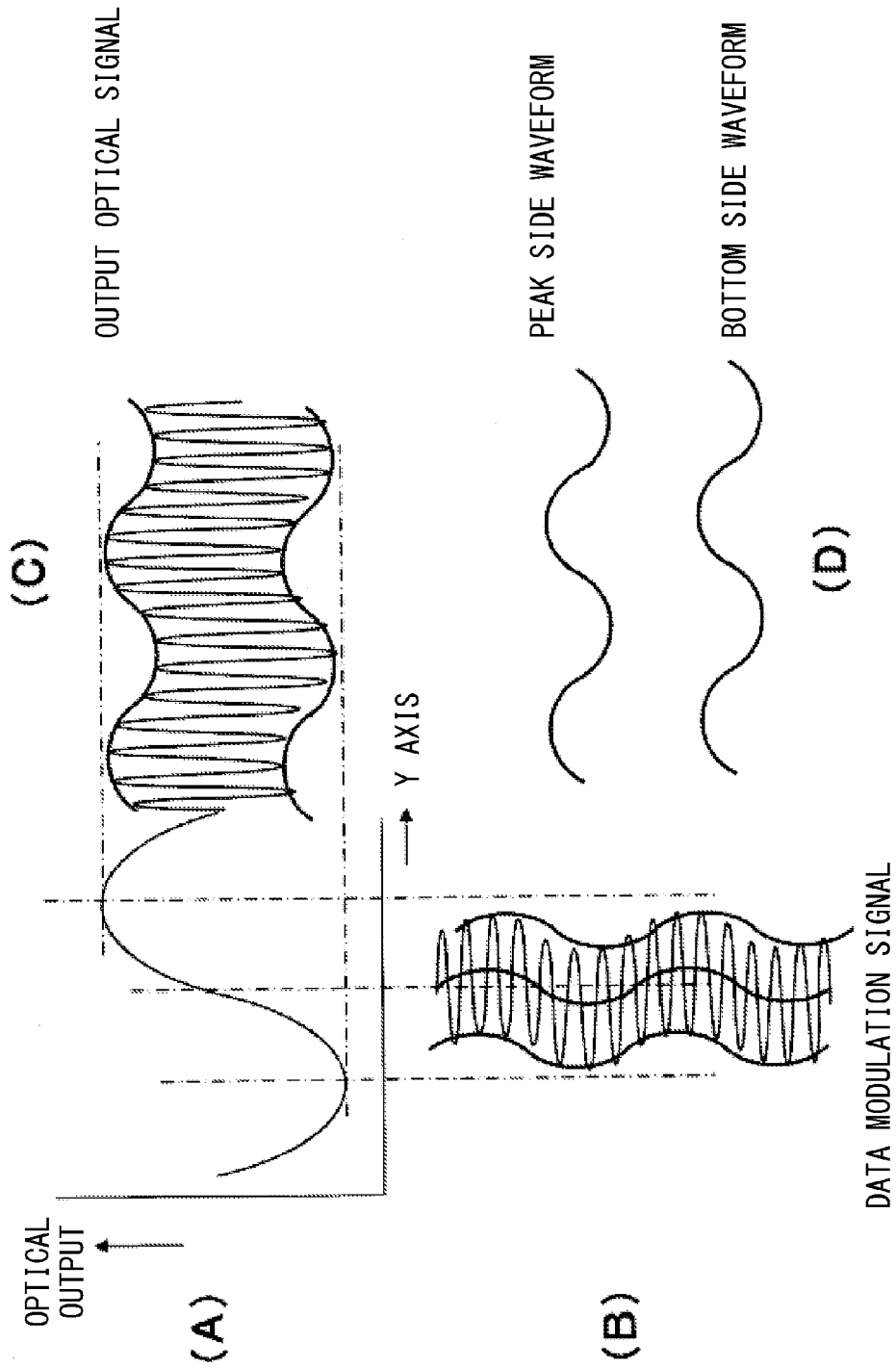
FIG. 71 illustrates the characteristic when the modulation amplitude is small.

FIG. 71 illustrates the operating state when the modulation amplitude is smaller than the optimum value. (A) illustrates the operation characteristic of the SMZM, (B) illustrates a data modulation signal, (C) illustrates an output optical signal, and (D) illustrates a peak side waveform signal and a bottom side waveform signal extracted from the output optical signal. In this case, the phases of the peak side waveform signal and the bottom side waveform signal are identical.

Figure 72:
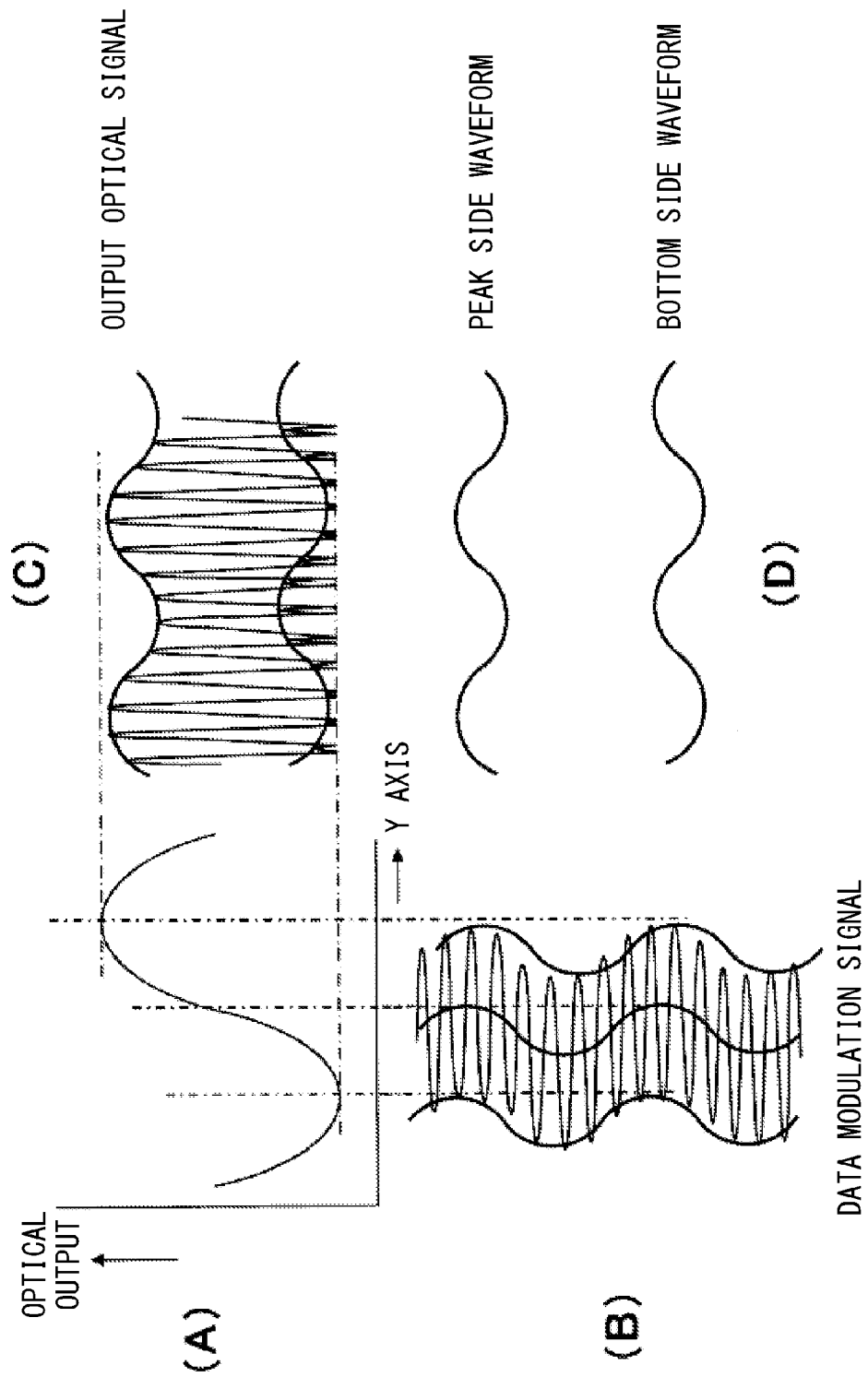
FIG. 72 illustrates the characteristic of the case in which the bias voltage in the Y-axis direction is low.

FIG. 72 illustrates the operating state in which the bias voltage is lower than the optimum value in the Y-axis direction. (A) through (D) in FIG. 72 respectively correspond to (A) through (D) in FIG. 71. In this case, as illustrated by (C), the waveform on the bottom side of the output optical signal is disturbed. In addition, the phases of the peak side waveform signal and the bottom side waveform signal respectively indicate the in-phase and the reversed-phase as illustrated by (D).

Figure 73:
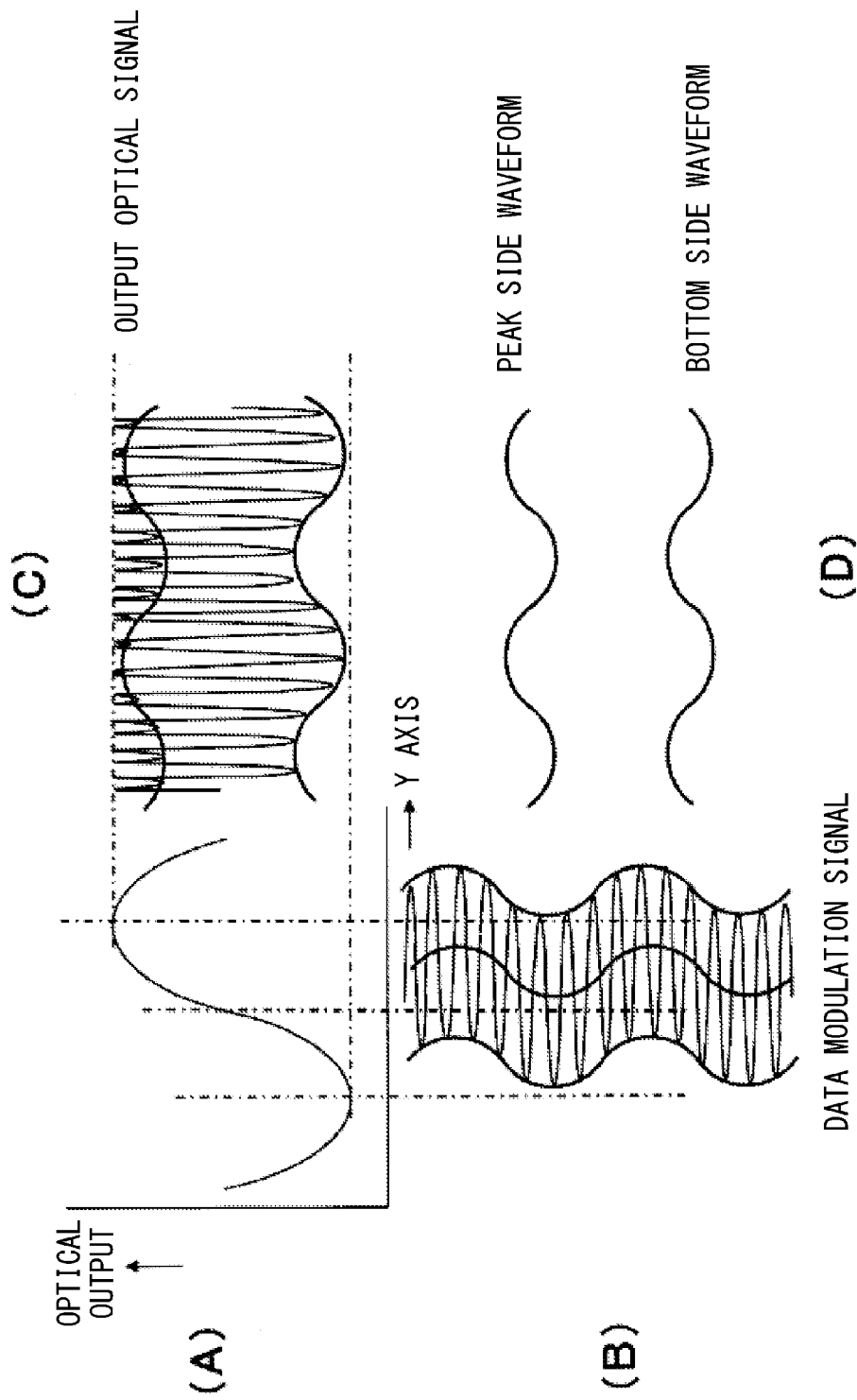
FIG. 73 illustrates the characteristic of the case in which the bias voltage in the Y-axis direction is high.

FIG. 73 illustrates the operating state in which the bias voltage is higher than the optimum value in the Y-axis direction. (A) through (D) in FIG. 73 respectively correspond to (A) through (D) in FIG. 71. In this case, as illustrated by (C), the waveform on the peak side of the output optical signal is disturbed. In addition, the phases of the peak side waveform signal and the bottom side waveform signal respectively indicate the reversed-phase and the in-phase as illustrated by (D).

Tenth Embodiment

Figure 74:
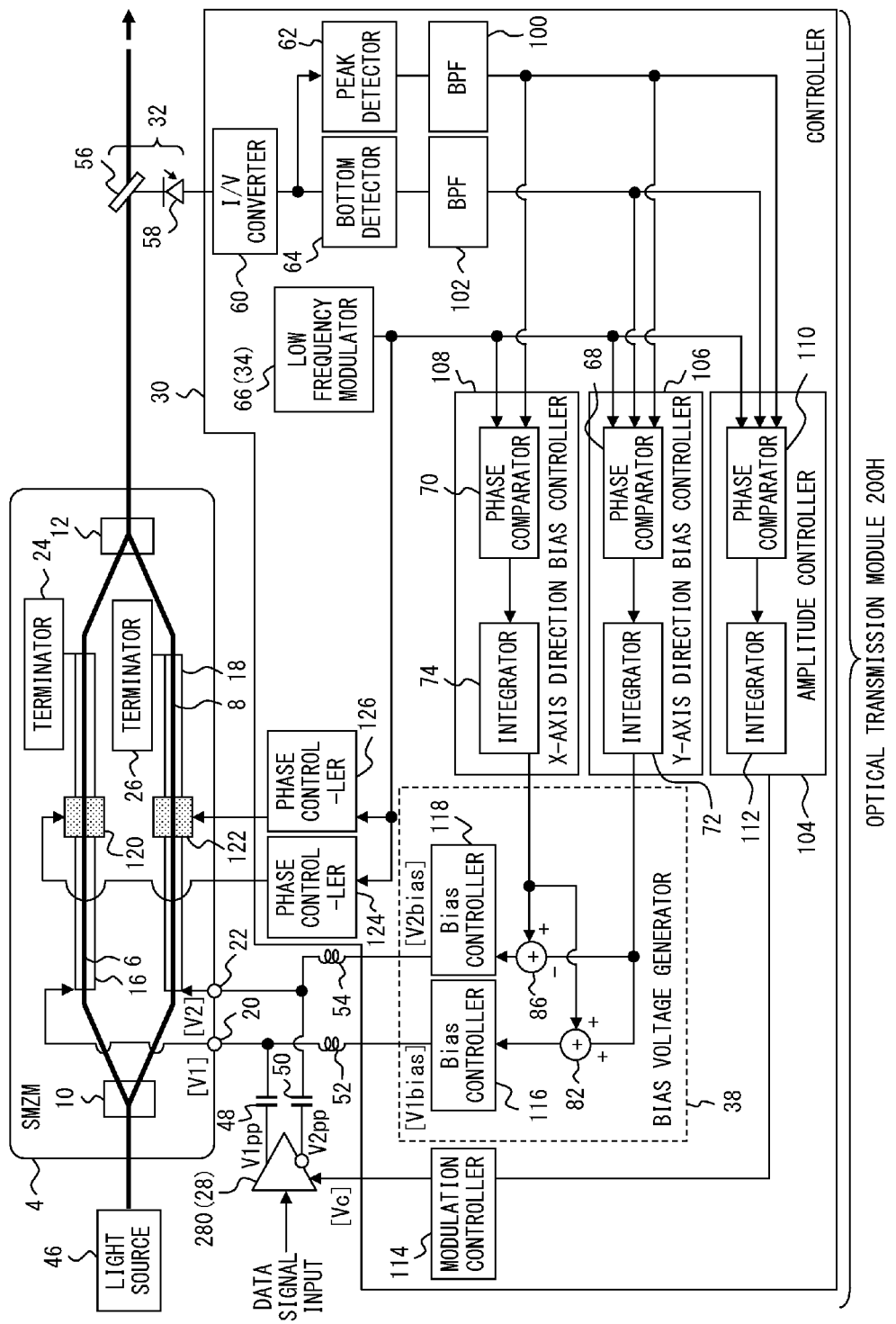
FIG. 74 illustrates an example of an optical transmission module according to the tenth embodiment.

The tenth embodiment is described below with reference to FIG. 74. FIG. 74 illustrates an example of the optical transmission module according to the tenth embodiment. In FIG. 74, similar element also illustrated in FIG. 68 is assigned the same reference numeral.

In an optical transmission module 200H according to the tenth embodiment, as illustrated in FIG. 74, the signal electrode 16 and a phase control electrode 120 are provided for the optical waveguide 6, and the signal electrode 18 and a phase control electrode 122 are provided for the optical waveguide 8.

The phase control electrodes 120 and 122 are provided with phase controllers 124 and 126, respectively. The phase controllers 124 and 126 apply the low frequency signal generated by the low frequency modulator 66 to the phase control electrodes 120 and 122, respectively. According to this configuration, the transmission light through the optical waveguides 6 and 8 is modulated by the low frequency signal.

The bias controller 116 generates the bias voltage V1bias from the output signal of the adder 82. The bias controller 118 generates the bias voltage V2bias from the output signal of the adder 86. That is, the bias voltages V1bias and V2bias are not modulated by the low frequency signal. Since other configurations are substantially the same as in the ninth embodiment, the detailed explanation is omitted here. According to the configuration above, a similar effect can be obtained by a similar controlling operation as in the embodiments described above.

Eleventh Embodiment

Figure 75:
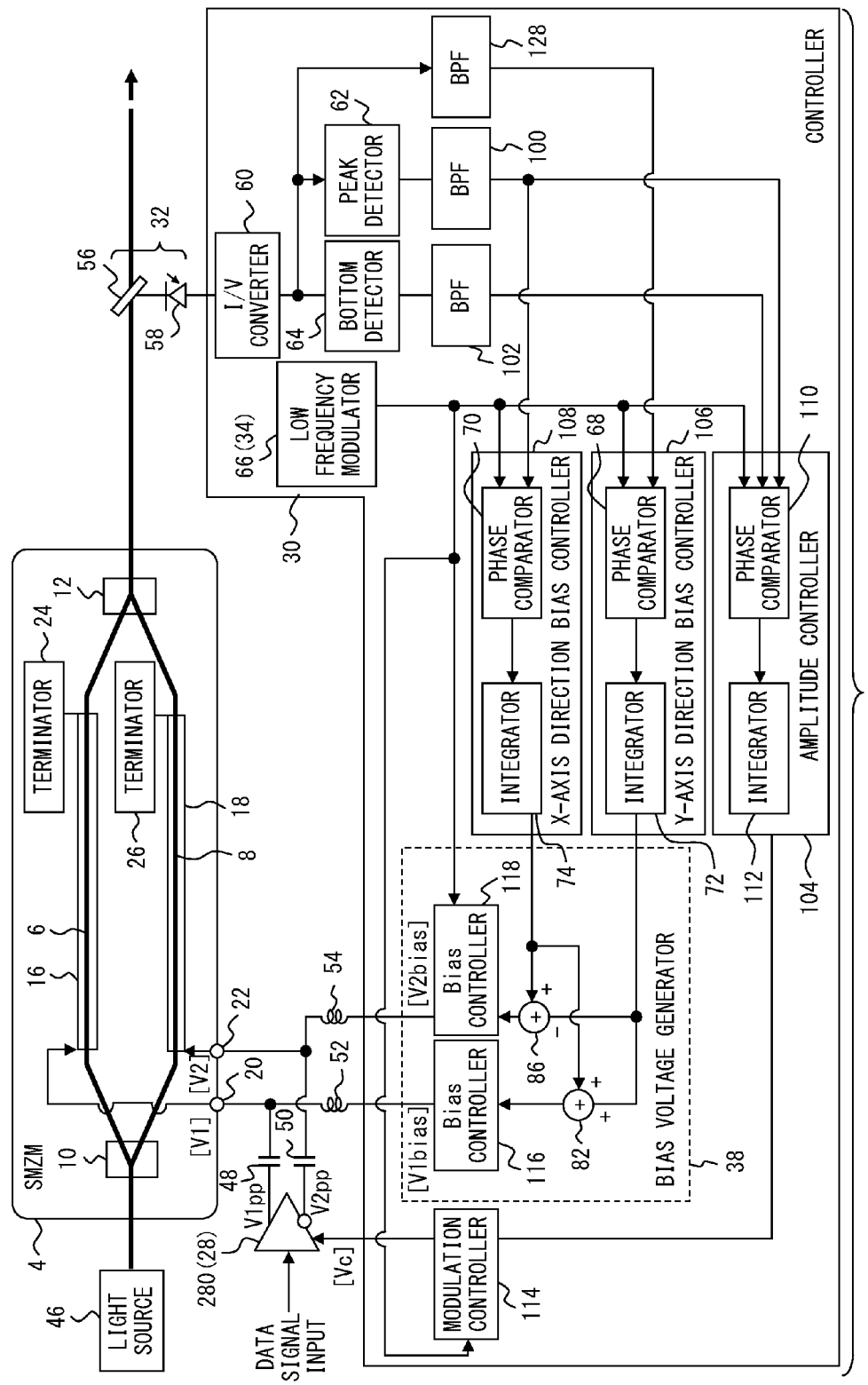
FIG. 75 illustrates an example of an optical transmission module according to the eleventh embodiment.

The eleventh embodiment is described below with reference to FIG. 75. FIG. 75 illustrates an example of an optical transmission module according to the eleventh embodiment. In FIG. 75, similar element illustrated also in FIG. 68 is assigned the same reference numeral.

In an optical transmission module 200I according to the eleventh embodiment, a third BPF 128 is provided at the output side of the I/V converter 60. The BPF 128 extracts a specific frequency component (for example, the frequency component of the low frequency signal) from the output signal of the I/V converter 60. The transmission signal of the BPF 128 is guided to the Y-axis direction bias controller 106. In the eleventh embodiment, the phase comparator 68 of the Y-axis direction bias controller 106 compares the phase of the output signal of the BPF 128 with the phase of the low frequency signal. The integrator 74 integrates the comparison result of the comparator 68. Then, the output signal and the inverted output signal of the Y-axis direction bias controller 106 are guided to the adders 82 and 86, respectively. The configuration and the operation of the X-axis direction bias controller 108 are substantially the same as those according to the tenth embodiment.

A low frequency signal generated by the low frequency modulator 66 is provided for the modulation controller 114 and the bias controller 118. As necessary, the modulation amplitude of the data signal is dithered by the low frequency signal, and the bias voltage V2bias is modulated by the low frequency signal. According to the configuration above, a similar effect can be obtained by a similar controlling operation as in the embodiments described above.

According to the optical modulator, the optical transmitter, and the optical modulation control method of the first through eleventh embodiments, one or more of the following effects can be obtained.

(1) The bias voltage and/or the modulation amplitude is controlled depending on the optical output. Therefore, the influence of the characteristic fluctuation of the optical modulator and the circuit error appearing in the optical output can be avoided, and the modulation amplitude and/or the bias voltage can be approached to the optimum or approximately optimum value.

(2) It is not necessary to adjust the bias voltage and/or the modulation amplitude in advance.

(3) The influence of the temperature, the aging, etc. on the optical modulator and/or the peripheral circuits can be avoided, thereby preventing the degradation of the waveform of an output optical signal.

Other Embodiments (1) In the embodiments above, the optical modulator is an SMZM, but the optical modulator, the optical transmitter, and the control method according to the present application are not limited to the configuration using an SMZM. Any other configurations are applicable so far as the optical modulator uses a bias voltage and a data modulation signal.

(2) In the embodiments above, a bias voltage and a modulation signal are applied to one electrode, but a modulation signal electrode and a bias electrode may be separately provided for each optical waveguide.

(3) In the embodiments above, an electrode is provided for both of a pair of optical waveguides of a Mach-Zehnder optical modulator, but the present application is not limited to this configuration. That is, the optical modulator according to the present application may be configured to have an electrode for only one of a pair of optical waveguides. In this case, the modulation signal generator 9 generates a modulation signal from an input data signal. Then, the generated modulation signal is applied to the electrode.

Comparison Example

Figure 76:
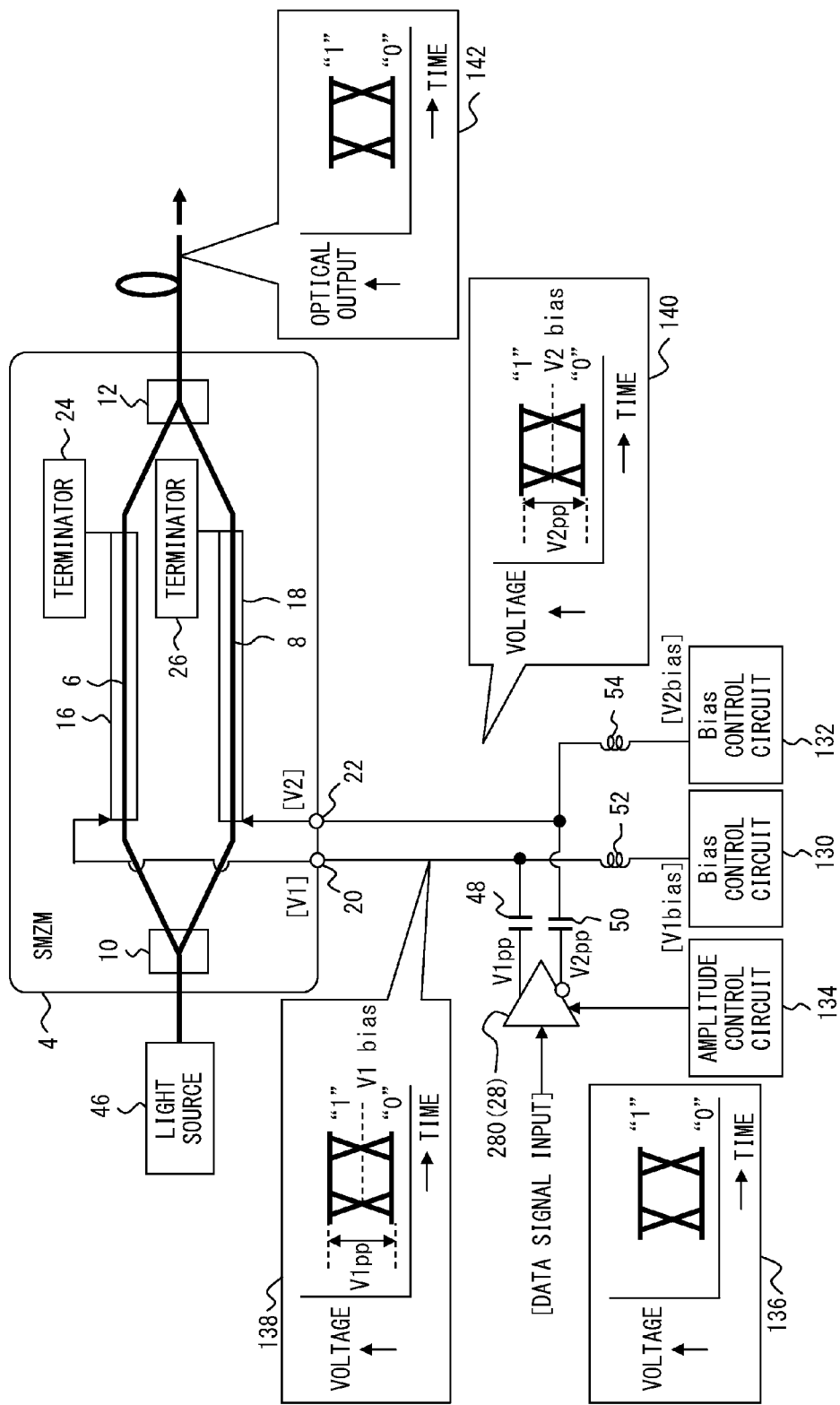
FIG. 76 illustrates an example of compared configuration.

A comparison example is described below with reference to FIG. 76. FIG. 76 illustrates an SMZM and its peripheral circuits. In the comparison example, the SMZM 4 is used. Therefore, the explanation of the configuration and the operation of the SMZM 4 is omitted here.

An output signal of the modulator 280 is applied to the input terminals 20 and 22 of the SMZM 4. A bias voltage generated by bias control circuits 130 and 132 is applied to the input terminals 20 and 22, respectively. The reference numerals 136, 138 140 and 142 respectively illustrate an input data signal, input voltages V1 and V2, and an output optical signal.

The SMZM 4 outputs an optical signal acquired by combining the transmission light beams of the optical waveguides 6 and 8. Therefore, the output optical signal depends on the phases of the transmission light beams of the optical waveguides 6 and 8. For example, when the phases of a pair of light beams are identical to each other, the output optical power is maximum, but when the phases of a pair of light beams are inverted with respect to each other, then the output optical power is minimum.

The refractive indices of the optical waveguides 6 and 8 are controlled by the input voltages V1 and V2, respectively. That is, the phase of the light passing through the optical waveguides 6 and 8 is controlled depending on the input voltages V1 and V2, respectively. Therefore, by appropriately controlling the input voltages V1 and V2, the optical intensity modulation is realized.

In the configuration illustrated in FIG. 76, it may be possible to search for the optimum modulation amplitude and optimum bias voltage in advance for each modulation device and for corresponding wavelength of carrier light and apply them to the SMZM 4. However, there are the following problems if the determined modulation amplitude and bias voltage are fixedly applied to the SMZM 4.

The SMZM 4 may have different static characteristic for each device. In addition, the optical output of the SMZM 4 fluctuates depending on the input wavelength of the carrier light generated by the light source 46. To prevent the fluctuation, it is necessary to adjust the modulation amplitude (V1$pp$, V2$pp$) and the bias voltage (V1bias, V2bias) at the optimum points for each device and for each wavelength of carrier light. However, it requires an enormously long time to find the optimum points.

The optimum points of the modulation amplitude and the bias voltage depends on various factors. For example, The static characteristic of the SMZM changes by a temperature or aging. In addition, due to the errors generated by the bias control circuits 130 and 132, the modulator 280, and an amplitude control circuit 134, the modulation amplitude and/or the bias voltage may fluctuate. Due to all these factors, the modulation amplitude and/or the bias voltage may deviate from the optimum points. As a result, the fold-back of waveforms, degradation of the extinction ratio, the cross-point fluctuation, the reduction in the aperture of an optical waveform, etc. occur, thereby degrading the optical waveform. Examples of degrading an optical waveform are described below with reference to FIGS. 77-81. In FIGS. 77-81, (A) illustrates input/output characteristics of the SMZM4, (B) illustrates input modulation signal, and (C) illustrates output optical signal.

Example 1

Figure 77:
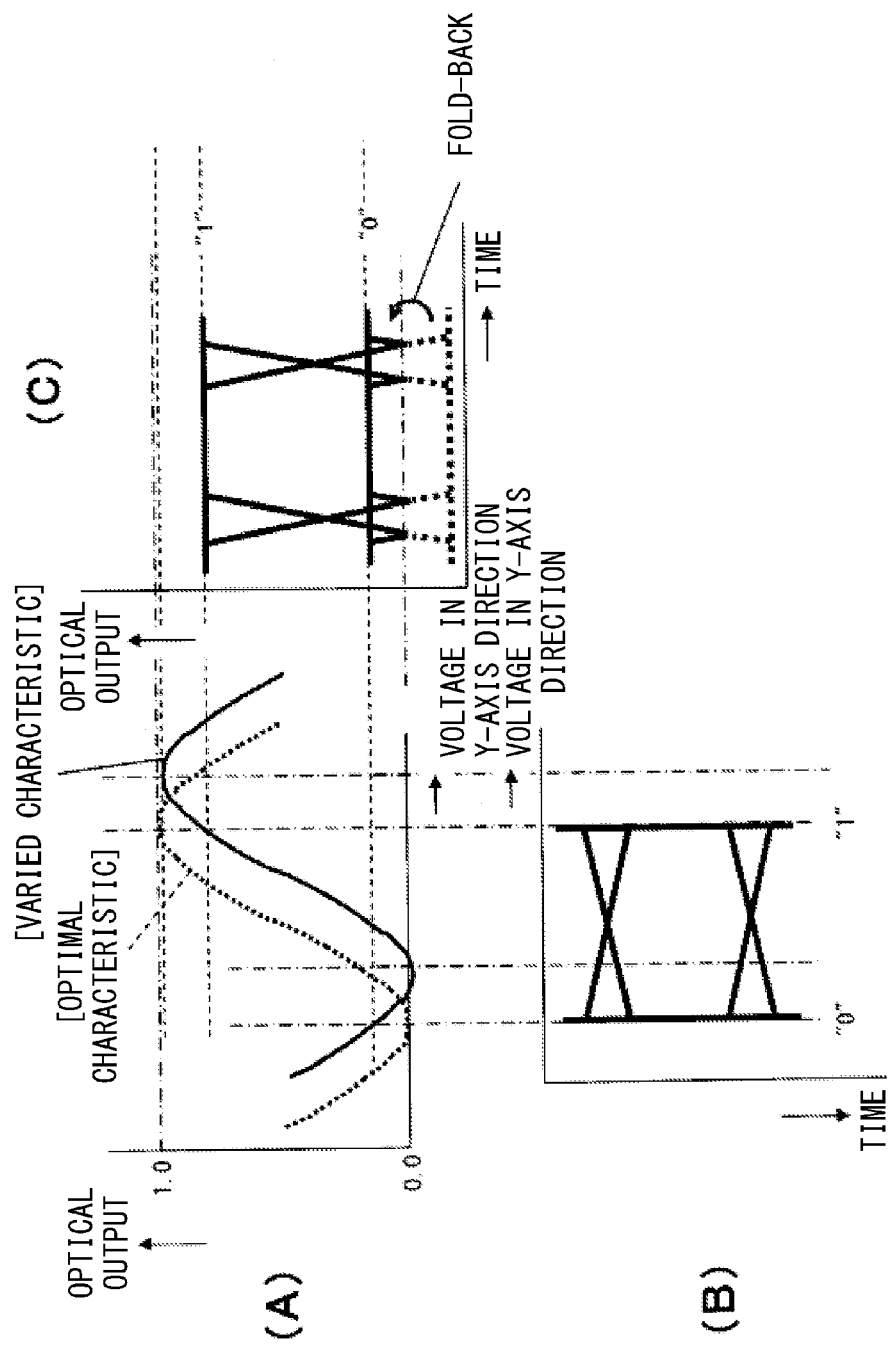
FIG. 77 illustrates the fluctuation of the static characteristic of the SMZM and the waveform degradation.

FIG. 77 illustrates the fluctuation of the static characteristic of the SMZM and the waveform degradation. In the example 1, as illustrated by (A), the static characteristic of the SMZM is shifted in the Y-axis direction. In this case, the cross-point fluctuates. In addition, there occur the degradation of the extinction ratio and the fold-back of the optical waveform. Furthermore, the aperture of the optical waveform is reduced.

Example 2

Figure 78:
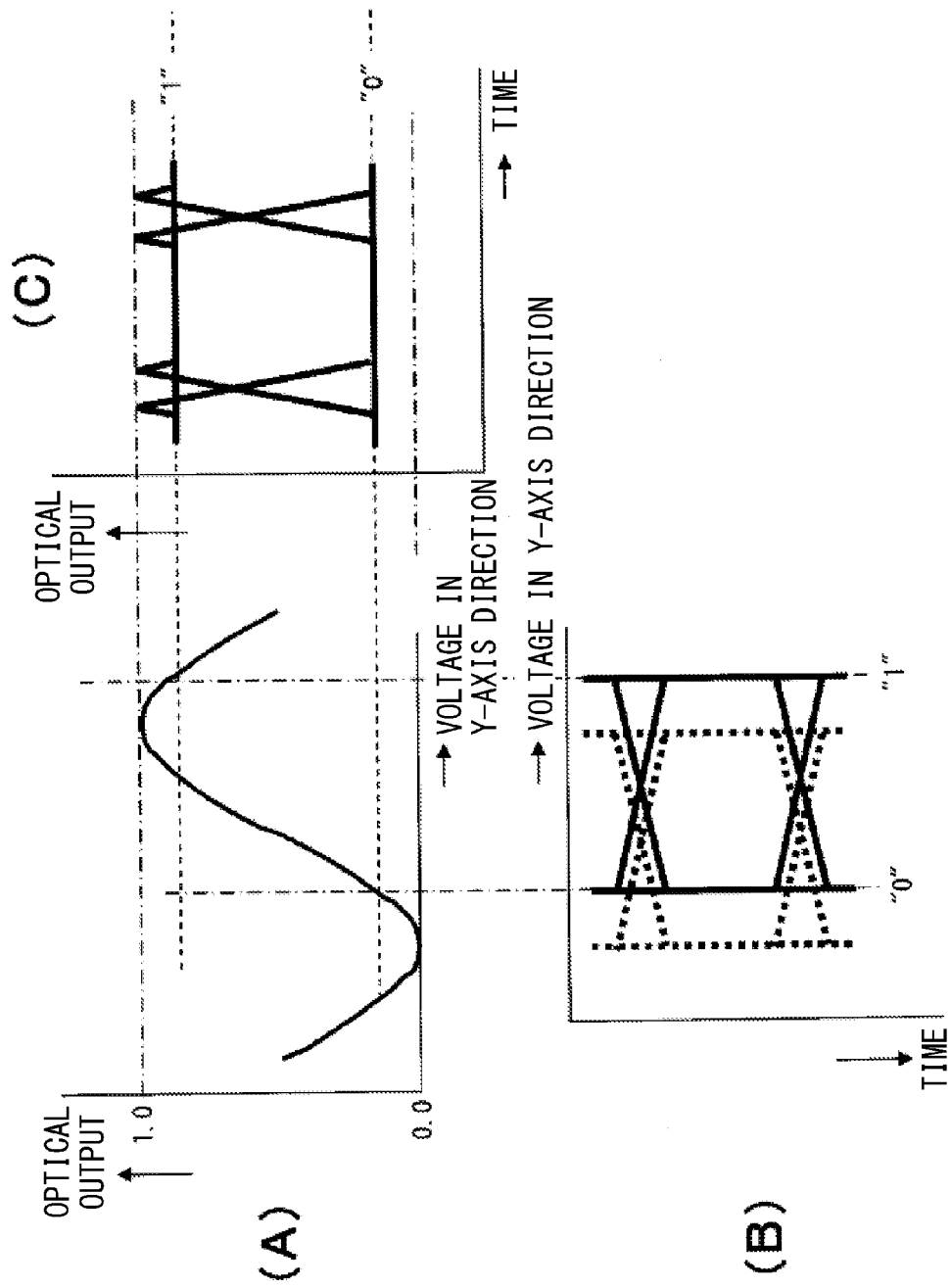
FIG. 78 illustrates the waveform degradation when the bias voltage fluctuates.

FIG. 78 illustrates the waveform degradation when the bias voltage fluctuates. When the bias voltage deviates from the optimum value in the Y-axis direction, the cross-point fluctuates. Additionally, the degradation of the extinction ratio and the fold-back of the optical waveform occur. Furthermore, the aperture of the optical waveform is reduced. The fluctuation of the bias voltage occurs due to the error of the bias control circuits 130 and 132.

Example 3

Figure 79:
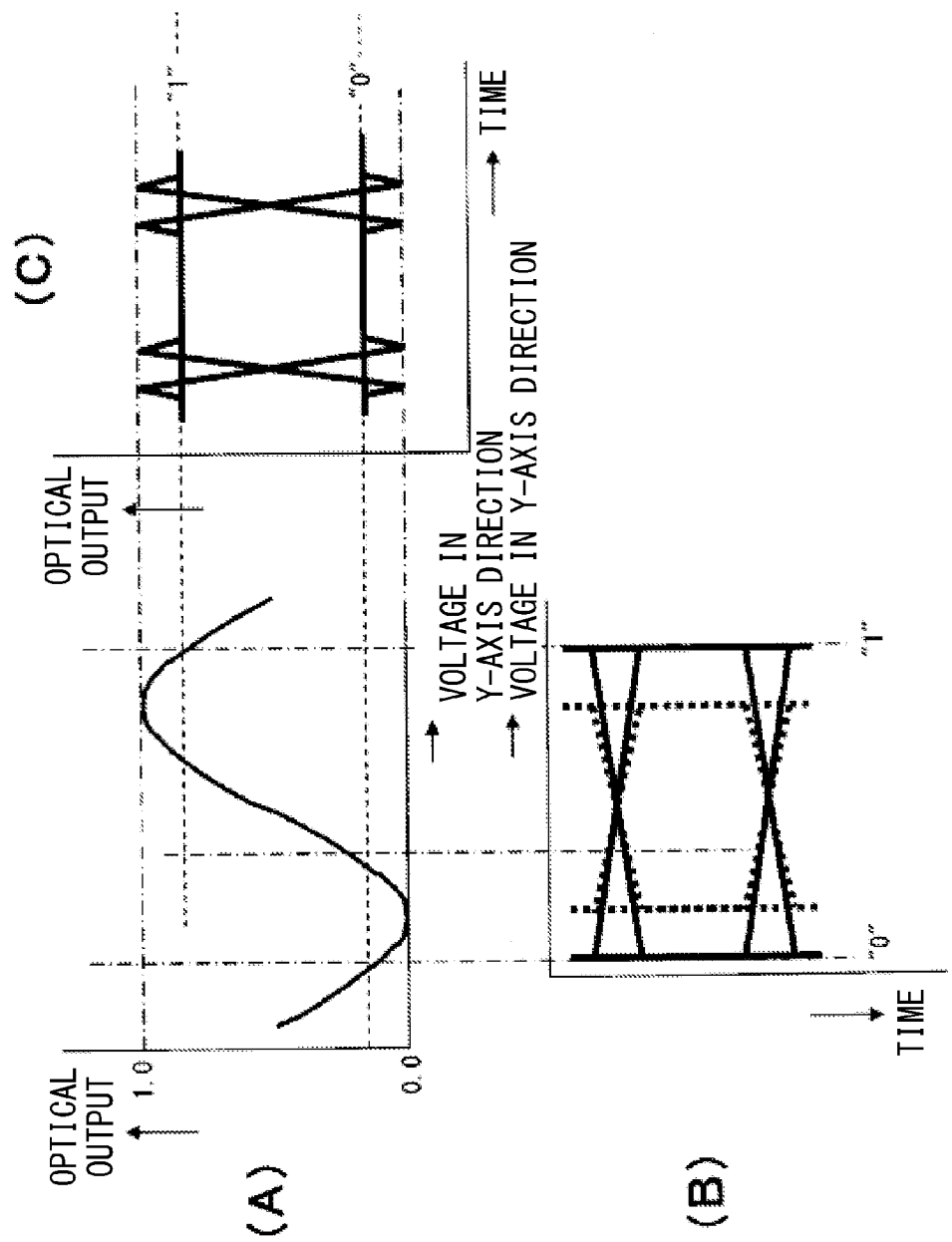
FIG. 79 illustrates the waveform degradation when the modulation amplitude is large.

FIG. 79 illustrates the waveform degradation when the modulation amplitude is large. When the modulation amplitude is larger than the optimum value, the extinction ratio is degraded. Furthermore, the fold-back of the optical waveform occurs. Additionally, the aperture of the optical waveform is reduced. The fluctuation of the modulation amplitude occurs due to, for example, an error of the amplitude control circuit 134.

Example 4

Figure 80:
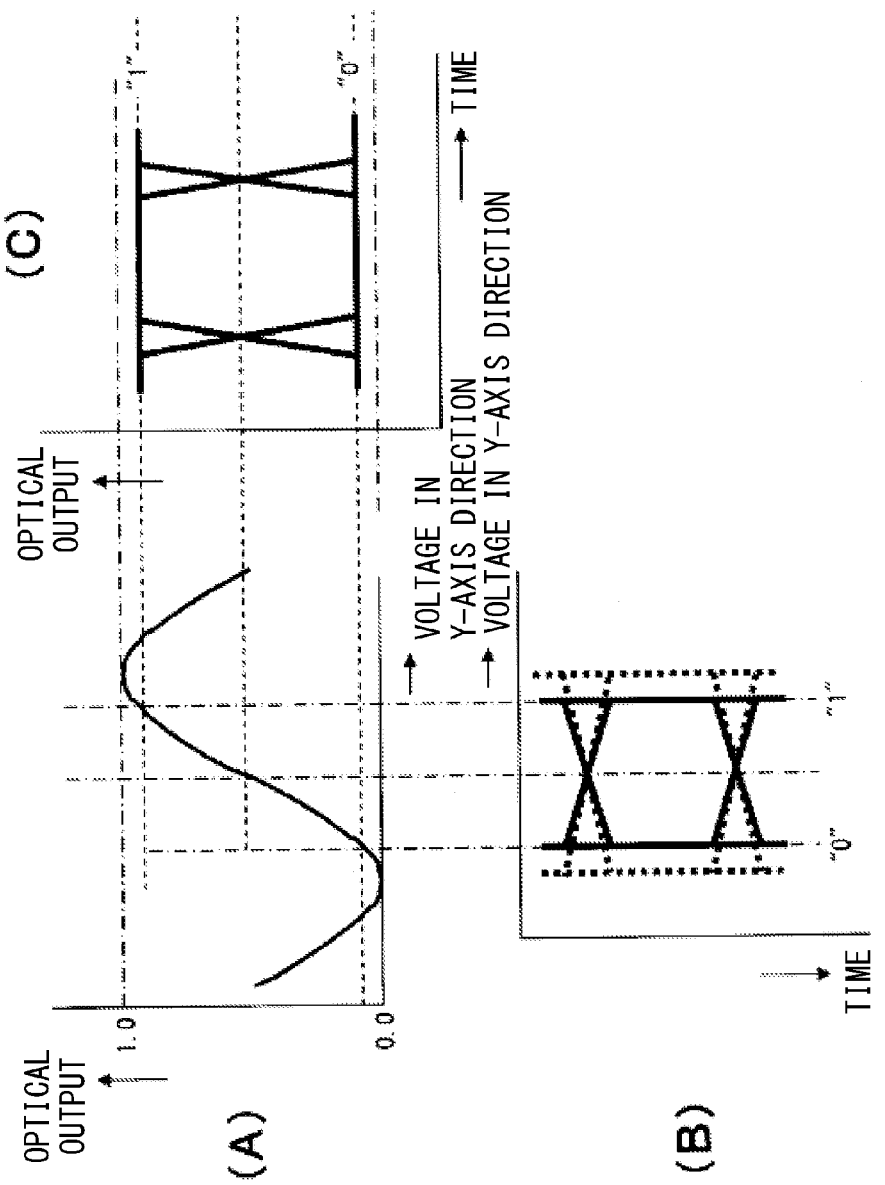
FIG. 80 illustrates the waveform degradation when the modulation amplitude is small.

FIG. 80 illustrates the waveform degradation when the modulation amplitude is small. When the modulation amplitude is smaller than the optimum value, the extinction ratio is degraded. Furthermore, the aperture of the optical waveform is reduced.

Example 5

Figure 81:
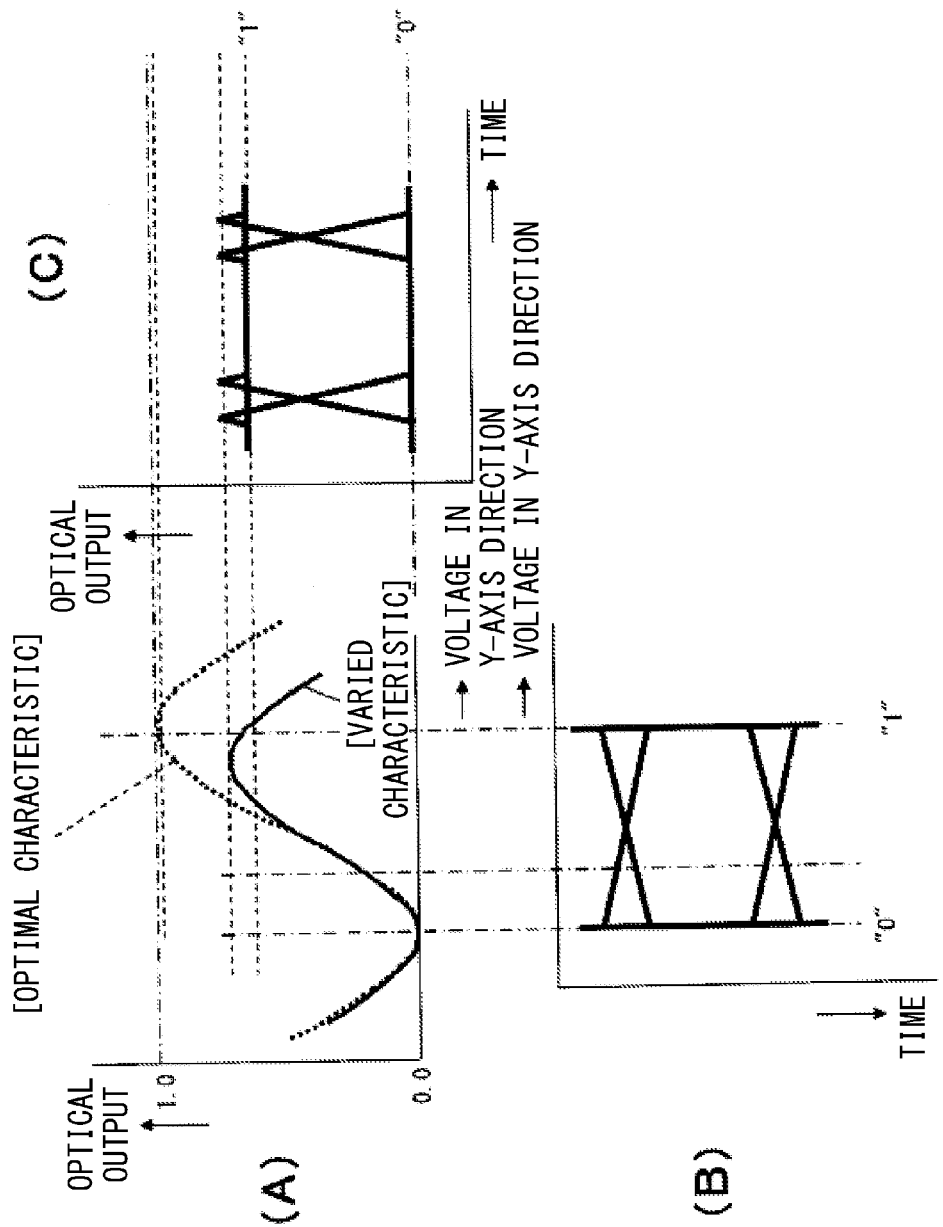
FIG. 81 illustrates the waveform degradation when the static characteristic of the SMZM fluctuates.

FIG. 81 illustrates the waveform degradation when the static characteristic of the SMZM fluctuates. In the example 5, as indicated by (A), the static characteristic of the SMZM fluctuates in the X-axis direction. In this case, the cross-point fluctuates. In addition, the degradation of the extinction ratio and the fold-back of a waveform occur. Furthermore, the aperture of the optical waveform is reduced.

Configuration of Using Micro-Computer

The controlling operations according to the first through eleventh embodiments can be realized by a hardware circuit including an analog circuit, or can be realized by digital signal processing. Described below is the configuration of controlling the bias voltage and the modulation amplitude of the SMZM by the digital signal processing.

Figure 84:
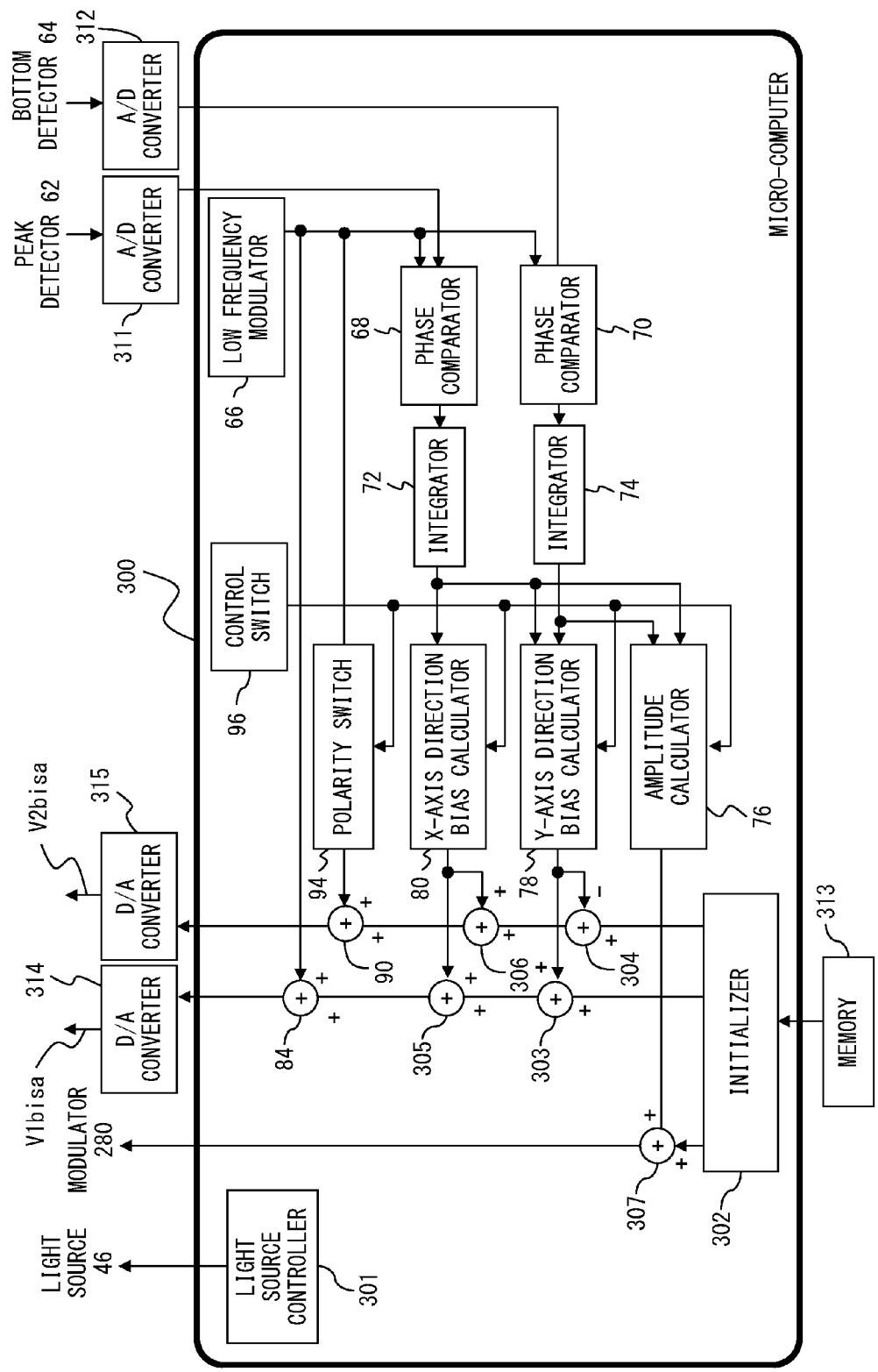
FIG. 84 illustrates a configuration for realizing the digital signal processing of controlling the operating state of the SMZM.

FIG. 84 is a configuration of realizing the digital signal processing for controlling the operating state of the SMZM 4. This signal processing system includes a micro-computer 300, an A/D converters 311 and 312, memory 313, and D/A converters 314 and 315. The micro-computer 300 can be replaced with a PLD (programmable logic device), an FPGA (field programmable gate array), etc.

The A/D converter 311 converts a peak side waveform signal output from the peak detector 62 illustrated in FIG. 60 etc. into digital data. Similarly, the A/D converter 312 converts a bottom side waveform signal output from the bottom detector 64 into digital data.

The memory 313 stores the initial values of the bias voltage V1bias, the bias voltage V2bias, and the amplitude control signal Vc. The bias voltages V1bias and V2bias are respectively applied to the signal electrodes 16 and 18 of the SMZM 4. The amplitude control signal Vc controls the amplitude of the output signal of the modulator 280.

D/A converters 314 and 315 convert the bias voltages V1bias data and V2bias data generated by the micro-computer 300 into the respective voltage signals. That is, the D/A converters 314 and 315 generate the bias voltages V1bias and V2bias. The bias voltages V1bias and V2bias are respectively guided to the input terminals 20 and 22 of the SMZM 4 through the inductors 52 and 54 illustrated in FIG. 60 etc.

The micro-computer 300 provides the functions equivalent to, for example, the seventh embodiment illustrated in FIG. 60 by executing a software program or firmware. That is, the micro-computer 300 includes the low frequency modulator 66, the phase comparators 68 and 70, the integrators 72 and 74, the amplitude calculator 76, the Y-axis direction bias calculator 78, the X-axis direction bias calculator 80, the adders 84 and 90, the polarity switch 94, and the control switch 96. These elements are realized by the digital signal processing in the micro-computer 300.

The micro-computer 300 further includes a light source controller 301, an initializer 302, adders 303-307. The light source controller 301 controls the operation of the light source 46 illustrated in FIG. 60 etc. The initializer 302 acquires the initial values of the bias voltage V1bias, the bias voltage V2bias, and the amplitude control signal Vc from the memory 313, and outputs them.

The adder 303 adds the output data of the Y-axis direction bias calculator 78 to the initial value of the bias voltage V1bias. The adder 304 subtracts the output data of the Y-axis direction bias calculator 78 from the initial value of the bias voltage V2bias. The adders 305 and 306 add the output data of the X-axis direction bias calculator 80 to the output data of the adders 303 and 304, respectively. In this case, the adder 84 superimposes the low frequency signal to the output data of the adder 305 to and generate the V1bias data. In addition, the adder 90 superimposes the output signal (low frequency signal or inverted low frequency signal) of the polarity switch 94 on the output data of the adder 305 to generate the V2bias data. The adder 307 adds the output data of the amplitude calculator 76 to the initial value of the amplitude control signal Vc to generate the amplitude control signal Vc. The amplitude control signal Vc is converted by a D/A converter as necessary, and is provided for the modulator 280.

Figure 85:
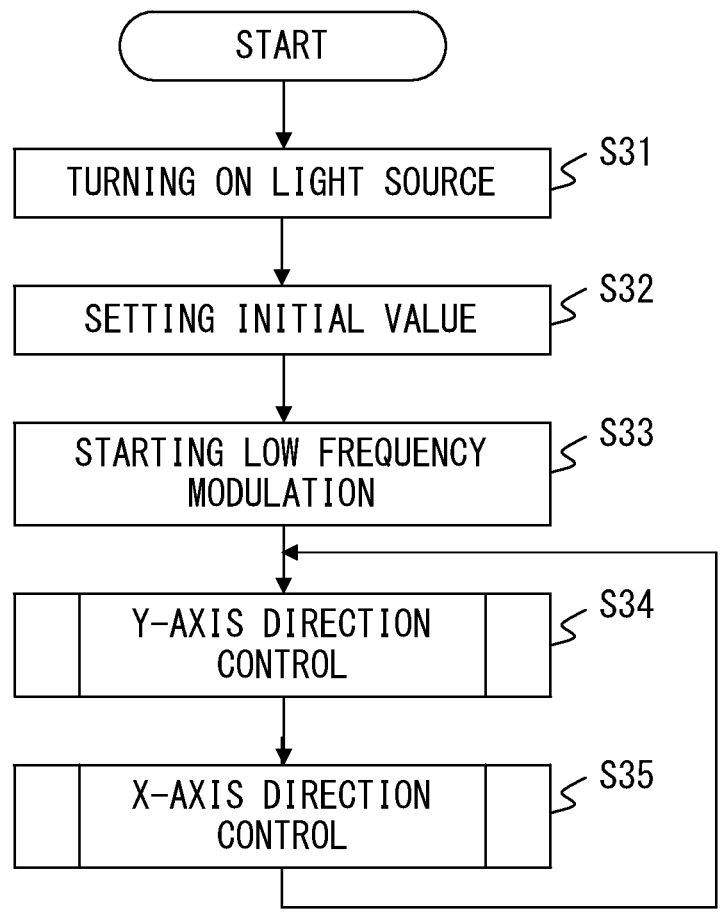
FIG. 85 is a flowchart of the procedure of controlling the operating state of the SMZM.

FIG. 85 is a flowchart of the procedure of controlling the operating state of the SMZM 4. The process in the flowchart is executed by the micro-computer 300 illustrated in FIG. 84.

In S31, the light source controller 301 turns ON the light source 46. Thus, the light source 46 generates direct current light (that is CW light). In S32, the initializer 302 acquires the initial values of the bias voltage V1bias, the bias voltage V2bias, and the amplitude control signal Vc from the memory 313. In S33, the low frequency modulator 66 generates a low frequency signal.

In S34, the micro-computer 300 performs Y-axis direction control. The Y-axis direction control includes the control of the Y-axis direction bias voltage, and the control of the modulation amplitude. In S35, the micro-computer 300 performs the X-axis direction control. The X-axis direction control includes the control of the X-axis direction bias voltage. The micro-computer 300 alternately performs the S34 and S35 repeatedly.

FIG. 86 is a flowchart of the Y-axis direction control. The process corresponds to S34 illustrated in FIG. 85.

In S41, the control switch 96 generates an instruction to start the Y-axis direction control and an instruction to stop the X-axis direction control. According to the instructions, the amplitude calculator 76 and the Y-axis direction bias calculator 78 start the controlling operation. On the other hand, the X-axis direction bias calculator 80 does not perform the controlling operation. The X-axis direction bias calculator 80 maintains the output signal when no controlling operation is performed.

In S42, the control switch 96 issues an invert instruction to the polarity switch 94. Upon receiving the invert instruction, the polarity switch 94 inverts the low frequency signal while S43-S52 are performed.

In S43, the micro-computer 300 acquires the peak side waveform signal detected by the peak detector 62 and the bottom side waveform signal detected by the bottom detector 64. In S44, the phase comparator 68 detects the phase of the peak side waveform signal by comparing the phases using a low frequency signal. Similarly, the phase comparator 70 detects the phase of the bottom side waveform signal by comparing the phases using the low frequency signal.

In S45-S46 and S49-S50, the amplitude calculator 76 adjusts the amplitude control signal Vc based on the phases of the peak side waveform signal and the bottom side waveform signal. That is, when the phase of the peak side waveform signal is reversed with respect to the low frequency signal, and the phase of the bottom side waveform signal is also reversed with respect to the low frequency signal, then the amplitude calculator 76 determines that the modulation amplitude is larger than the optimum value. In this case, the amplitude calculator 76 adjusts the amplitude control signal Vc so that the modulation amplitude is reduced in S49. When the phase of the peak side waveform signal is in-phase with respect to the low frequency signal, and the phase of the bottom side waveform signal is also in-phase with respect to the low frequency signal, then the amplitude calculator 76 determines that the modulation amplitude is smaller than the optimum value. In this case, the amplitude calculator 76 adjusts the amplitude control signal Vc to increase the modulation amplitude in S50.

In S47-S48 and S51-S52, the Y-axis direction bias calculator 78 adjusts the bias voltage in the Y-axis direction based on the phases of the peak side waveform signal and the bottom side waveform signal. That is, when the phase of the peak side waveform signal is in-phase with respect to the low frequency signal, and the phase of the bottom side waveform signal is reversed with respect to the low frequency signal, then the Y-axis direction bias calculator 78 determines that the Y-axis direction bias voltage is lower than the optimum value. In this case, the Y-axis direction bias calculator 78 adjusts the voltages V1bias and V2bias to increase the Y-axis direction bias voltage in S51. In addition, when the phase of the peak side waveform signal is reversed with respect to the low frequency signal, and the phase of the bottom side waveform signal is in-phase with respect to the low frequency signal, then the Y-axis direction bias calculator 78 determines that the Y-axis direction bias voltage is higher than the optimum value. In this case, the Y-axis direction bias calculator 78 adjusts the voltages V1bias and V2bias to decrease the Y-axis direction bias voltage in S52.

If the processes in S43-S52 are repeatedly performed, the state in FIG. 18 through FIG. 20 is realized. That is, when the state illustrated in FIG. 18 through FIG. 20 is detected by monitoring the phases of the peak side waveform signal and the bottom side waveform signal, the micro-computer 300 stops the Y-axis direction control. The micro-computer 300 may be configured to stop the Y-axis direction control when the outputs of the integrators 72 and 74 are zero as illustrated by (H) and (I) in FIG. 20.

Figure 87:
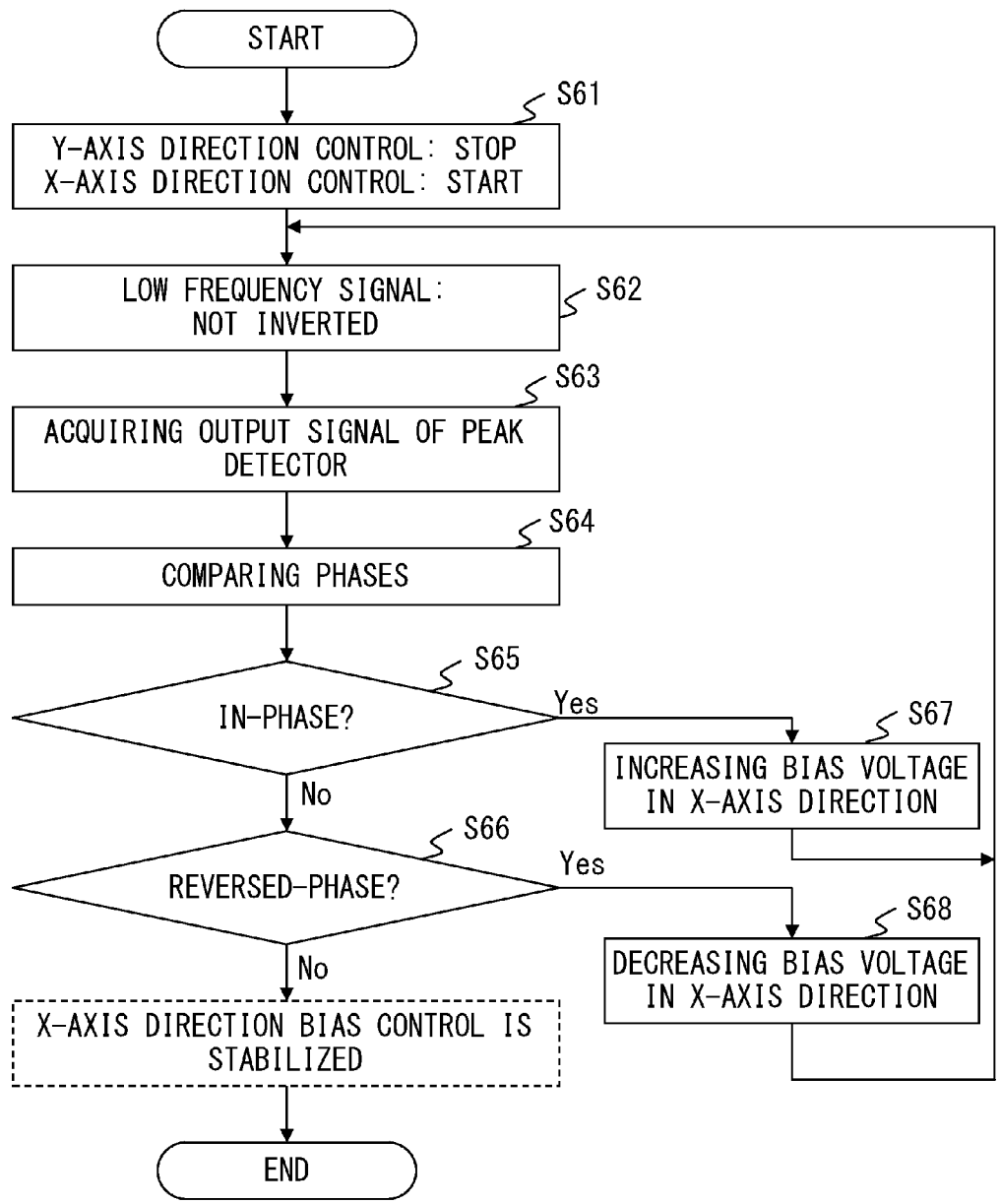
FIG. 87 is a flowchart of the X-axis direction control.

FIG. 87 is a flowchart of the X-axis direction control. The process corresponds to S35 in FIG. 85.

In S61, the control switch 96 generates an instruction to start the X-axis direction control and an instruction to stop the Y-axis direction control. According to the instructions, the X-axis direction bias calculator 80 starts the controlling operation. On the other hand, the amplitude calculator 76 and the Y-axis direction bias calculator 78 do not perform the controlling operation. The amplitude calculator 76 and the Y-axis direction bias calculator 78 maintain the output signal when they do not perform the controlling operation.

In S62, the control switch 96 issues a non-inversion instruction to the polarity switch 94. Upon receiving the instruction, the polarity switch 94 guides the low frequency signal to the adder 90 without inverting the signal while S63-S68 are performed.

In S63, the micro-computer 300 acquires a peak side waveform signal detected by the peak detector 62. In S64, the phase comparator 68 detects the phase of the peak side waveform signal by comparing the phases using the low frequency signal.

In S65-S68, the X-axis direction bias calculator 80 adjusts the bias voltage in the X-axis direction based on the phase of the peak side waveform signal. That is, when the phase of the peak side waveform signal is in-phase with respect to the low frequency signal, the X-axis direction bias calculator 80 determines that the X-axis direction bias voltage is lower than the optimum value. In this case, the X-axis direction bias calculator 80 adjusts the voltages V1bias and V2bias to increase the X-axis direction bias voltage in S67. When the phase of the peak side waveform signal is reversed with respect to the low frequency signal, the X-axis direction bias calculator 80 determines that the X-axis direction bias voltage is higher than the optimum value. In this case, the X-axis direction bias calculator 80 adjusts the voltages V1bias and V2bias to decrease the X-axis direction bias voltage in S68.

If the processes in S63-S68 are repeatedly performed, the state illustrated in FIG. 54 and FIG. 55 is realized. That is, the micro-computer 300 stops the X-axis direction control when the state illustrated in FIG. 54 and FIG. 55 is detected by monitoring the phase of the peak side waveform signal. The micro-computer 300 may be configured to stop the X-axis direction control when the output of the integrator 72 is zero as indicated by (E) in FIG. 55.

The embodiments of the optical modulator, the optical transmitter, and the optical modulation control method are described above, but the present invention is not limited to the descriptions above, and those skilled in the art can modify and vary in various ways based on the gist of the present invention described in the scope of the claims for the patent and disclosed in the embodiments. The modifications and variations are included in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical modulator, comprising:
   a modulator including an optical waveguide provided in a semiconductor substrate having an electro-optical effect and an electrode for applying an electric field depending on a bias voltage and a modulation signal to the optical waveguide;
   a modulation signal generator to generate the modulation signal of a first frequency;
   a superimposer to superimpose a signal of a second frequency different from the first frequency on the bias voltage; and
   a bias controller to control the bias voltage in a modulation direction of the modulator and the bias voltage in an orthogonal direction which is orthogonal to the modulation direction based on a phase of the second frequency component extracted from a modulated optical signal generated by the modulator.

2. The optical modulator according to claim 1, further comprising
   a first detector to detect a peak side waveform of the second frequency component extracted from the modulated optical signal, wherein
   the bias controller controls the bias voltage in the orthogonal direction.

3. The optical modulator according to claim 2, wherein
   the bias controller controls the bias voltage in the orthogonal direction based on whether the phase of the peak side waveform is in-phase or reversed with respect to the signal of the second frequency.

4. The optical modulator according to claim 2, further comprising
a second detector to detect a bottom side waveform of the second frequency component extracted from the modulated optical signal, wherein
the bias controller controls the bias voltage in the modulation direction based on the phase of the peak side waveform and the phase of the bottom side waveform.

5. The optical modulator according to claim 4, wherein
the bias controller controls the bias voltage in the modulation direction when the phase of the peak side waveform and the phase of the bottom side waveform are reversed with respect to each other.

6. The optical modulator according to claim 1, further comprising
a detector to detect a peak side waveform and a bottom side waveform of the second frequency component extracted from the modulated optical signal, wherein
the bias controller controls the bias voltage in the modulation direction and the bias voltage in the orthogonal direction based on the phase of the peak side waveform and the phase of the bottom side waveform.

7. The optical modulator according to claim 1, wherein:
the optical waveguide comprises first and second optical waveguides which form a Mach-Zehnder interferometer;
the electrode comprises first and second electrodes for respectively applying an electric field to the first and second optical waveguides;
the modulation signal and a first bias voltage are applied to the first electrode;
an inverted signal of the modulation signal and a second bias voltage are applied to the second electrode;
the bias controller includes a first bias controller to control the bias voltage in the orthogonal direction;
when the superimposer superimposes signals of the second frequency having same phase on the first bias voltage and the second bias voltage, respectively, the first bias controller controls the bias voltage in the orthogonal direction based on the phase of the second frequency component extracted from the modulated optical signal.

8. The optical modulator according to claim 7, wherein
the first bias controller shifts the first bias voltage and the second bias voltage in the same direction by the same amount based on the phase of the second frequency component extracted from the modulated optical signal.

9. The optical modulator according to claim 7, wherein
the bias controller includes a second bias controller to control the bias voltage in the modulation direction;
when the superimposer superimposes signals of the second frequency having reversed phase from each other on the first bias voltage and the second bias voltage, respectively, the second bias controller controls the bias voltage in the modulation direction based on the phase of the second frequency component extracted from the modulated optical signal.

10. The optical modulator according to claim 9, wherein
the second bias controller shifts the first bias voltage and the second bias voltage in opposite directions by the same amount based on the phase of the second frequency component extracted from the modulated optical signal.

11. The optical modulator according to claim 1, further comprising
an amplitude controller to generate an amplitude control signal for controlling an amplitude of the modulation signal based on the phase of the second frequency component extracted from the modulated optical signal, wherein
the modulation signal generator controls the amplitude of the modulation signal according to the amplitude control signal.

12. The optical modulator according to claim 11, further comprising
a detector to detect a peak side waveform and a bottom side waveform of the second frequency component extracted from the modulated optical signal, wherein
the amplitude controller generates the amplitude control signal based on the phase of the peak side waveform and the phase of the bottom side waveform.

13. An optical modulator, comprising:
a modulator including an optical waveguide provided in a semiconductor substrate having an electro-optical effect and an electrode for applying an electric field depending on a bias voltage and a modulation signal to the optical waveguide;
a modulation signal generator to generate the modulation signal of a first frequency;
an amplitude controller to generate an amplitude control signal for controlling an amplitude of the modulation signal;
a bias controller to generate the bias voltage; and
a superimposer to superimpose a signal of a second frequency different from the first frequency on at least one of the bias voltage and the amplitude control signal, wherein:
when the superimposer superimposes the signal of the second frequency on the amplitude control signal, the bias controller controls the bias voltage in a modulation direction of the modulator based on the phase of the second frequency component extracted from a modulated optical signal generated by the modulator;
when the superimposer superimposes the signal of the second frequency on the amplitude control signal, the amplitude controller adjusts the amplitude control signal based on the phase of the second frequency component extracted from the modulated optical signal; and
when the superimposer superimposes the signal of the second frequency on the bias voltage, the bias controller controls the bias voltage in a direction orthogonal to the modulation direction based on the phase of the second frequency component extracted from the modulated optical signal.

14. An optical transmitter, comprising:
a modulator including an optical waveguide provided in a semiconductor substrate having an electro-optical effect and an electrode for applying an electric field depending on a bias voltage and a modulation signal to the optical waveguide;
a light source to generate carrier light to be input to the modulator;
a modulation signal generator to generate the modulation signal of a first frequency;
a superimposer superimposing a signal of a second frequency different from the first frequency on the bias voltage; and
a bias controller to control the bias voltage in a modulation direction of the modulator and the bias voltage in an orthogonal direction which is orthogonal to the modulation direction based on a phase of the second frequency component extracted from a modulated optical signal generated by the modulator.

15. An optical modulation control method for controlling an operating state of a modulator including an optical waveguide provided in a semiconductor substrate having an electro-optical effect, and an electrode for applying an electric field depending on a bias voltage and a modulation signal of to the optical waveguide, comprising:

superimposing a signal of a second frequency different from a first frequency of the modulation signal on the bias voltage; and controlling the bias voltage in a modulation direction of the modulator and the bias voltage in an orthogonal direction which is orthogonal to the modulation direction based on a phase of the second frequency component extracted from a modulated optical signal generated by the modulator.

* * * * *